(12) United States Patent
Wu et al.

(10) Patent No.: US 12,552,787 B2
(45) Date of Patent: Feb. 17, 2026

(54) QUINAZOLINE COMPOUND

(71) Applicant: MEDSHINE DISCOVERY INC., Jiangsu (CN)

(72) Inventors: Lifang Wu, Shanghai (CN); Fei Sun, Shanghai (CN); Charles Z. Ding, Shanghai (CN); Shuhui Chen, Shanghai (CN)

(73) Assignee: MEDSHINE DISCOVERY INC., Jiangsu (CN)

( * ) Notice: Subject to any disclaimer, the term of this patent is extended or adjusted under 35 U.S.C. 154(b) by 488 days.

(21) Appl. No.: 18/005,347

(22) PCT Filed: Jul. 23, 2021

(86) PCT No.: PCT/CN2021/108256
§ 371 (c)(1),
(2) Date: Jan. 12, 2023

(87) PCT Pub. No.: WO2022/017519
PCT Pub. Date: Jan. 27, 2022

(65) Prior Publication Data
US 2023/0265090 A1    Aug. 24, 2023

(30) Foreign Application Priority Data

Jul. 24, 2020 (CN) .......................... 202010723467.4
Jun. 11, 2021 (CN) .......................... 202110653818.3

(51) Int. Cl.
 C07D 471/04   (2006.01)
 A61K 31/519   (2006.01)
 A61P 35/00    (2006.01)
 C07D 453/02   (2006.01)
 C07D 519/00   (2006.01)

(52) U.S. Cl.
 CPC ............ C07D 471/04 (2013.01); A61P 35/00 (2018.01); C07D 519/00 (2013.01)

(58) Field of Classification Search
 CPC .. C07D 471/04; C07D 453/02; C07D 519/00; A61K 31/519; A61P 35/00
 See application file for complete search history.

(56) References Cited

U.S. PATENT DOCUMENTS

| 2019/0358230 A1 | 11/2019 | Gmachl et al. |
| 2021/0009588 A1 | 1/2021 | Ramharter et al. |

FOREIGN PATENT DOCUMENTS

| CN | 110167928 A | 8/2019 |
| CN | 111372932 A | 7/2020 |
| WO | 2018172250 A1 | 9/2018 |
| WO | 2018212774 A1 | 11/2018 |

OTHER PUBLICATIONS

Oct. 28, 2021 International Search Report issued in International Patent Application No. PCT/CN2021/108256.
Oct. 28, 2021 Written Opinion of the International Searching Authority issued in International Patent Application No. PCT/CN2021/108256.
Jul. 9, 2024 European Extended Search Report issued in European Patent Application No. 21846493.1.
Nov. 19, 2024 Chinese First Office Action issued in Chinese Patent Application No. 202180061375.7.
Nov. 14, 2024 Chinese Search Report issued in Chinese Patent Application No. 202180061375.7.
Apr. 24, 2025 Chinese Second Office Action issued in Chinese Patent Application No. 202180061375.7.

*Primary Examiner* — Bruck Kifle
(74) *Attorney, Agent, or Firm* — Houston Beshining Law Office PLLC; Liangang Ye

(57) ABSTRACT

A quinazoline compound and a pharmaceutically acceptable salt thereof, in particular a compound of formula (II) and a pharmaceutically acceptable salt thereof.

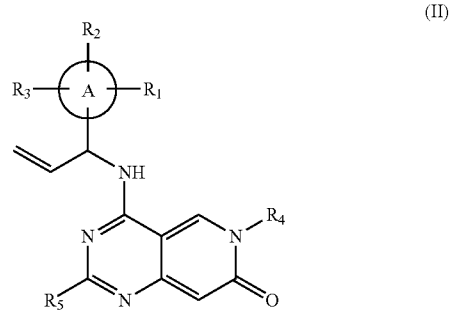

10 Claims, 1 Drawing Sheet

QUINAZOLINE COMPOUND

The present application is a National Stage of International Application No. PCT/CN2021/108256, filed on Jul. 23, 2021, which claims priorities of the Chinese Patent Application No. CN202010723467.4 filed on Jul. 24, 2020 and the Chinese Patent Application No. CN202110653818.3 filed on Jun. 11, 2021, the contents of which are incorporated herein by reference in their entireties.

TECHNICAL FIELD

The present disclosure relates to a class of quinazoline compounds and pharmaceutically acceptable salts thereof, and a use of the compounds or pharmaceutically acceptable salts thereof in the manufacture of a medicament for the treatment of cancer.

BACKGROUND

Mutations in RAS proteins occur in approximately 20% to 30% of cancer cases and are the most common mutated oncogenes in pancreatic cancer, colorectal cancer and non-small cell lung cancer. RAS proteins act as molecular switches, and are in an activated state when bound to GTP and in an inactivated state when bound to GDP. Mutations in RAS proteins reduce their ability to hydrolyze GTP with GTPases, allowing the molecular switch to remain in an active GTP-binding state, driving unchecked oncogenic downstream signal transduction, such as through the RAS-RAF-MEK-ERK pathway and the RAS-PI3K-PDK1-AKT pathway, and promoting the survival and proliferation of cancer cells.

SOS1 proteins are a class of guanine nucleotide exchange factors (GEFs). Studies have shown that this type of protein can catalyze the binding of KRAS to GTP, thereby promoting the activation of KRAS. Therefore, targeted inhibition of SOS1 proteins, SOS1-KRAS interaction, independent of what kind of mutation KRAS is, has become a potential target for tumor therapy. In addition, studies have also shown that combined MEK inhibition can lead to deep pathway blockade and tumor regression in vivo and is a potential treatment for most KRAS-driven cancers.

CONTENT OF THE PRESENT INVENTION

The present disclosure provides a compound represented by formula (II) or a pharmaceutically acceptable salt thereof,

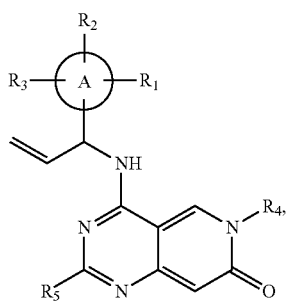

wherein,
ring A is selected from phenyl and 5-membered heteroaryl;
$R_1$ is selected from H and $NH_2$;
$R_2$ is selected from $C_{1-3}$ alkyl, and the $C_{1-3}$ alkyl is optionally substituted by 1, 2, 3, 4 or 5 $R_a$;
$R_3$ is selected from H and F;
$R_4$ is selected from $C_{3-8}$ cycloalkyl and 3- to 8-membered heterocycloalkyl, and the $C_{3-8}$ cycloalkyl and 3- to 8-membered heterocycloalkyl are each independently optionally substituted by 1, 2, 3 or 4 $R_b$;
$R_5$ is selected from H, Cl and $CH_3$;
$R_a$ is each independently selected from D, F, Cl, Br, I, OH, CN, $NH_2$, $CH_3$, $-CH_2NH_2$, $-NHCH_3$, $-N(CH_3)_2$, $-OCH_3$, $-COOH$, $-COOCH_3$ and cyclopropyl;
$R_b$ is each independently selected from H, F, Cl, Br, I, OH, CN, $NH_2$, $C_{1-3}$ alkyl, $-CH_2NH_2$, $-NHCH_3$, $-N(CH_3)_2$, $C_{1-3}$ alkoxy, $-COOH$, $-COO-C_{1-3}$ alkyl, $-C(=O)-C_{1-3}$ alkyl, $-S(=O)_2-C_{1-3}$ alkyl and cyclopropyl, and the $C_{1-3}$ alkyl, $C_{1-3}$ alkoxy and cyclopropyl are each independently optionally substituted by 1, 2, or 3 R;
R is each independently selected from F, Cl, Br, I, OH, CN, $NH_2$, $-OCH_3$ and $-COOH$.

The present disclosure also provides a compound represented by formula (I) or a pharmaceutically acceptable salt thereof,

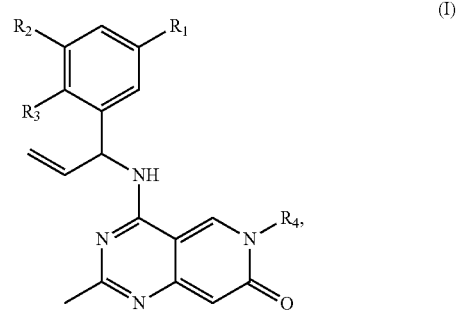

wherein,
$R_1$ is selected from H and $NH_2$;
$R_2$ is selected from $C_{1-3}$ alkyl, and the $C_{1-3}$ alkyl is optionally substituted by 1, 2, 3, 4 or 5 $R_a$;
$R_3$ is selected from H and F;
$R_4$ is selected from $C_{3-8}$ cycloalkyl and 3- to 8-membered heterocycloalkyl, and the $C_{3-8}$ cycloalkyl and 3- to 8-membered heterocycloalkyl are each independently optionally substituted by 1, 2, 3 or 4 $R_b$;
$R_a$ is each independently selected from D, F, Cl, Br, I, OH, CN, $NH_2$, $CH_3$, $-CH_2NH_2$, $-NHCH_3$, $-N(CH_3)_2$, $-OCH_3$, $-COOH$, $-COOCH_3$ and cyclopropyl;
$R_b$ is each independently selected from H, F, Cl, Br, I, OH, CN, $NH_2$, $C_{1-3}$ alkyl, $-CH_2NH_2$, $-NHCH_3$, $-N(CH_3)_2$, $-OCH_3$, $-COOH$, $-COOCH_3$ and cyclopropyl, and the $C_{1-3}$ alkyl and cyclopropyl are each independently optionally substituted by 1, 2, or 3 R;
R is each independently selected from F, Cl, Br, I, OH, CN, $NH_2$ and $-COOH$.

In some embodiments of the present disclosure, the $R_1$ is selected from $NH_2$, and other variables are as defined in the present disclosure.

In some embodiments of the present disclosure, the $R_1$ is selected from H, and other variables are as defined in the present disclosure.

In some embodiments of the present disclosure, the $R_2$ is selected from $CF_3$,

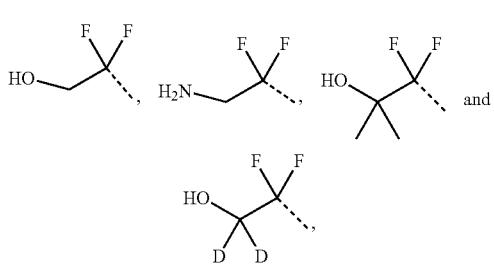

and other variables are as defined in the present disclosure.

In some embodiments of the present disclosure, the $R_2$ is selected from $CF_3$, $CHF_2$,

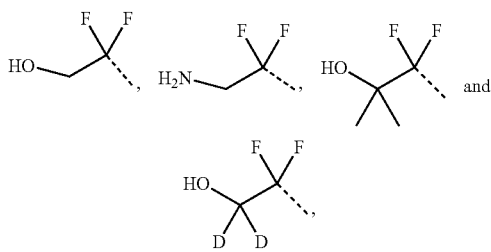

and other variables are as defined in the present disclosure.

In some embodiments of the present disclosure, the $R_4$ is selected from cyclopropyl, bicyclo[2.2.2]octyl, 5- to 6-membered heterocycloalkyl and 8-membered heterocycloalkyl, and the cyclopropyl, bicyclo[2.2.2]octyl, 5- to 6-membered heterocycloalkyl and 8-membered heterocycloalkyl are each independently optionally substituted by 1, 2, 3 or 4 $R_b$, and other variables are as defined in the present disclosure.

In some embodiments of the present disclosure, the $R_4$ is selected from cyclopropyl, bicyclo[2.2.2]octyl and 5- to 6-membered heterocycloalkyl, and the cyclopropyl, bicyclo[2.2.2]octyl and 5- to 6-membered heterocycloalkyl are each independently optionally substituted by 1, 2, 3 or 4 $R_b$, and other variables are as defined in the present disclosure.

In some embodiments of the present disclosure, the $R_4$ is selected from

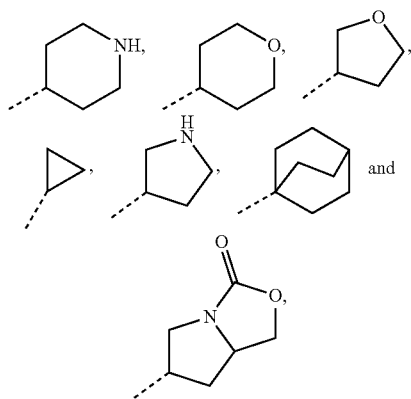

and the

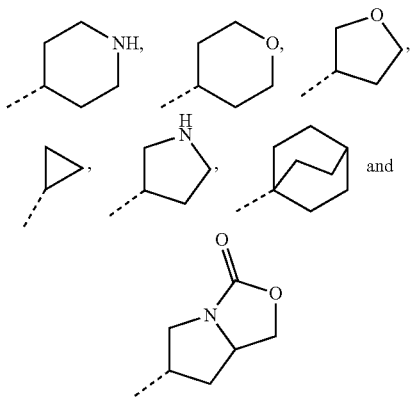

are each independently optionally substituted by 1, 2, 3 or 4 $R_b$, and other variables are as defined in the present disclosure.

In some embodiments of the present disclosure the $R_4$ is selected from

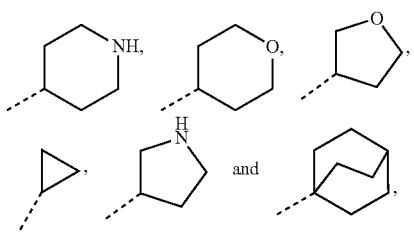

and the

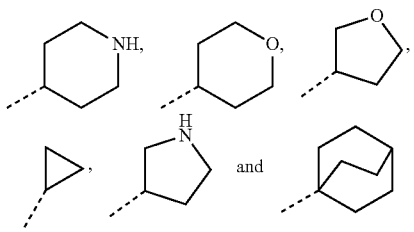

are each independently optionally substituted by 1, 2, 3 or 4 $R_b$ and other variables are as defined in the present disclosure.

In some embodiments of the present disclosure, the $R_4$ is selected from

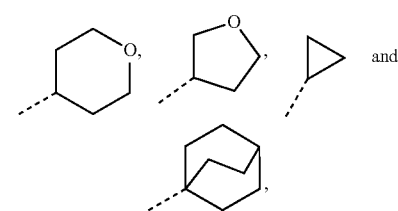

and the

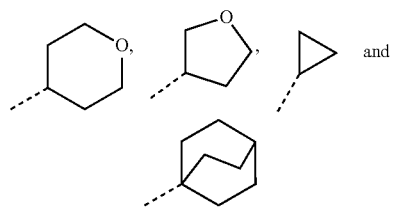

are each independently optionally substituted by 1, 2, 3 or 4 $R_b$, and other variables are as defined in the present disclosure.

In some embodiments of the present disclosure, the $R_b$ is each independently selected from H, F, Cl, Br, I, OH, CN, $NH_2$, $CH_3$, $—CH_2F$, $—CHF_2$, $—CH_2CN$, $—CH_2OH$, $—CH_2OCH_3$, $—CH_2CH_3$, $—CH_2NH_2$, $—NHCH_3$, $—N(CH_3)_2$, $—OCH_3$, $—COOH$, $—COOCH_3$,

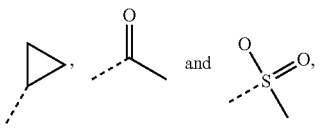

and other variables are as defined in the present disclosure.

In some embodiments of the present disclosure, the $R_b$ is each independently selected from H, F, Cl, Br, I, OH, CN, $NH_2$, $CH_3$, $—CH_2CH_3$, $—CH_2NH_2$, $—NHCH_3$, $—N(CH_3)_2$, $—OCH_3$, $—COOH$, $—COOCH_3$, cyclopropyl and $—CH_2F$, and other variables are as defined in the present disclosure.

In some embodiments of the present disclosure, the $R_4$ is selected from

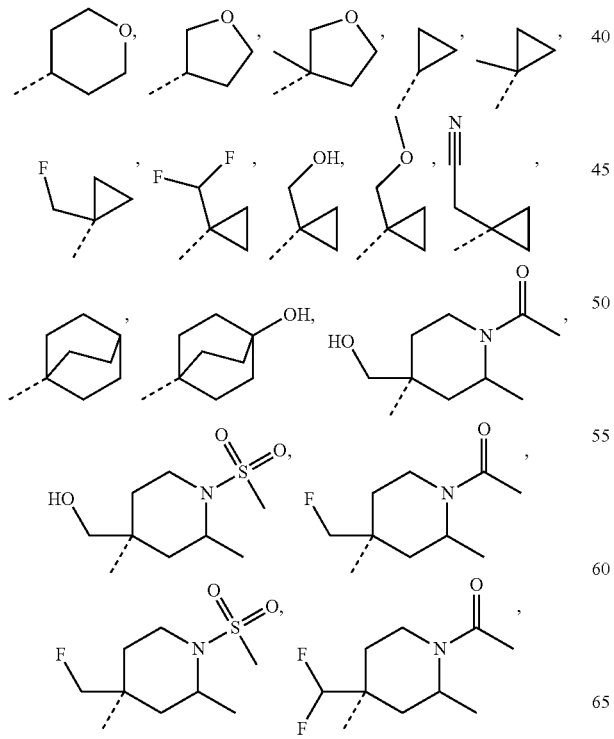

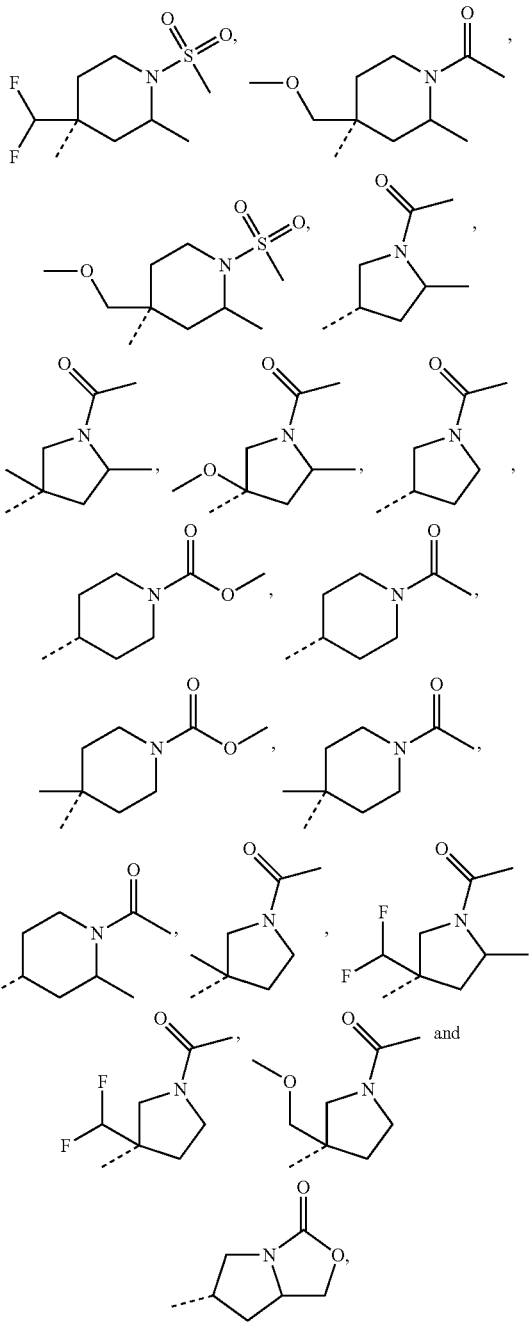

and other variables are as defined in the present disclosure.

In some embodiments of the present disclosure, the $R_4$ is selected from

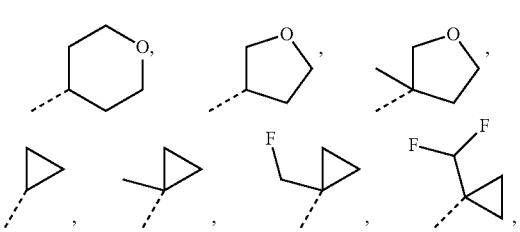

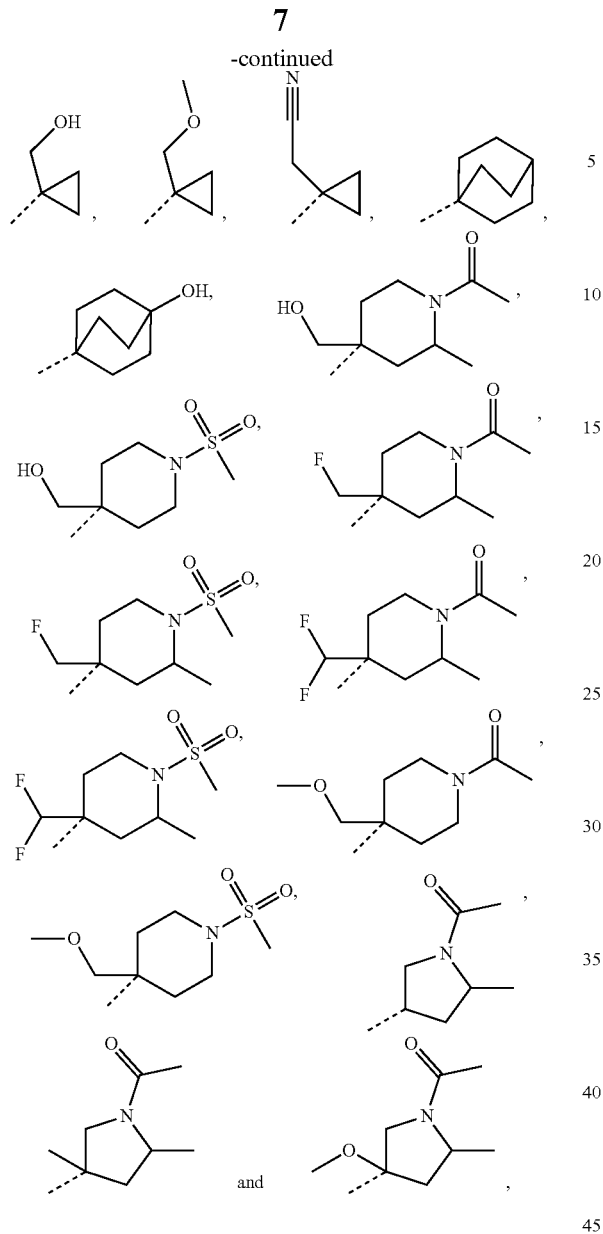

and other variables are as defined in the present disclosure.

In some embodiments of the present disclosure, the $R_4$ is selected from

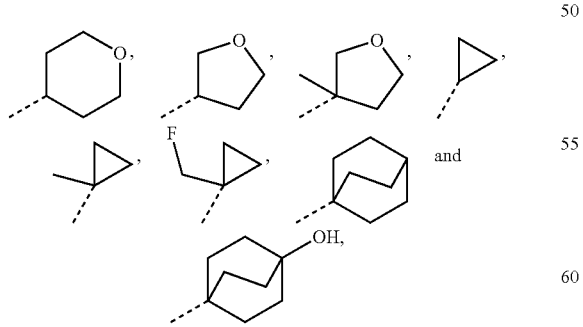

and other variables are as defined in the present disclosure.

In some embodiments of the present disclosure, the ring A is selected from phenyl and thienyl, and other variables are as defined in the present disclosure.

In some embodiments of the present disclosure, the compound is selected from

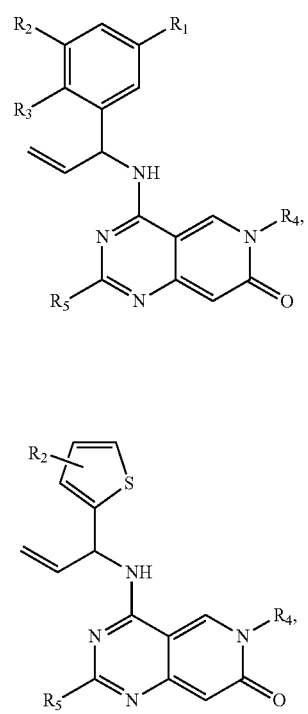

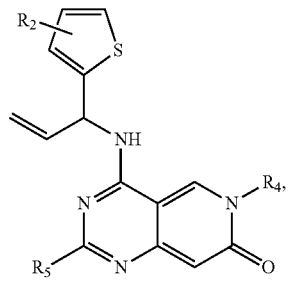

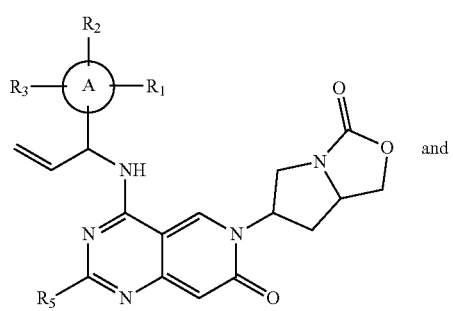

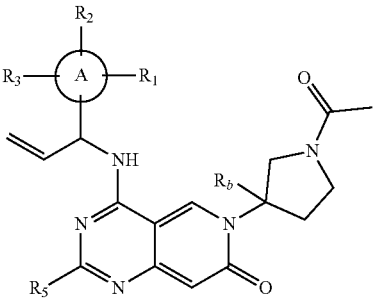

wherein, ring A, $R_1$, $R_2$, $R_3$, $R_4$, $R_5$ and $R_b$ are as defined in the present disclosure.

In some embodiments of the present disclosure, the compound is selected from

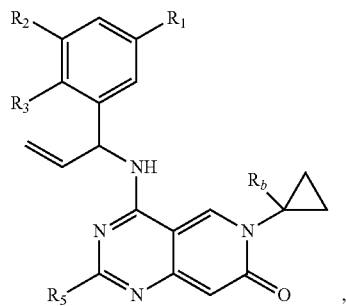
(II-1-a)

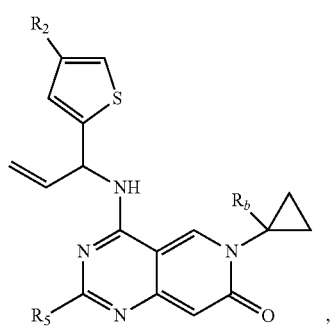
(II-2-a)

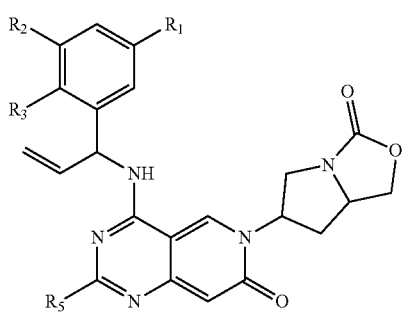
(II-3-a)

and

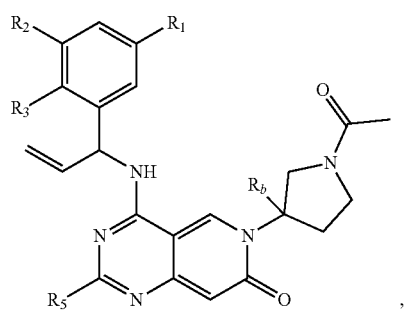
(II-4-a)

wherein, $R_1$, $R_2$, $R_3$, $R_b$ and $R_5$ are as defined in the present disclosure.

In some embodiments of the present disclosure, the compound is selected from

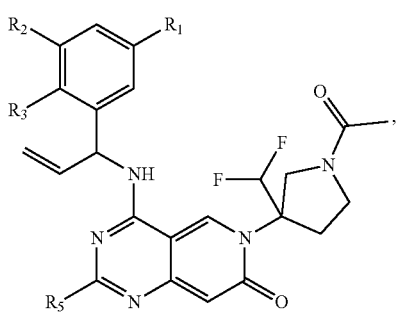
(II-4-b)

wherein, $R_1$, $R_2$, $R_3$ and $R_5$ are as defined in the present disclosure.

In some embodiments of the present disclosure, the compound is selected from

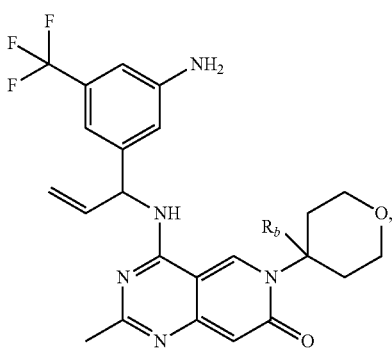
(I-1)

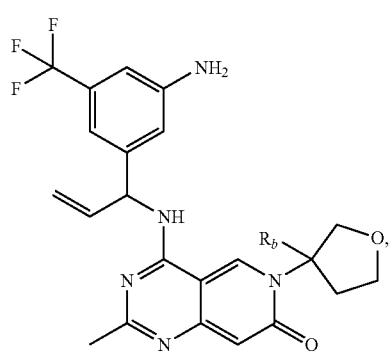
(I-2)

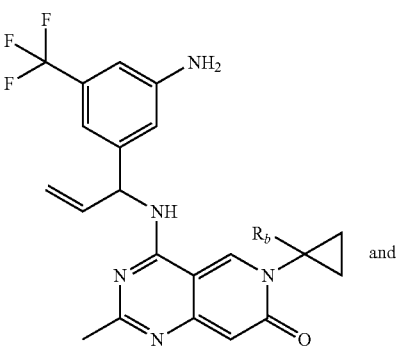
(I-3)

and

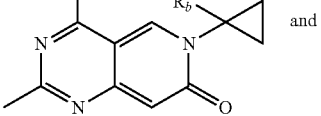

-continued
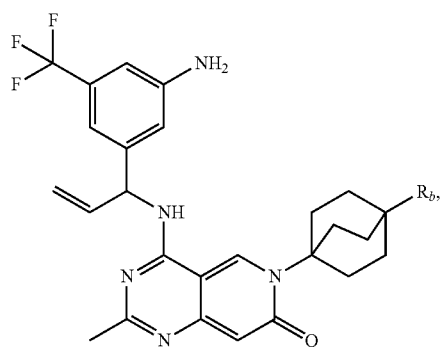
(I-4)
wherein, $R_b$ is as defined in the present disclosure.
The present disclosure also provides a compound or a pharmaceutically acceptable salt thereof, wherein the compound is selected from
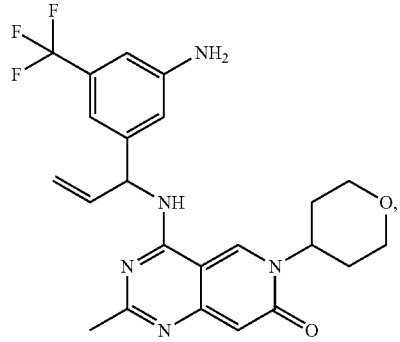
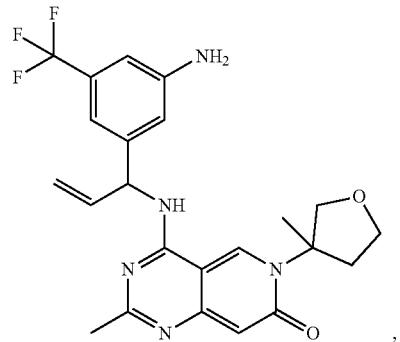
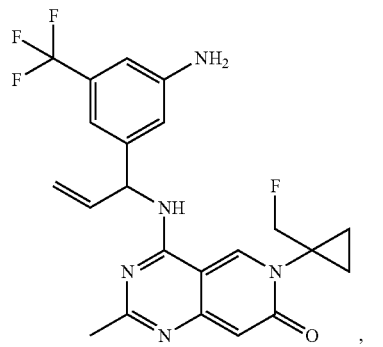
-continued
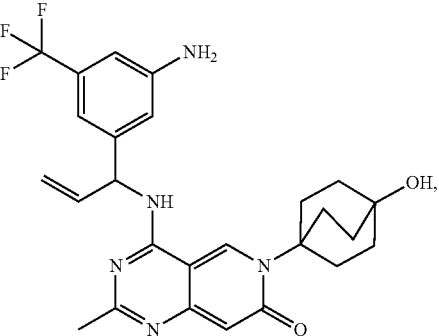
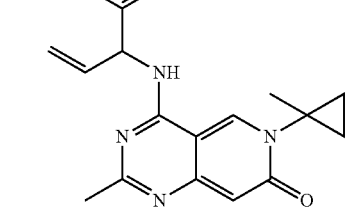
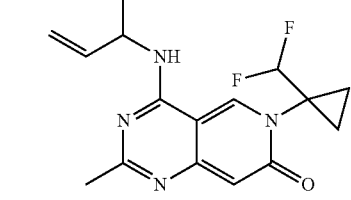
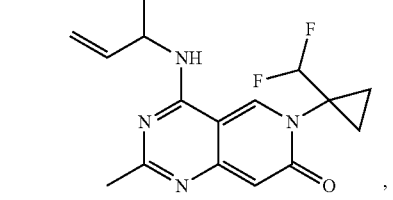
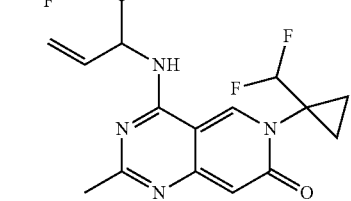

-continued
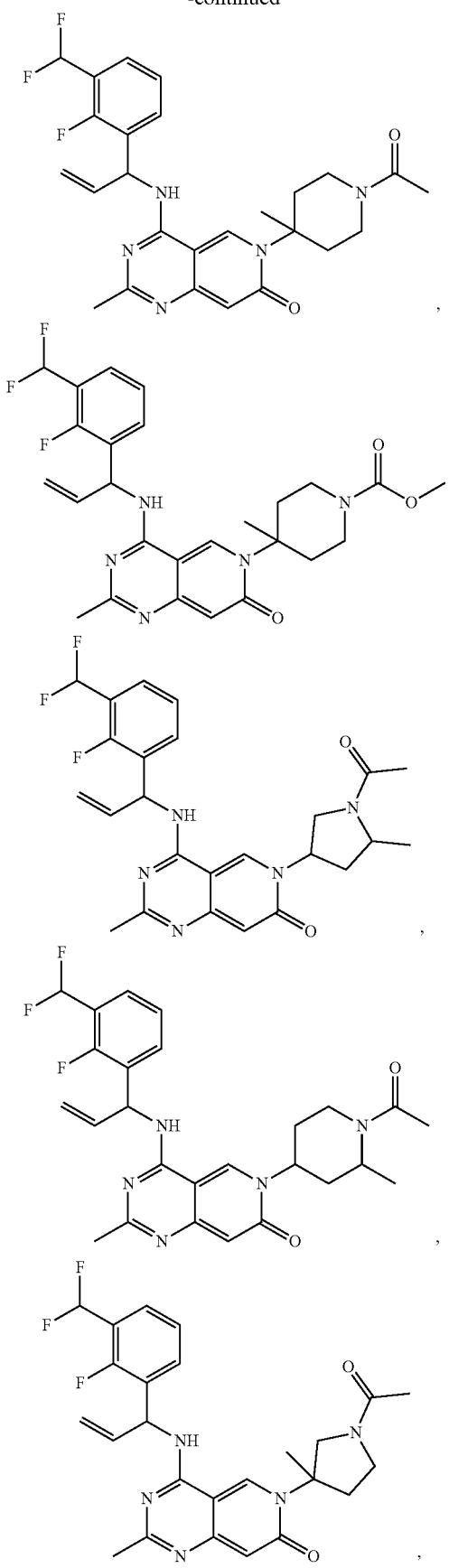
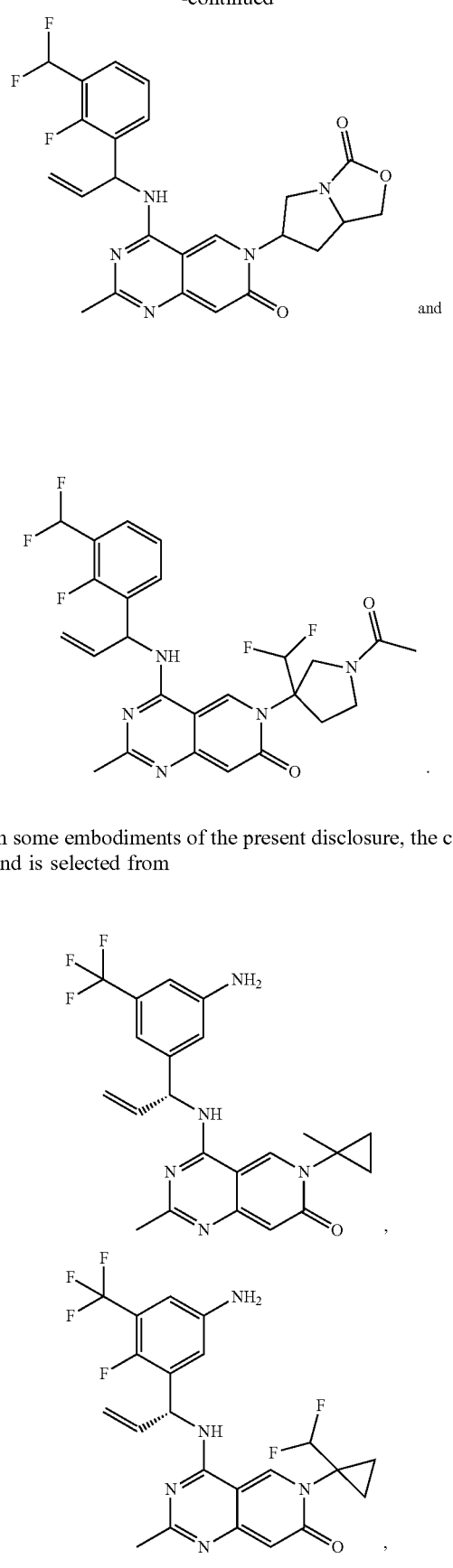
In some embodiments of the present disclosure, the compound is selected from

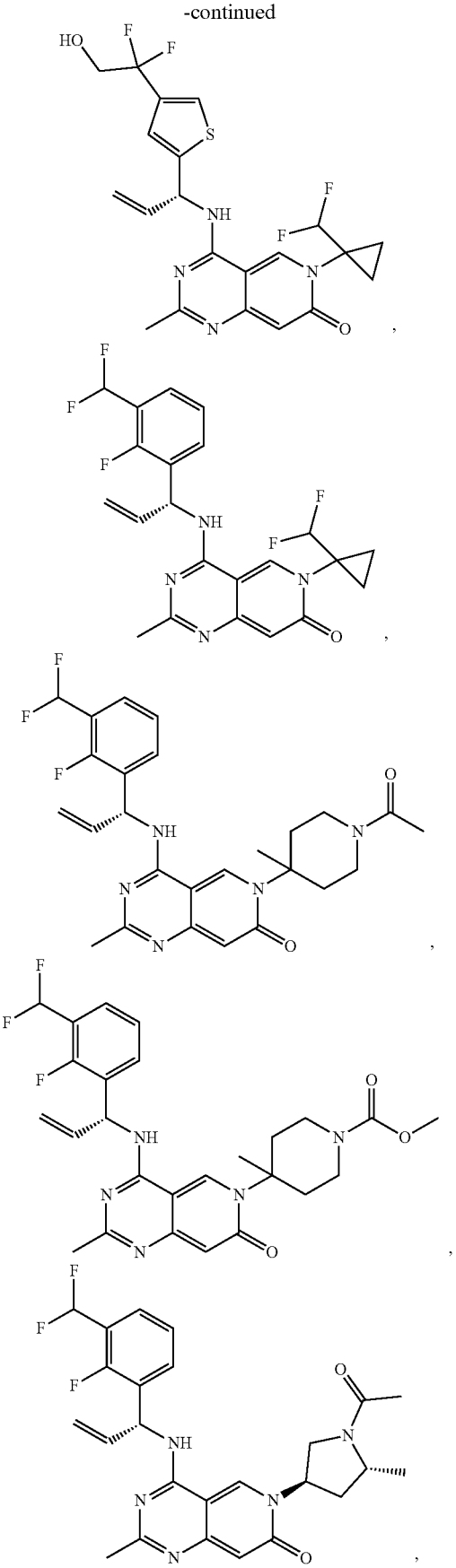
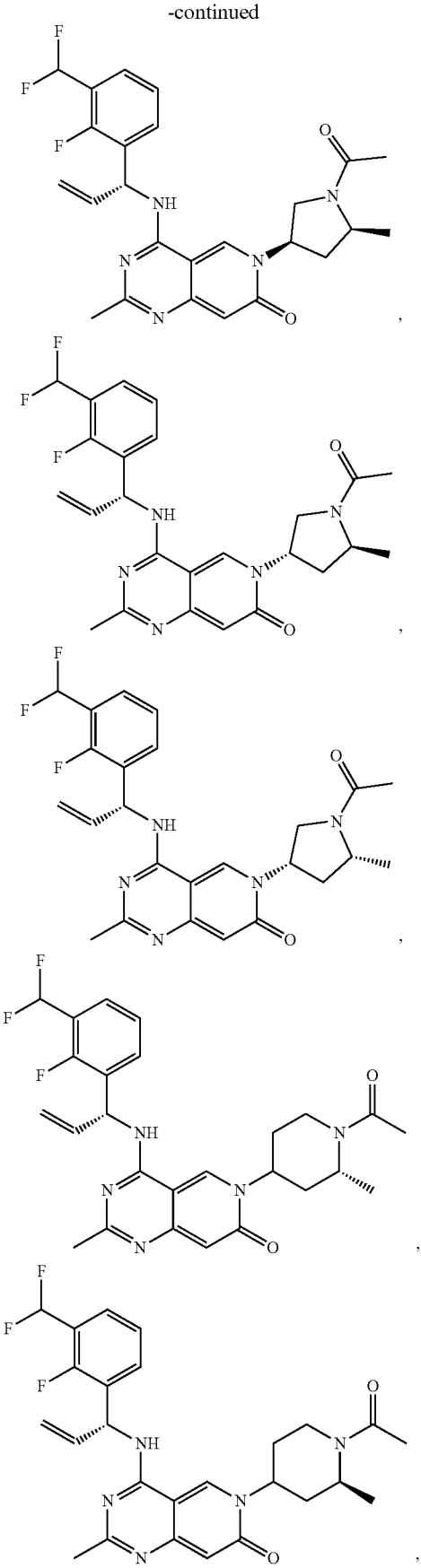

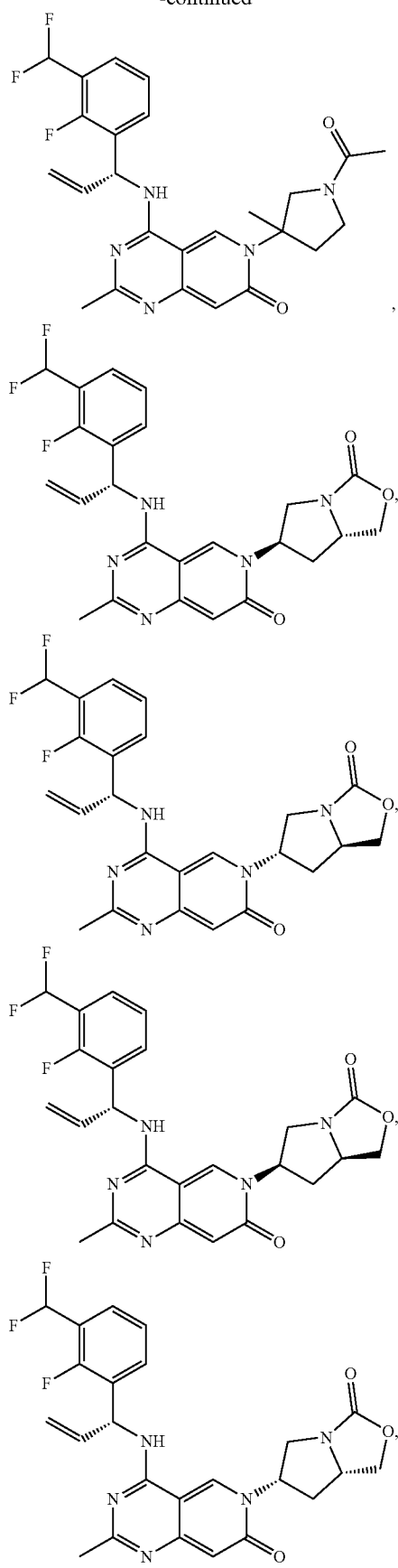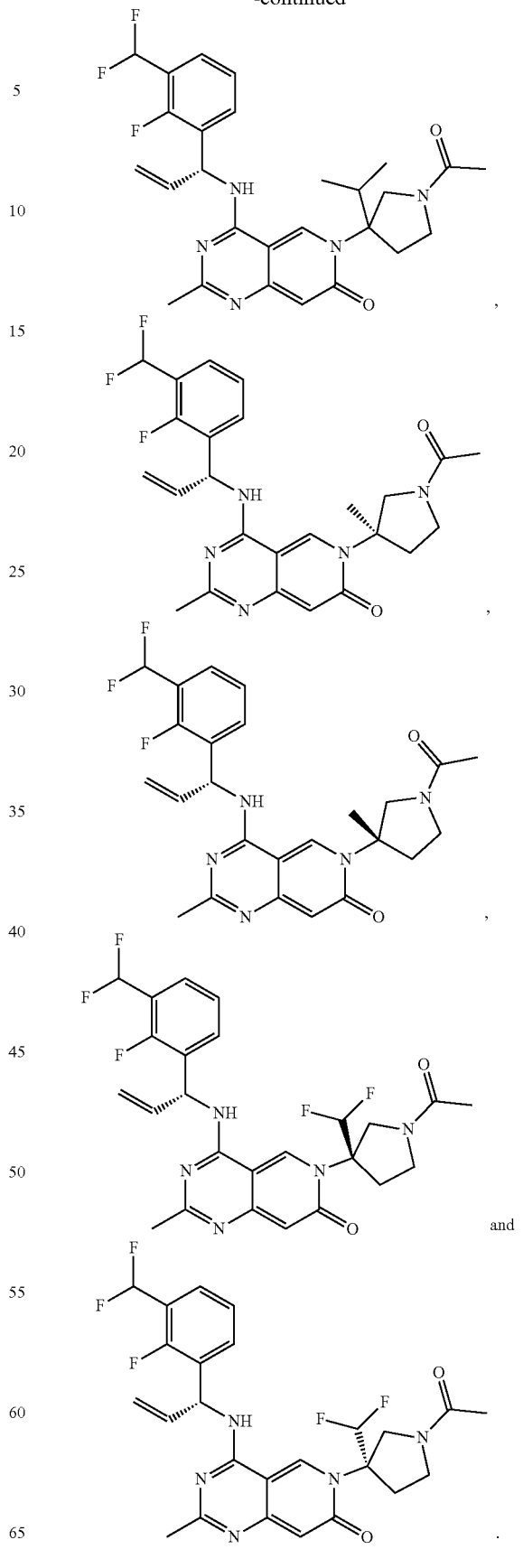

The present disclosure also provides a use of the compound or the pharmaceutically acceptable salt thereof in the manufacture of a medicament for inhibiting SOS1 proteins.

The present disclosure also provides a use of the compound or the pharmaceutically acceptable salt thereof in the manufacture of a medicament for the treatment of lung cancer, pancreatic cancer and/or rectal cancer.

There are also some embodiments of the present disclosure which are obtained by any combination of the above variables.

Technical Effect

The compounds of the present disclosure have good KRAS(G12C)-SOS1 binding inhibitory activity.

Definition and Description

Unless otherwise specified, the following terms and phrases when used herein have the following meanings. A specific term or phrase should not be considered indefinite or unclear in the absence of a particular definition, but should be understood in the ordinary sense. When a trading name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing of the compound into contact with a sufficient amount of base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by bringing the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereomers isomers, (D)-isomers, (L)-isomers, and racemic and other mixtures thereof, such as enantiomers or diastereomeric enriched mixtures, all of which are within the scope of the present disclosure. Additional asymmetric carbon atoms may be present in substituents such as alkyl. All these isomers and their mixtures are included within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and "(±)" refers to racemic.

Unless otherwise specified, the absolute configuration of a stereogenic center is represented by a wedged solid bond (⬩) and a wedged dashed bond (⬩), and the relative configuration of a sterogenic center is represented by a straight solid bond (⬩) and a straight dashed bond (⬩), a wave line (⬩) is used to represent a wedged solid bond (⬩) or a wedged dashed bond (⬩), or the wave line (⬩) is used to represent a straight solid bond (⬩) or a straight dashed bond (⬩).

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

Optically active (R)- and (S)-isomer, or D and L isomer can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to obtain the pure enantiomer. In addition, the enantiomer and the diastereoisomer are generally isolated through chromatography which uses a chiral stationary phase and optionally combines with a chemical derivative method (such as carbamate generated from amine).

Unless otherwise specified, D in the present disclosure refers to deuterium ($^2$H).

The term "optional" or "optionally" means that the subsequent event or condition may occur but not requisite, that the term includes the instance in which the event or condition occurs and the instance in which the event or condition does not occur.

The term "substituted" means one or more than one hydrogen atom(s) on a specific atom are substituted with the substituent, including deuterium and hydrogen variables, as long as the valence of the specific atom is normal and the substituted compound is stable. When the substituent is an oxygen (i.e., =O), it means two hydrogen atoms are substituted.

The term "optionally substituted" means an atom can be substituted with a substituent or not, unless otherwise specified, the type and number of the substituent may be arbitrary as long as is chemically achievable.

When any variable (such as R) occurs in the constitution or structure of the compound more than once, the definition of the variable at each occurrence is independent. Thus, for example, if a group is substituted with 0-2 R, the group can be optionally substituted with up to two R, wherein the definition of R at each occurrence is independent. Moreover, a combination of the substituent and/or the variant thereof is allowed only when the combination results in a stable compound.

When the enumerative substituent does not indicate by which atom it is linked to the group to be substituted, such substituent can be bonded by any atom thereof. For example, when pyridyl acts as a substituent, it can be linked to the group to be substituted by any carbon atom on the pyridine ring.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of the chemical bond linking thereto so as to meet the corresponding valence. The chemical bond between the site and other groups can be represented by a straight solid bond (  ), a straight dashed bond ( ) or a wavy line ( ). For example, the straight solid bond in —OCH$_3$ means that it is linked to other groups through the oxygen atom in the group; the straight dashed bond in means that it is linked to other groups through the two ends of nitrogen atom in the group; the wave line in

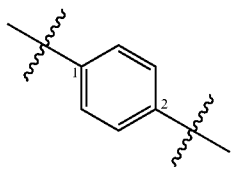 [SMILES: *c1ccc(*)cc1]

means that the phenyl group is linked to other groups through carbon atoms at position 1 and position 2;

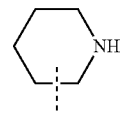

means that it can be linked to other groups through any linkable sites on the piperidinyl by one chemical bond, including at least four types of linkage, including

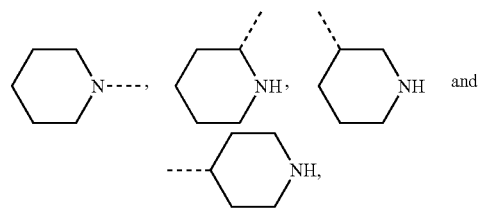

even though the H atom is drawn on the —N—,

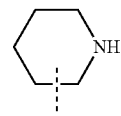

still includes the linkage of

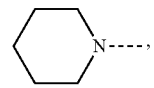

merely when one chemical bond was connected, the H of this site will be reduced by one to the corresponding monovalent piperidinyl.

Unless otherwise specified, the number of atoms in a ring is usually defined as the number of ring members, for example, "5- to 7-membered ring" refers to a "ring" in which 5-7 atoms are arranged around.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl and the like; it can be monovalent (such as methyl), divalent (such as methylene) or multivalent (such as methine). Examples of $C_{1-3}$ alkyl include but are not limited to methyl (Me), ethyl (Et), propyl (including n-propyl and isopropyl) and the like.

Unless otherwise specified, the term "$C_{1-3}$ alkoxy" refers to an alkyl consisting of 1 to 3 carbon atoms that are connected to the rest of the molecule through an oxygen atom. The $C_{1-3}$ alkoxy includes $C_{1-2}$, $C_{2-3}$, $C_3$ and $C_2$ alkoxy and the like. Examples of $C_{1-3}$ alkoxy include, but are not limited to, methoxy, ethoxy, propoxy (including n-propoxy and isopropoxy) and the like.

Unless otherwise specified, the terms "5-membered heteroaryl" and "5-membered heteroaryl ring" in the present disclosure can be used interchangeably, and the term "5-membered heteroaryl" refers to a monocyclic group consisting of 5 ring atoms with a conjugated π-electron system, wherein 1, 2, 3 or 4 ring atoms are heteroatoms independently selected from O, S and N, and the rest are carbon atoms. Where nitrogen atoms are optionally quaternized, and nitrogen and sulfur heteroatoms can be optionally oxidized (i.e., NO and $S(O)_p$, p is 1 or 2). The 5-membered heteroaryl can be connected to the rest of the molecule through a heteroatom or a carbon atom. Examples of the 5-membered heteroaryl include, but are not limited to, pyrrolyl (including N-pyrrolyl, 2-pyrrolyl, 3-pyrrolyl and the like), pyrazolyl (including 2-pyrazolyl, 3-pyrazolyl and the like), imidazolyl (including N-imidazolyl, 2-imidazolyl, 4-imidazolyl, 5-imidazolyl and the like), oxazolyl (including 2-oxazolyl, 4-oxazolyl, 5-oxazolyl and the like), triazolyl (1H-1,2,3-triazolyl, 2H-1,2,3-triazolyl, 1H-1,2,4-triazolyl, 4H-1,2,4-triazolyl and the like), tetrazolyl, isoxazolyl (3-isoxazolyl, 4-isoxazolyl, 5-isoxazolyl and the like), thiazolyl (including 2-thiazolyl, 4-thiazolyl, 5-thiazolyl and the like), furyl (including 2-furyl, 3-furyl and the like), thienyl (including 2-thienyl, 3-thienyl and the like). Unless otherwise specified, "$C_{3-8}$ cycloalkyl" refers to a saturated cyclic hydrocarbon group consisting of 3 to 8 carbon atoms, including monocyclic and bicyclic systems, wherein the bicyclic systems include spiro ring, fused ring and bridged ring. The $C_{3-8}$ cycloalkyl includes $C_{3-6}$, $C_{3-5}$, $C_{4-8}$, $C_{4-6}$, $C_{4-5}$, $C_{5-8}$ or $C_{5-6}$ cycloalkyl and the like; it can be monovalent, divalent or multivalent. Examples of $C_{3-8}$ cycloalkyl include, but are not limited to, cyclopropyl, cyclobutyl, cyclopentyl, cyclohexyl, cycloheptyl, norbornyl, [2.2.2]bicyclooctyl and the like.

Unless otherwise specified, the term "3- to 8-membered heterocycloalkyl" by itself or in combination with other terms refers to a saturated cyclic group consisting of 3 to 8 ring atoms, wherein 1, 2, 3 or 4 ring atoms are heteroatoms independently selected from O, S and N, and the rest are carbon atoms, wherein nitrogen atoms are optionally quaternized, and nitrogen and sulfur heteroatoms can be optionally oxidized (i.e., (=), NO and $S(O)_p$, p is 1 or 2). The 3- to 8-membered heterocycloalkyl includes monocyclic and bicyclic systems, wherein the bicyclic systems include spiro ring, fused ring and bridged ring. In addition, with regard to the "3- to 8-membered heterocycloalkyl", a heteroatom may occupy the connection position of the heterocycloalkyl with the rest of the molecule. The 3- to 8-membered heterocycloalkyl includes 3- to 6-membered, 3- to 5-membered, 4- to 6-membered, 5- to 6-membered, 4-membered, 5-membered, and 6-membered heterocycloalkyl and the like. Examples of 3- to 8-membered heterocycloalkyl include, but are not limited to, azetidinyl, oxetanyl, thietanyl, pyrrolidinyl, pyrazolidinyl, imidazolidinyl, tetrahydrothienyl (including tetrahydrothiophen-2-yl and tetrahydrothiophen-3-yl and the like), tetrahydrofuranyl (including tetrahydrofuran-2-yl and the like), tetrahydropyranyl, piperidinyl (including 1-piperidinyl, 2-piperidinyl and 3-piperidinyl and the like), piperazinyl (including 1-piperazinyl and 2-piperazinyl and the like), morpholinyl (including 3-morpholinyl and 4-morpholinyl and the like), dioxinyl, dithianyl, isoxazolidinyl, isothiazolidinyl, 1,2-oxazinyl, 1,2-thiazinyl, hexahydropyridazinyl, homopiperazinyl, homopiperidinyl or dioxacycloheptyl and the like.

Unless otherwise specified, the term "5- to 6-membered heterocycloalkyl" by itself or in combination with other terms refers to a saturated cyclic group consisting of 5 to 6 ring atoms, wherein 1, 2, 3 or 4 ring atoms are heteroatoms independently selected from O, S and N, and the rest are carbon atoms, wherein nitrogen atoms are optionally quaternized, and nitrogen and sulfur heteroatoms can be optionally oxidized (i.e., (=), NO and $S(O)_p$, p is 1 or 2). The 5- to 6-membered heterocycloalkyl includes monocyclic and bicyclic systems, wherein the bicyclic systems include spiro ring, fused ring and bridged ring. In addition, with regard to the "5- to 6-membered heterocycloalkyl", a heteroatom may occupy the connection position of the heterocycloalkyl with the rest of the molecule. The 5- to 6-membered heterocycloalkyl includes 5-membered and 6-membered heterocycloalkyl. Examples of 5- to 6-membered heterocycloalkyl include, but are not limited to, pyrrolidinyl, pyrazolidinyl, imidazolidinyl, tetrahydrothienyl (including tetrahydrothiophen-2-yl and tetrahydrothiophen-3-yl and the like), tetrahydrofuranyl (including tetrahydrofuran-2-yl and the like), tetrahydropyranyl, piperidinyl (including 1-piperidinyl, 2-piperidinyl and 3-piperidinyl and the like), piperazinyl (including 1-piperazinyl and 2-piperazinyl and the like), morpholinyl (including 3-morpholinyl and 4-morpholinyl and the like), dioxinyl, dithianyl, isoxazolidinyl, isothiazolidinyl, 1,2-oxazinyl, 1,2-thiazinyl, hexahydropyridazinyl, homopiperazinyl or homopiperidinyl and the like.

Unless otherwise specified, $C_{n-n+m}$ or $C_{n-Cn+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$ and $C_{12}$, and any range from n to n+m is also included, for example $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, $C_{9-12}$ and the like; similarly, n-membered to n+m-membered means that the number of atoms on the ring is from n to n+m, for example, 3- to 12-membered ring includes 3-membered ring, 4-membered ring, 5-membered ring, 6-membered ring, 7-membered ring, 8-membered ring, 9-membered ring, 10-membered ring, 11-membered ring, and 12-membered ring, and any range from n to n+m is also included, for example, 3- to 12-membered ring includes 3- to 6-membered ring, 3- to 9-membered ring, 5- to 6-membered ring, 5- to 7-membered ring, 6- to 7-membered ring, 6- to 8-membered ring, and 6- to 10-membered ring and the like.

The compounds of the present disclosure can be prepared by a variety of synthetic methods known to those skilled in the art, including the specific implementations listed below, the implementations formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/scan, and after collecting the relevant data, the crystal structure can be further analyzed by direct method (Shelxs97), so that the absolute configuration can be confirmed.

The solvent used in the present disclosure is commercially available.

The following abbreviations are used in the present disclosure: DMSO refers to dimethyl sulfoxide; DMF refers to N,N-dimethylformamide; DCM refers to dichloromethane; dioxane refers to 1,4-dioxane; Ts refers to 4-methylphenylsulfonyl; BOC refers to tert-butoxycarbonyl, which is a protective group for amino; Cbz refers to benzyloxycarbonyl, which is a protective group for amino; $CO_2$ refers to carbon dioxide; Bar refers to bar, which is a pressure unit; LC-MS refers to liquid chromatography mass spectrometry; HPLC refers to liquid chromatography; mg refers to milligrams; μg refers to micrograms; ng refers to nanograms; μL refers to microliters; mL refers to milliliters; mm refers to millimeters; μm refers to microns; mM refers to millimoles per liter; μM refers to micromoles per liter; nM refers to nanomoles per liter; h refers to hours; min refers to minutes; HPLC refers to high performance liquid chromatography.

The compounds of the present disclosure are named according to the conventional naming principles in the art or by ChemDraw® software, and the commercially available compounds use the supplier catalog names.

DETAILED DESCRIPTION OF THE PREFERRED EMBODIMENTS

Figure 1:
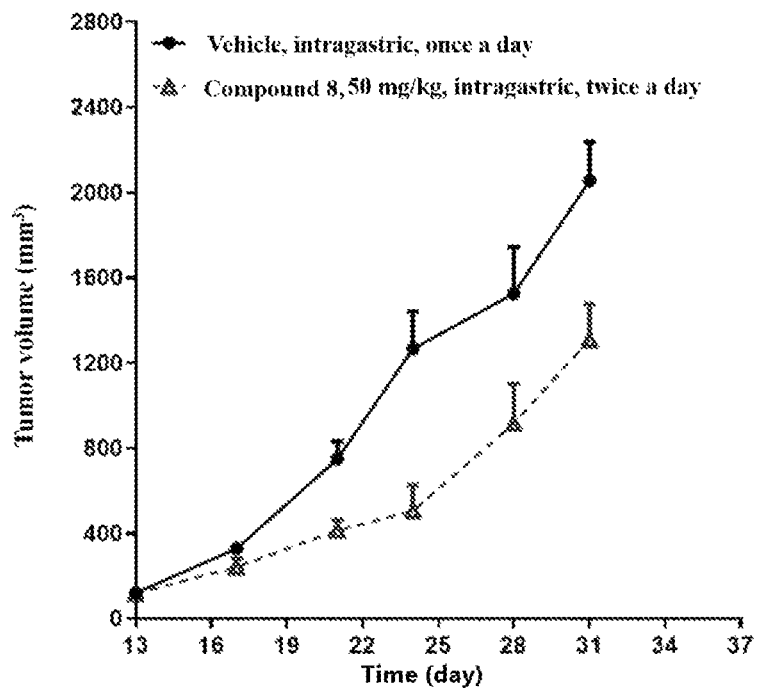
FIG. 1 is a graph of the tumor growth curve.

The following embodiments further illustrate the present disclosure, but the present disclosure is not limited thereto. The compounds of the present disclosure can be prepared by a variety of synthetic methods known to those skilled in the art, including the specific implementations listed below, the implementations formed by their combination with other chemical synthesis methods, and equivalent alternatives known to those skilled in the art, preferred implementations include but are not limited to the embodiments of the present disclosure. It will be apparent to those skilled in the art that various variations and improvements can be made to specific implementations of the present disclosure without departing from the spirit and scope of the present disclosure.

Intermediate AA

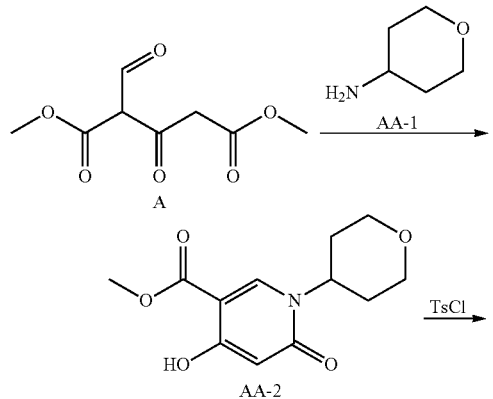

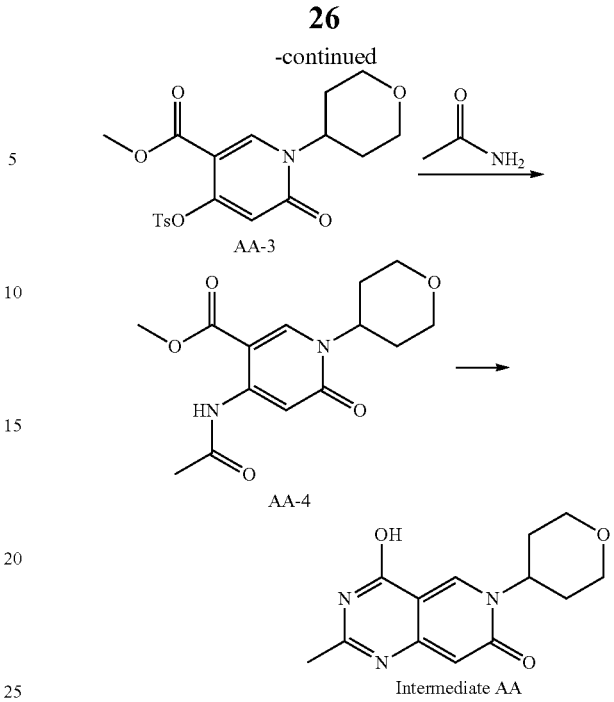

Step A: To a solution of compound A (2.3 g, 11.37 mmol) in methanol (10 mL) was added tetrahydropyran-4-amine (AA-1) (1 g, 9.89 mmol). The reaction mixture was stirred at 25° C. for 12 hours, then sodium methoxide (1.86 g, 11.37 mmol) was added and stirred at 25° C. for further 2 hours. The reaction mixture was quenched by concentrated hydrochloric acid (12 mol/L, 2 mL) and filtered. The filter cake was washed with water (10 mL) and dried under reduced pressure to obtain intermediate AA-2. $^1$H NMR (400 MHz, DMSO-$d_6$) δ=10.81 (s, 1H), 8.26 (s, 1H), 5.72 (s, 1H), 4.81 (tt, J=3.9, 12.0 Hz, 1H), 3.97 (dd, J=3.8, 11.1 Hz, 2H), 3.81 (s, 3H), 3.50-3.39 (m, 2H), 1.90-1.88 (m, 2H), 1.72 (dd, J=2.0, 11.9 Hz, 2H). LC-MS (ESI) m/z: 254.3 [M+H]$^+$.

Step B: To a solution of intermediate AA-2 (800 mg, 3.16 mmol) in acetonitrile (10 mL) were added triethylamine (479.47 mg, 4.74 mmol) and p-toluenesulfonyl chloride (632.35 mg, 3.32 mmol) successively. The reaction mixture was stirred at 25° C. for 2 hours, then filtered. The filter cake was washed with water (10 mL) and dried under vacuum to obtain intermediate AA-3 which was used directly in the next step. $^1$H NMR (400 MHz, DMSO-$d_6$) δ=8.32 (s, 1H), 7.82 (d, J=8.4 Hz, 2H), 7.51 (d, J=8.1 Hz, 2H), 6.01 (s, 1H), 4.77 (tt, J=3.8, 12.0 Hz, 1H), 3.96 (dd, J=3.9, 11.3 Hz, 2H), 3.66 (s, 3H), 3.46 (s, 2H), 2.44 (s, 3H), 1.93-1.91 (m, 2H), 1.73 (d, J=10.0 Hz, 2H). LC-MS (ESI) m/z: 408.2 [M+H]$^+$.

Step C: To a solution of intermediate AA-3 (250 mg, 613.59 μmol) in 1,4-dioxane (2 mL) were added acetamide (26.24 mg, 613.59 μmol), potassium phosphate (143.27 mg, 674.95 mol), 4,5-bis(diphenylphosphino)-9,9-dimethylxanthene (35.50 mg, 61.36 μmol) and di-chlorobis[(1,2,3-)-1-phenyl-2-propenyl]dipalladium(II) (16.08 mg, 30.68 μmol) under nitrogen atmosphere. After the reaction system was replaced with nitrogen three times, the reaction mixture was stirred at 110° C. for 2 hours. After cooling to room temperature, the resulting mixture was concentrated under pressure. The residue was purified by pre-TLC (developing solvent: ethyl acetate/petroleum ether=1/1) to obtain intermediate AA-4. $^1$H NMR (400 MHz, CDCl$_3$) δ=10.80 (s, 1H), 8.26 (s, 1H), 7.74 (s, 1H), 5.12 (tt, J=4.6, 11.7 Hz, 1H), 4.11 (dd, J=4.2, 11.4 Hz, 2H), 3.89 (s, 3H), 3.63-3.48 (m, 2H), 2.21 (s, 3H), 1.89-1.79 (m, 4H). LC-MS (ESI) m/z: 295.1 [M+H]⁺.

Step D: In a sealed tube, the crude of intermediate AA-4 (60 mg) was added to a solution of ammonia in methanol (7 mol/L, 1 mL), and the reaction mixture was stirred at room temperature for 72 hours, then concentrated under reduced pressure. The residue was dissolved in methanol (3 mL) and aqueous of sodium hydroxide (1 mol/L, 2 mL) was added. The reaction mixture was stirred at 50° C. for 30 minutes. After cooling, the reaction mixture was diluted with water (10 mL) and extracted with dichloromethane (40 mL×5). The combined organic phases were dried over anhydrous sodium sulfate. After filtering, the filtrate was concentrated to dryness under reduced pressure to obtain intermediate AA. ¹H NMR (400 MHz, DMSO-$d_6$) δ=11.83 (s, 1H), 8.52 (s, 1H), 6.20 (s, 1H), 5.05-4.86 (m, 1H), 4.00 (dd, J=3.7, 11.4 Hz, 2H), 3.54-3.40 (m, 2H), 2.25 (s, 3H), 1.97-1.95 (m, 2H), 1.83-1.77 (m, 2H). LC-MS (ESI) m/z: 262.2 [M+H]⁺.

The preparation of intermediate AB was referred to the preparation process of intermediate AA, replacing tetrahydropyran-4-amine (AA-1) in step A with 3-methyltetrahydrofuran-3-amine (AB-1). ¹H NMR (400 MHz, CD₃OD) δ=8.63 (s, 1H), 6.34 (s, 1H), 4.44 (d, J=9.4 Hz, 1H), 4.05-3.95 (m, 3H), 2.63-2.50 (m, 2H), 2.35 (s, 3H), 1.68 (s, 3H). LC-MS (ESI) m/z: 262.3 [M+H]⁺.

Intermediate AC

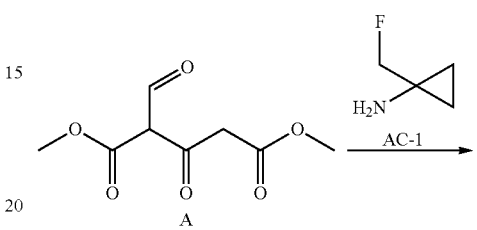

Intermediate AB

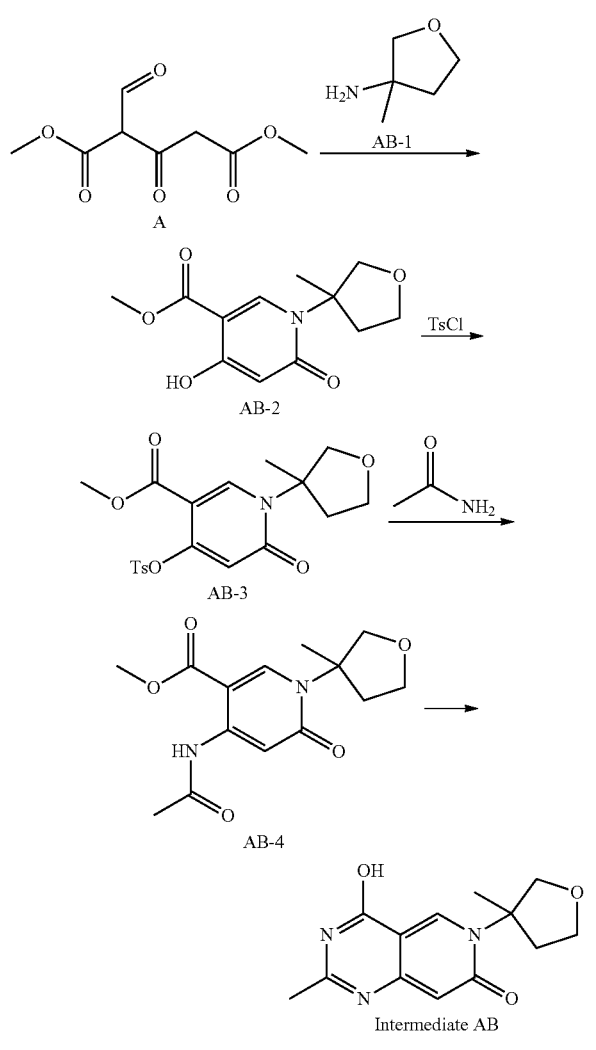

The preparation of intermediate AC was referred to the preparation process of intermediate AA, replacing tetrahydropyran-4-amine (AA-1) in step A with 1-(fluoromethyl)cyclopropanamine (AC-1). ¹H NMR (400 MHz, DMSO-$d_6$) δ=11.83 (br s, 1H), 8.35 (s, 1H), 6.16 (s, 1H), 4.62 (s, 1H), 4.50 (s, 1H), 2.23 (s, 3H), 1.30-1.23 (m, 4H). LC-MS (ESI) m/z: 250.1 [M+H]⁺.

Intermediate AD

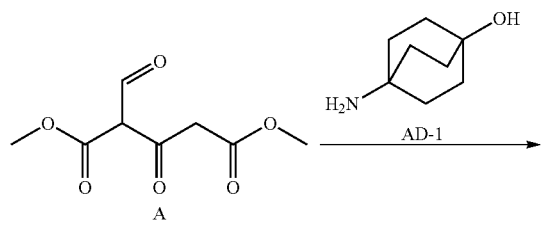

A

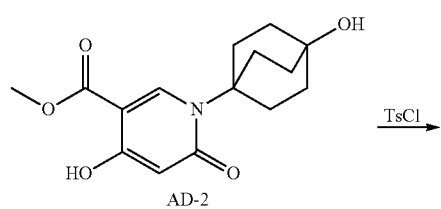

AD-2

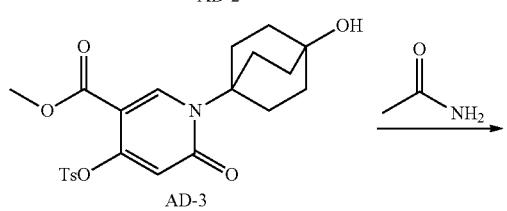

AD-3

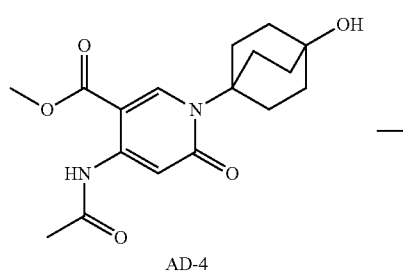

AD-4

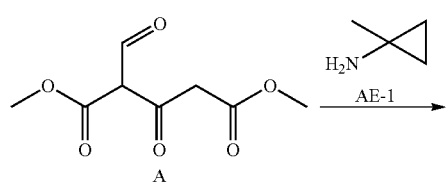

Intermediate AD

The preparation of intermediate AD was referred to the preparation process of intermediate AA, replacing tetrahydropyran-4-amine (AA-1) in step A with 4-aminobicyclo[2.2.2]octan-1-ol (AD-1). $^1$H NMR (400 MHz, CD$_3$OD) δ=8.64 (s, 1H), 6.28 (s, 1H), 2.50-2.46 (m, 6H), 2.33 (s, 3H), 1.94-1.78 (m, 6H). LC-MS (ESI) m/z: 302.1 [M+H]$^+$.

Intermediate AE

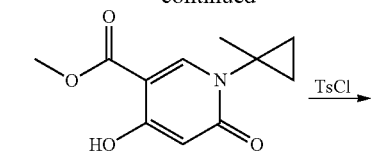

AE-2

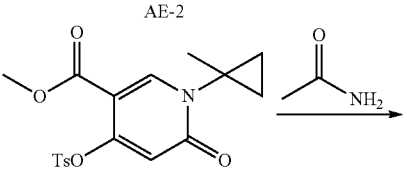

AE-3

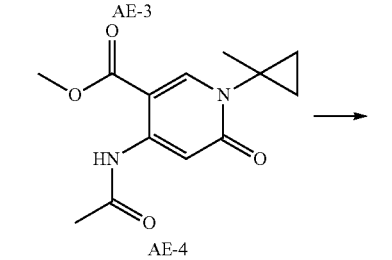

AE-4

Intermediate AE

The preparation of intermediate AE was referred to the preparation process of intermediate AA, replacing tetrahydropyran-4-amine (AA-1) in step A with 1-methylcyclopropanamine (AE-1). $^1$H NMR (400 MHz, CDCl$_3$) δ=10.40-10.12 (m, 1H), 8.52 (s, 1H), 6.45 (s, 1H), 2.36 (s, 3H), 1.52 (s, 3H), 1.05 (dd, J=2.7, 11.6 Hz, 4H). LC-MS (ESI) m/z: 232.2 [M+H]$^+$.

Intermediate AF

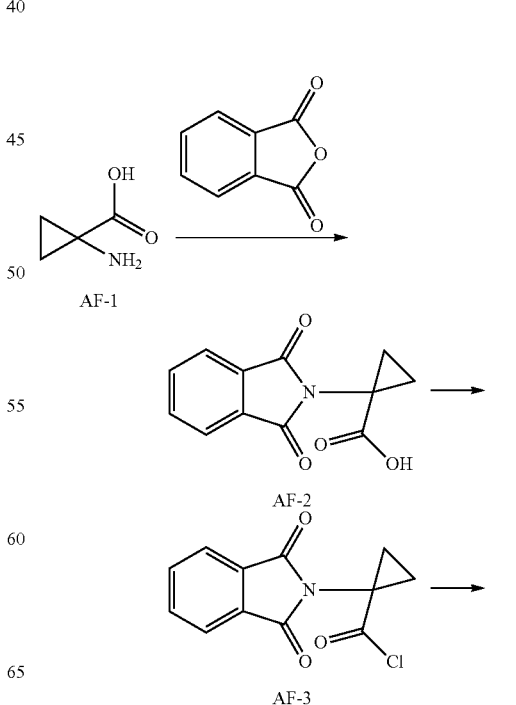

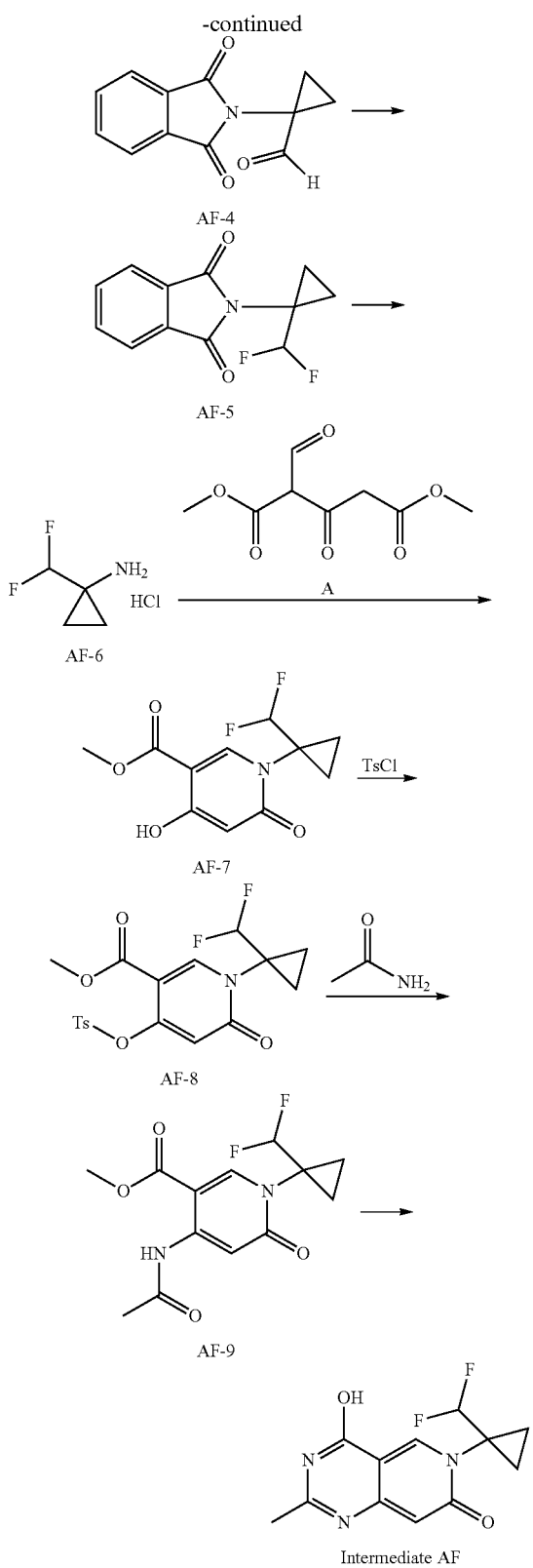

water (200 mL) and stirred at 15° C. for 1 hour. The resulting mixture was filtered, and the filter cake was collected and dried under reduced pressure to obtain AF-2. $^1$H NMR (400 MHz, DMSO-$d_6$) δ=13.60-12.40 (m, 1H), 7.95-7.82 (m, 4H), 1.66-1.59 (m, 2H), 1.47-1.40 (m, 2H).

Step B: To a solution of AF-2 (10 g, 43.25 mmol) in toluene (30 mL) was added N,N-dimethylformamide (158.07 mg, 2.16 mmol) at room temperature, then thionyl chloride (5.40 g, 45.41 mmol) was added slowly. After adding, the reaction mixture was stirred at 110° C. for 3 hours, then concentrated under reduced pressure to remove the solvent to obtain AF-3 which was used directly in the next step.

Step C: AF-3 (20.5 g, 82.12 mmol) and 2,6-dimethylpyridine (10.56 g, 98.54 mmol) were added to tetrahydrofuran (200 mL), then dry palladium on carbon (10%, 1.02 g) was added. The reaction mixture was stirred under 45 psi of hydrogen pressure at 30° C. for 20 hours. Then palladium on carbon (10%, 1.02 g) was added, and the reaction mixture was stirred under 45 psi of hydrogen pressure at 30° C. for further 24 hours. The reaction mixture was filtered, and the filtrate was concentrated under reduced pressure. The residue was purified by column chromatography on silica (eluent: V/V (petroleum ether/ethyl acetate=10/1 to 3/1)+20% dichloromethane) to obtain AF-4. $^1$H NMR (400 MHz, CDCl$_3$) δ=8.88 (s, 1H), 7.89-7.82 (m, 2H), 7.77-7.71 (m, 2H), 1.86-1.79 (m, 2H), 1.72-1.65 (m, 2H).

Step D: AF-4 (7.54 g, 35.04 mmol) was dissolved in dichloromethane (45 mL), then a solution of bis(2-methoxyethyl)aminosulfur trifluoride (18.60 g, 84.09 mmol) in dichloromethane (20 mL) was added dropwise. After adding, the reaction mixture was stirred at 20° C. for 48 hours, then quenched by saturated aqueous of sodium carbonate (100 mL). The resulting mixture was stirred at 10° C. for 1 hour, then water (100 mL) was added. The mixture was extracted with dichloromethane (100 mL×3). The combined organic phases were dried over anhydrous sodium sulfate. After filtering, the filtrate was concentrated under reduced pressure. The residue was purified by column chromatography on silica gel (eluent: V/V petroleum ether/ethyl acetate=15/1 to 10/1) to obtain AF-5. $^1$H NMR (400 MHz, CDCl$_3$) δ=7.88 (dd, J=3.2, 5.6 Hz, 2H), 7.76 (dd, J=3.2, 5.6 Hz, 2H), 6.07-5.69 (m, 1H), 1.47-1.41 (m, 2H), 1.27-1.20 (m, 2H).

Step E: AF-5 (7.1 g, 29.93 mmol) was added to 2-(2-aminoethylamino)ethanol (21.30 mL) and this mixture was stirred at 80° C. for 2 hours, then methanol (150 mL) was added. The reaction mixture was distilled at 90° C. under normal pressure. The distillate was cooled with a dry ice bath. A solution of hydrogen chloride in methanol (4 mol/L, 15 mL) was added into the distillate. The resulting mixture was concentrated under reduced pressure to obtain AF-6. $^1$H NMR (400 MHz, CD$_3$OD) δ=6.04-5.71 (m, 1H), 1.24 (s, 4H).

Step F: AF-6 (4 g, 27.86 mmol) and compound A (6.76 g, 33.43 mmol) were added to methanol (40 mL) followed by a solution of sodium methoxide in methanol (25%, 5.42 g). The reaction mixture was stirred at 10° C. for 17 hours, then a solution of sodium methoxide in methanol (25%, 7.22 g) was added and stirred for further 2 hours. The reaction mixture was concentrated under reduced pressure to remove the methanol, and the residue was acidified with concentrated hydrochloric acid (12 mol/L) to adjust the pH to 6-7. The resulting mixture was diluted with water (100 mL) and extracted with ethyl acetate (100 mL×3). The combined organic phases were dried over anhydrous sodium sulfate. After filtering, the filtrate was concentrated under reduced Step A: To a solution of AF-1 (22.3 g, 220.57 mmol) in glacial acetic acid (200 mL) was added phthalic anhydride (32.67 g, 220.57 mmol). The reaction mixture was stirred at 110° C. for 3 hours. After concentrating under reduced pressure to remove acetic acid, the residue was diluted with pressure. The residue was stirred in methyl tert-butyl ether (100 mL) for 1 hour, then filtered. The filter cake was collected to obtain AF-7. ¹H NMR (400 MHz, DMSO-d₆) δ=10.93 (s, 1H), 8.09 (s, 1H), 6.32-5.98 (m, 1H), 5.68 (s, 1H), 3.80 (s, 3H), 1.41-1.23 (m, 4H).

Step G: To a solution of AF-7 (5.17 g, 19.95 mmol) in acetonitrile (50 mL) were added 4-methylbenzenesulfonyl chloride (4.58 g, 24.02 mmol) and triethylamine (3.03 g, 29.92 mmol). The reaction mixture was stirred at 20° C. for 2 hours, then diluted with water (50 mL) and filtered. The filter cake was washed with water (30 mL×3) and dried under vacuum to obtain AF-8. ¹H NMR (400 MHz, DMSO-d₆) δ=8.15 (s, 1H), 7.84 (d, J=8.4 Hz, 2H), 7.52 (d, J=8.4 Hz, 2H), 6.31-5.98 (m, 2H), 3.67 (s, 3H), 2.44 (s, 3H), 1.43-1.30 (m, 4H).

Step H: The reaction mixture of AF-8 (7.41 g, 17.92 mmol), acetamide (1.06 g, 17.92 mmol), potassium phosphate (4.19 g, 19.72 mmol), di-chlorobis[(1,2,3-)-1-phenyl-2-propenyl]dipalladium(II) (187.90 mg, 358.50 μmol) and Xantphos (414.87 mg, 717.00 μmol) in 1,4-dioxane (35 mL) was stirred at 115° C. for 12 hours under nitrogen atmosphere. After cooling, the reaction mixture was diluted with water (100 mL) and extracted with dichloromethane (100 mL×3). The combined organic phases were dried over anhydrous sodium sulfate. After filtering, the filtrate was concentrated under reduced pressure. The residue was purified by column chromatography on silica gel (eluent: V/V dichloromethane/ethyl acetate=10/1 to 5/1) to obtain AF-9. ¹H NMR (400 MHz, CDCl₃) δ=10.79 (br s, 1H), 8.23 (s, 1H), 7.69 (s, 1H), 6.40-6.03 (m, 1H), 3.89 (s, 3H), 2.21 (s, 3H), 1.57-1.50 (m, 2H), 1.19-1.11 (m, 2H).

Step I: AF-9 (4.22 g, 14.05 mmol) was added to a solution of ammonia in methanol (7 mol/L, 34 mL) and this reaction mixture was stirred at 15° C. for 3 days, then concentrated under reduced pressure. The aqueous of sodium hydroxide (1 mol/L, 30 mL) was added into the residue and the mixture was stirred at 50° C. for 30 minutes. After cooling, the resulting mixture was washed with methyl tert-butyl ether (70 mL×3) and the water phase was acidified with concentrated hydrochloric acid (12 mol/L) to adjust the pH to about 4. After filtering, the filter cake was collected and dried under reduced pressure to obtain intermediate AF. ¹H NMR (400 MHz, DMSO-d₆) δ=11.85 (br s, 1H), 8.36 (s, 1H), 6.38-6.05 (m, 2H), 2.24 (s, 3H), 1.50-1.29 (m, 4H).

Intermediate AG

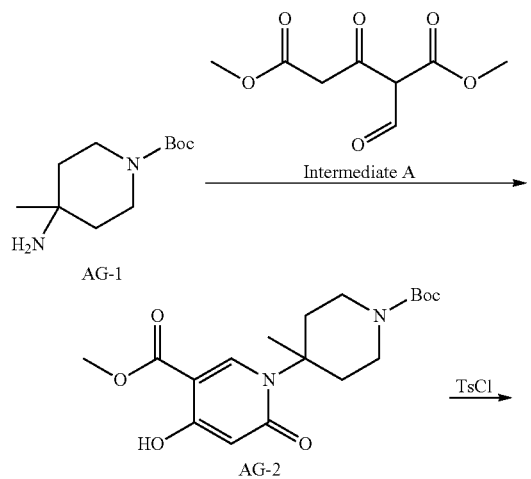

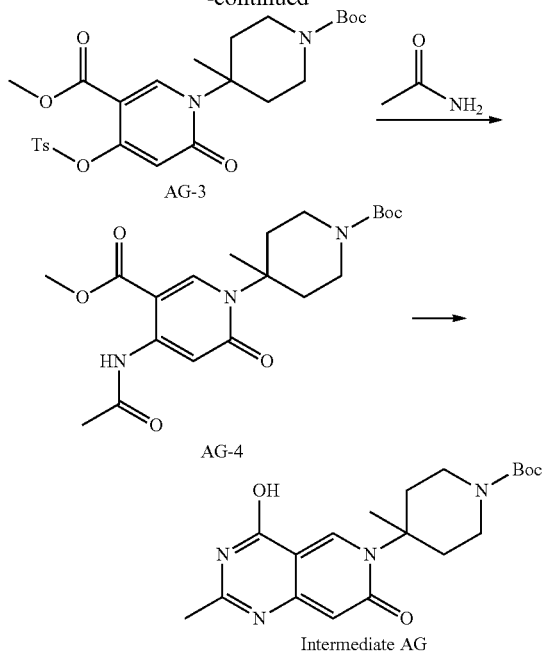

Step A: To a solution of AG-1 (3.00 g, 14.00 mmol) in methanol (30 mL) was added intermediate A (3.40 g, 16.80 mmol) under nitrogen atmosphere. The reaction mixture was stirred at 20° C. for 12 hours, then a solution of sodium methoxide in methanol (3.63 g, 16.80 mmol, mass fraction: 25%) was added and stirred at 20° C. for further 12 hours. The reaction mixture was concentrated under reduced pressure to remove the methanol, and the residue was diluted with water (100 mL) and washed with methyl tert-butyl ether (100 mL×2). The water phase was acidified with hydrochloric acid (1 mol/L) to adjust the pH to 6-7. After filtering, the filtrate was concentrated under reduced pressure to obtain AG-2. ¹H NMR (400 MHz, CDCl₃) δ=10.43 (s, 1H), 8.32-8.22 (m, 1H), 5.88 (s, 1H), 3.94-3.90 (m, 3H), 3.30 (ddd, J=3.4, 9.8, 13.7 Hz, 2H), 1.72 (s, 3H), 1.66 (br s, 5H), 1.46 (s, 9H).

Step B: To a solution of AG-2 (3.15 g, 8.60 mmol) in acetonitrile (32 mL) were added p-toluenesulfonyl chloride (1.97 g, 10.32 mmol) and triethylamine (1.30 g, 12.90 mmol). The reaction mixture was stirred at 20° C. for 2 hours, then concentrated under reduced pressure. The residue was diluted with water (50 mL) and stirred at 20° C. for further 2 hours. After filtering, the filter cake was dried under reduced pressure to obtain AG-3. ¹H NMR (400 MHz, CDCl₃) δ=8.25-8.31 (m, 1H), 7.72-7.84 (m, 2H), 7.31 (d, J=8.13 Hz, 2H), 5.95-6.01 (m, 1H), 3.61-3.73 (m, 2H), 3.15-3.25 (m, 2H), 2.40 (s, 3H), 2.17-2.27 (m, 2H), 2.05-2.16 (m, 2H), 1.59-1.63 (m, 3H), 1.57 (s, 3H), 1.34-1.42 (m, 9H).

Step C: The reaction mixture of AG-3 (1.3 g, 2.50 mmol), acetamide (147.50 mg, 2.50 mmol), potassium phosphate (583.07 mg, 2.75 mmol) and 4,5-bis(diphenylphosphino)-9,9-dimethylxanthene (288.98 mg, 499.43 μmol) in 1,4-dioxane (10 mL) was replaced with nitrogen for 3 times, then allylpalladium(II) chloride dimer (130.88 mg, 249.71 μmol) was added. The reaction mixture was stirred at 110° C. for 4 hours. After cooling, the reaction mixture was diluted with water (30 mL) and extracted with dichloromethane (30 mL×2). The combined organic phase was washed with brine (30 mL) and dried over anhydrous sodium sulfate. After filtering, the filtrate was concentrated under reduced pressure. The residue was purified by column chromatography on silica gel (eluent: V/V dichloromethane/petroleum ether=10/1 to 3/1) to obtain AG-4. LC-MS (ESI) m/z: 408.3 [M+H]⁺.

Step D: AG-4 (0.67 g, 1.64 mmol) was added to a solution of ammonia in methanol (7 mol/L, 50 mL), and the reaction mixture was stirred at 20° C. for 3 days. The reaction mixture was concentrated under reduced pressure and the residue was diluted with sodium hydroxide solution (1 mol/L, 20 mL) and washed with methyl tert-butyl ether (30 mL×3). The water phase was added with concentrated hydrochloric acid to adjust pH to 4 and then filtered under reduced pressure. The filter cake was collected and dried under reduced pressure to obtain intermediate AG. $^1$H NMR (400 MHz, CDCl$_3$) δ=8.64 (s, 1H), 6.60-6.49 (m, 1H), 3.95-3.74 (m, 2H), 3.36-3.26 (m, 2H), 2.49 (s, 3H), 2.40-2.20 (m, 4H), 1.85-1.77 (m, 3H), 1.75 (s, 1H), 1.48 (s, 9H).

Intermediate AH

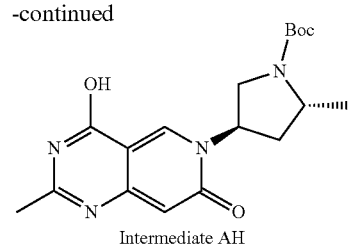

Intermediate AH

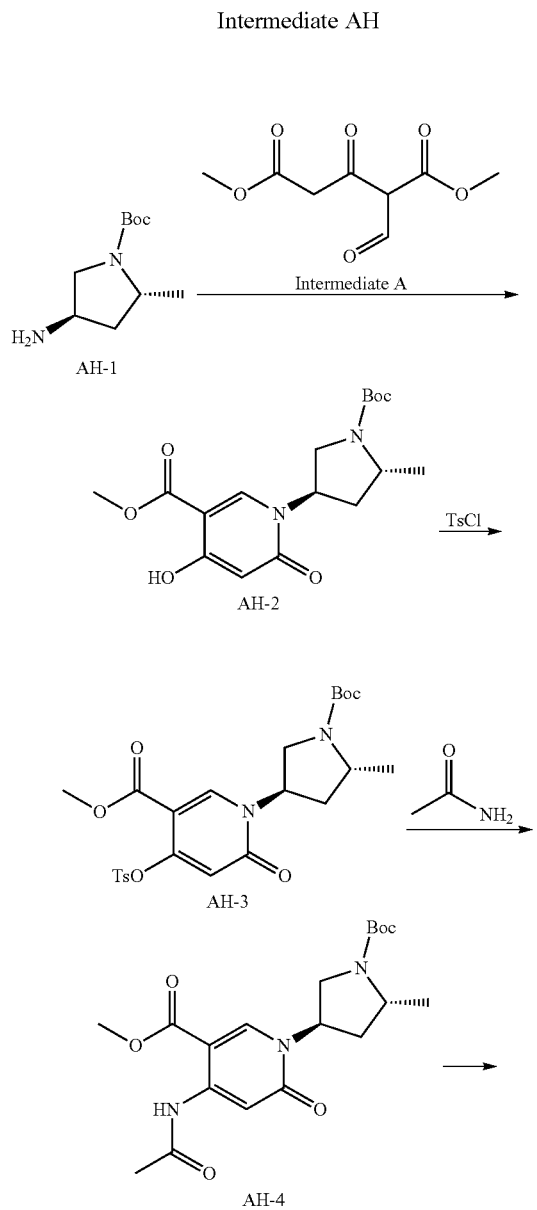

Step A: AH-1 (500 mg, 2.5 mmol) and intermediate A (605.64 mg, 3.0 mmol) were added to methanol (5 mL). The solution of sodium methoxide in methanol (539.49 mg, 3.0 mmol, mass fraction: 30%) was added. The reaction mixture was stirred at 10-20° C. for 12 hours, then acidified with hydrochloric acid (2 mol/L) to adjust the pH to 4-5. The resulting mixture was extracted with dichloromethane (50 mL×2). The combined organic phases were washed with brine (20 mL) and dried over anhydrous sodium sulfate. After filtering, the filtrate was concentrated under reduced pressure to obtain AH-2. $^1$H NMR (400 MHz, CDCl$_3$) δ=10.51 (s, 1H), 7.97 (s, 1H), 5.88 (s, 1H), 3.95-3.86 (m, 1H), 3.83 (s, 3H), 3.81-3.74 (m, 1H), 3.73-3.67 (m, 1H), 3.65-3.60 (m, 1H), 2.21 (m, 1H), 2.08-1.96 (m, 1H), 1.42 (s, 9H), 1.24 (s, 3H).

Step B: To a solution of AH-2 (880 mg, 2.5 mmol) in acetonitrile (10 mL) was added triethylamine (379.05 mg, 12.90 mmol) at 0-10° C. followed by p-toluenesulfonyl chloride (499.91 mg, 2.62 mmol). The reaction mixture was stirred at 20-30° C. for 1 hour and then extracted with dichloromethane (50 mL). The organic phase was washed with brine (20 mL) and dried over anhydrous sodium sulfate. After filtering, the filtrate was concentrated under reduced pressure. The residue was purified by column chromatography on silica gel (eluent: V/V dichloromethane/petroleum ether=10/1 to 2/1) to obtain AH-3. $^1$H NMR (400 MHz, CDCl$_3$) δ=8.13 (br s, 1H), 7.85 (d, J=8.4 Hz, 2H), 7.38 (d, J=8.2 Hz, 2H), 6.14 (s, 1H), 5.50-5.36 (m, 1H), 4.20-4.05 (m, 1H), 3.89-3.77 (m, 4H), 3.50-3.37 (m, 1H), 2.48 (s, 3H), 2.36-2.26 (m, 1H), 2.13-2.06 (m, 1H), 1.48 (s, 9H), 1.31 (d, J=5.0 Hz, 3H).

Step C: To a solution of AH-3 (900 mg, 1.78 mmol) in 1,4-dioxane (10 mL) were added acetamide (110.19 mg, 1.87 mmol), potassium phosphate (414.84 mg, 1.95 mmol), allylpalladium(II) chloride dimer (93.12 mg, 177.67 µmol) and 4,5-bis(diphenylphosphino)-9,9-dimethylxanthene (205.60 mg, 355.33 µmol) successively under nitrogen atmosphere. The reaction mixture was stirred at 110° C. for 2 hours, then after cooling, diluted with ethyl acetate (50 mL). The resulting mixture was filtered, and the filtrate was concentrated under reduced pressure. The residue was purified by column chromatography on silica gel (eluent: V/V/V petroleum ether/ethyl acetate/ethanol=30/3/1 to 9/3/1) to obtain AH-4. $^1$H NMR (400 MHz, CDCl$_3$) δ=10.81 (s, 1H), 8.17 (s, 1H), 7.76 (s, 1H), 5.55-5.44 (m, 1H), 4.17-3.99 (m, 1H), 3.90-3.74 (m, 4H), 3.70-3.42 (m, 1H), 2.35-2.25 (m, 1H), 2.23-2.19 (m, 3H), 2.15-2.02 (m, 1H), 1.48 (s, 9H), 1.38-1.27 (m, 3H).

Step D: AH-4 (510 mg, 1.30 mmol) was added to a solution of ammonia in methanol (7 mol/L, 50 mL), and the reaction mixture was stirred at 20-30° C. for 12 hours. The reaction mixture was concentrated under reduced pressure and the residue was purified by preparative HPLC (chromatographic column: Welch Ultimate XB-CN, 250 mm×50 mm×10 µm; mobile phase: phase A: n-hexane; phase B: 0.1% ammonia ethanol solution, 5%-45%; 15 min) to obtain intermediate AH. $^1$H NMR (400 MHz, CDCl$_3$) δ=11.81 (br s, 1H), 8.49-8.26 (m, 1H), 6.18 (s, 1H), 5.38-5.20 (m, 1H), 3.98 (m, 1H), 3.71 (m, 1H), 3.56 (m, 1H), 2.57-2.53 (m, 1H), 2.24 (s, 3H), 2.07-1.92 (m, 1H), 1.40 (s, 9H), 1.21 (d, J=5.6 Hz, 3H).

Intermediate AI

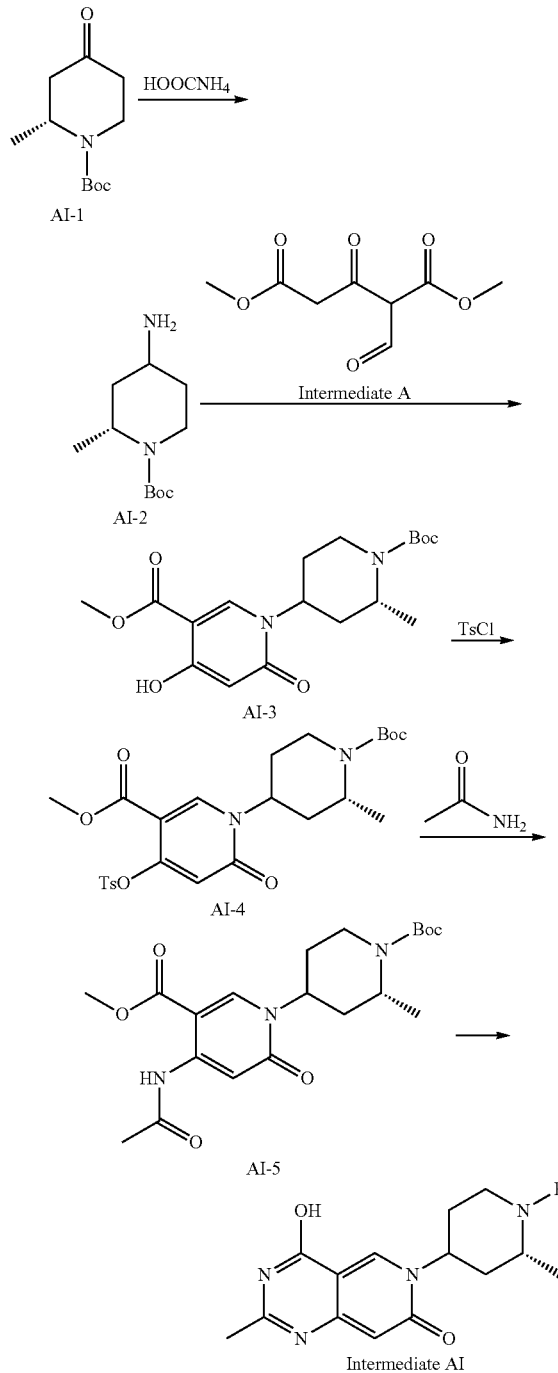

Step A: To a solution of AI-1 (2 g, 9.38 mmol) in methanol (500 mL) were added acetic acid (563.29 mg, 9.38 mmol) and ammonium formate (22.36 g, 354.56 mmol) followed by sodium cyanoborohydride (1.18 g, 18.76 mmol). The reaction mixture was stirred at 20-30° C. for 72 hours, then concentrated under reduced pressure. Ethyl acetate (200 mL) was added to dissolve the residue and this solution was washed with brine (50 mL×2). The organic phase was dried over anhydrous sodium sulfate. After filtering, the filtrate was concentrated under reduced pressure to obtain AI-2. $^1$H NMR (400 MHz, CDCl$_3$) δ=4.12-3.88 (m, 1H), 3.76 (td, J=3.2, 10.8 Hz, 1H), 3.62-3.44 (m, 1H), 3.36-3.23 (m, 1H), 2.34-2.12 (m, 2H), 1.78 (td, J=9.8, 13.0 Hz, 2H), 1.46 (s, 9H), 1.28 (d, J=6.4 Hz, 3H).

Step B: AI-2 (1.4 g, 6.53 mmol) and intermediate A (1.58 g, 7.84 mmol) were added to methanol (20 mL), then a solution of sodium methoxide in methanol (1.69 g, 7.84 mmol, mass fraction: 25%) was added. The reaction mixture was stirred at 10-20° C. for 12 hours, then acidified with hydrochloric acid (2 mol/L) to adjust the pH to 4-5, and extracted with dichloromethane (50 mL×2). The organic phases were combined, washed with brine (20 mL), and dried over anhydrous sodium sulfate. After filtering, the filtrate was concentrated under reduced pressure to obtain AI-3. $^1$H NMR (400 MHz, CDCl$_3$) δ=10.47-10.41 (m, 1H), 8.01 (s, 1H), 5.93-5.82 (m, 1H), 4.96-4.81 (m, 1H), 3.91-3.78 (m, 4H), 3.72-3.59 (m, 1H), 3.52-3.38 (m, 1H), 2.29-2.19 (m, 1H), 1.92-1.83 (m, 1H), 1.81-1.69 (m, 2H), 1.41 (s, 9H), 1.27-1.23 (m, 3H).

Step C: To a solution of AI-3 (1.55 g, 4.23 mmol) in acetonitrile (20 mL) were added triethylamine (642.09 mg, 6.35 mmol) and p-toluenesulfonyl chloride (887.15 mg, 4.65 mmol) at 0-10° C. The reaction mixture was stirred at 20-30° C. for 1 hour and extracted with dichloromethane (50 mL). The organic phase was washed with brine (20 mL), and dried over anhydrous sodium sulfate. After filtering, the filtrate was concentrated under reduced pressure. The residue was purified by column chromatography on silica gel (eluent: V/V dichloromethane/petroleum ether=10/1 to 2/1) to obtain AI-4. $^1$H NMR (400 MHz, CDCl$_3$) δ=8.21-8.16 (m, 1H), 7.89-7.81 (m, 2H), 7.40 (d, J=8.2 Hz, 2H), 6.16-6.05 (m, 1H), 5.27-4.84 (m, 1H), 3.98-3.72 (m, 5H), 3.54-3.39 (m, 1H), 2.49 (s, 3H), 2.40-2.26 (m, 1H), 2.01-1.80 (m, 2H), 1.63-1.57 (m, 1H), 1.50 (s, 9H), 1.33-1.28 (m, 3H).

Step D: The reaction mixture of AI-4 (1.77 g, 3.4 mmol), acetamide (210.87 mg, 3.57 mmol), potassium phosphate (793.87 mg, 3.74 mmol), allylpalladium(II) chloride dimer (178.20 mg, 340.00 µmol) and 4,5-bis(diphenylphosphino)-9,9-dimethylxanthene (393.46 mg, 679.99 µmol) in 1,4-dioxane (20 mL) was stirred at 110° C. for 2 hours under nitrogen atmosphere, then diluted with ethyl acetate (50 mL). After filtering, the filtrate was concentrated under reduced pressure. The residue was purified by column chromatography on silica gel (eluent: V/V/V petroleum ether/ethyl acetate/ethanol=30/10/1 to 9/3/1) to obtain AI-5. $^1$H NMR (400 MHz, CDCl$_3$) δ=10.88-10.66 (m, 1H), 8.28-8.08 (m, 1H), 7.81-7.65 (m, 1H), 5.00-4.83 (m, 1H), 3.93-3.82 (m, 4H), 3.75-3.64 (m, 1H), 3.49 (ddd, J=6.0, 8.6, 14.2 Hz, 1H), 2.36-2.23 (m, 1H), 2.20 (s, 3H), 1.96-1.87 (m, 1H), 1.86-1.75 (m, 1H), 1.67-1.55 (m, 1H), 1.47 (s, 9H), 1.33-1.26 (m, 3H).

Step E: AI-5 (710 mg, 1.74 mmol) was added to a solution of ammonia in methanol (7 mol/L, 20 mL), and the reaction mixture was stirred at 20-30° C. for 12 hours. After the reaction mixture was concentrated under reduced pressure, the residue was purified by preparative HPLC (chromatographic column: Welch Ultimate XB-SiOH, 250 mm×50 mm×10 µm; mobile phase: phase A: n-hexane; phase B: 0.1% ammonia ethanol solution, 1%-30%; 15 min) to obtain intermediate AI. $^1$H NMR (400 MHz, CDCl$_3$) δ=11.81 (br s, 1H), 8.69-8.47 (m, 1H), 6.24-6.07 (m, 1H), 5.19-4.66 (m, 1H), 3.94-3.82 (m, 1H), 3.67 (ddd, J=2.4, 7.2, 13.8 Hz, 1H), 3.47-3.38 (m, 1H), 2.27-2.12 (m, 5H), 1.86 (ddd, J=2.8, 5.8, 12.4 Hz, 1H), 1.72-1.56 (m, 1H), 1.43 (s, 9H), 1.19 (d, J=6.4 Hz, 3H).

Intermediate AJ

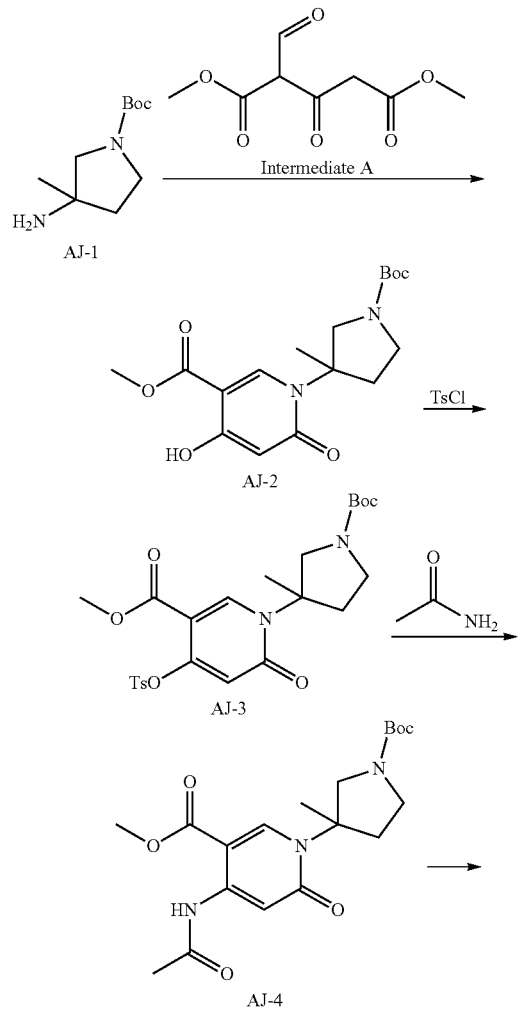

Step A: AJ-1 (0.5 g, 2.5 mmol) and intermediate A (606.15 mg, 3 mmol) were dissolved in methanol (6 mL), then sodium methoxide (620.41 mg, 2.87 mmol) was added. The reaction mixture was stirred at 25° C. for 12 hours, then concentrated under reduced pressure to remove the methanol. The residue was diluted with water (30 mL) and washed with methyl tert-butyl ether (40 mL). The water phase was acidified with 1 mol of hydrochloric acid to adjust the pH to 5-6. The resulting mixture was filtered, and the filtrate was concentrated under reduced pressure to obtain AJ-2. $^1$H NMR (400 MHz, CDCl$_3$) δ=8.13 (s, 1H), 6.02-5.86 (m, 1H), 5.93 (s, 1H), 4.30 (m, 1H), 3.93 (s, 3H), 3.69-3.37 (m, 3H), 2.35 (m, 1H), 1.78 (m, 1H), 1.63 (s, 3H), 1.48 (s, 9H).

Step B: To a solution of AJ-2 (470 mg, 1.33 mmol) in acetonitrile (6 mL) were added p-toluenesulfonyl chloride (254.28 mg, 1.33 mmol) and triethylamine (202.45 mg, 2.0 mmol). The reaction mixture was stirred at 25° C. for 5 hours, then diluted with dichloromethane (60 mL). The mixture was washed with water (20 mL×2) and brine (20 mL×2). The organic phase was dried over anhydrous sodium sulfate. After filtering, the filtrate was concentrated under reduced pressure. The residue was purified by column chromatography on silica gel (eluent: V/V petroleum ether/ethyl acetate=5/1 to 1/1) to obtain AJ-3.

Step C: The reaction mixture of AJ-3 (0.5 g, 987.02 μmol), acetamide (69.96 mg, 1.18 mmol), potassium phosphate (230.47 mg, 1.09 mmol) and 4,5-bis(diphenylphosphino)-9,9-dimethylxanthene (114.22 mg, 197.41 μmol) in 1,4-dioxane (2 mL) was replaced with nitrogen 3 times, then allylpalladium(II) chloride dimer (51.73 mg, 98.70 μmol) was added. The reaction mixture was stirred at 110° C. for 2 hours. After cooling, the reaction mixture was diluted with water (30 mL) and extracted with dichloromethane (30 mL×2). The organic phases were combined, washed with brine (30 mL) and dried over anhydrous sodium sulfate. After filtered, the filtrate was concentrated under reduced pressure. The residue was purified by column chromatography on silica gel (eluent: V/V dichloromethane/petroleum ether=10/1 to 3/1) to obtain AJ-4. $^1$H NMR (400 MHz, CDCl$_3$) δ=10.77 (s, 1H), 8.31-8.17 (m, 1H), 7.70 (s, 1H), 4.37-4.15 (m, 1H), 3.92 (s, 3H), 3.65 (d, J=8.66 Hz, 1H), 3.55-3.39 (m, 2H), 2.42-2.29 (m, 2H), 2.24 (s, 3H), 1.65 (s, 3H), 1.50 (s, 9H).

Step D: AJ-4 (250 mg, 635.43 μmol) was dissolved in a solution of ammonia in methanol (7 mol/L, 1.82 mL), and the reaction mixture was stirred at 20° C. for 3 days, then concentrated under reduced pressure. The residue was diluted with sodium hydroxide solution (1 mol/L, 30 mL) and washed with methyl tert-butyl ether (30 mL×3). The water phase was acidified with hydrochloric acid (2 mol/L) to adjust the pH to about 4, and extracted with dichloromethane (30 mL×2). The organic phases were combined, washed with brine (30 mL) and dried over anhydrous sodium sulfate. After filtering, the filtrate was concentrated under reduced pressure to obtain intermediate AJ. $^1$H NMR (400 MHz, DMSO-d$_6$) δ=11.84 (s, 1H), 8.43 (s, 1H), 6.14 (d, J=4.25 Hz, 1H), 3.49-3.40 (m, 1H), 3.43 (d, J=11.63 Hz, 3H), 2.25 (s, 2H), 1.53 (d, J=4.88 Hz, 3H), 1.42 (s, 12H).

Intermediate AK

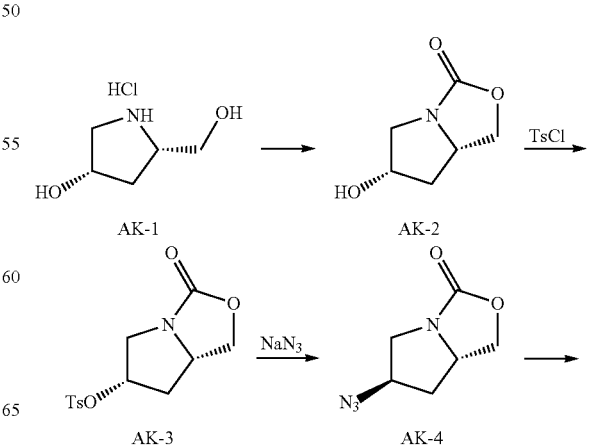

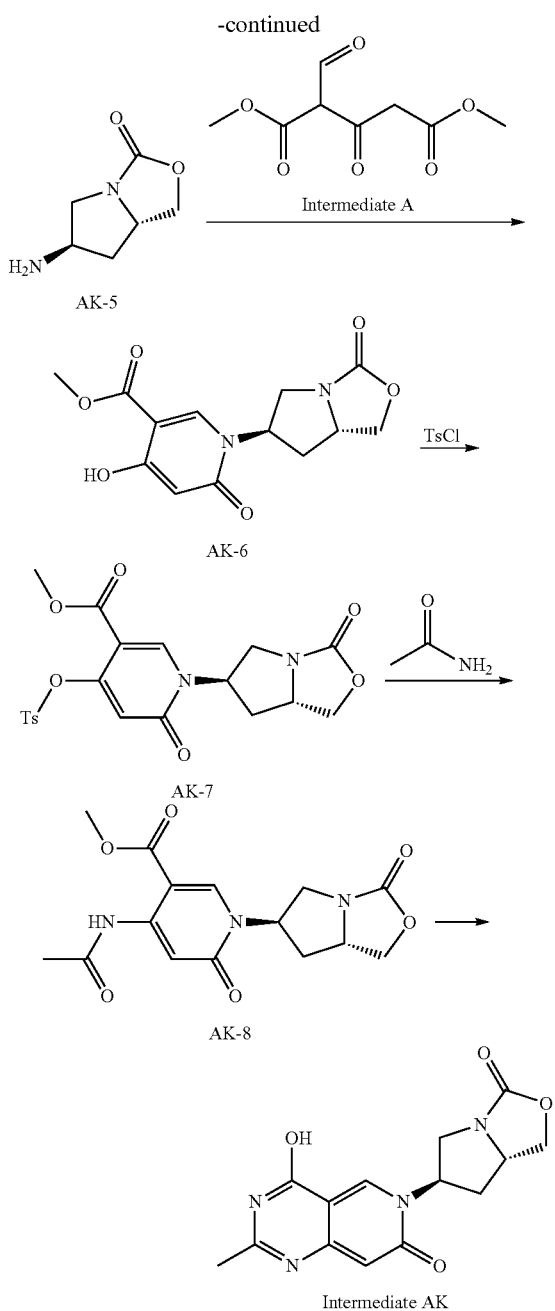

Step A: AK-1 (2.50 g, 16.28 mmol) dissolved in saturated aqueous of sodium bicarbonate (100 mL), then a solution of triphosgene (4.02 g, 13.56 mmol) in toluene (50 mL) was added. After stirring at 25° C. for 12 hours, the reaction mixture was concentrated under reduced pressure. The residue was diluted with methanol (100 mL) and ethyl acetate (100 mL), then fully stirred. The resulting mixture was filtered, and the filtrate was concentrated under reduced pressure to obtain AK-2. $^1$H NMR (DMSO-$d_6$, 400 MHz) δ=4.94 (br s, 1H), 4.50 (t, J=8.4 Hz, 1H), 4.27 (br s, 1H), 4.10-4.00 (m, 2H), 3.41 (s, 1H), 2.99 (dd, J=4.0, 12.0 Hz, 1H), 2.12 (ddd, J=5.2, 8.4, 13.6 Hz, 1H), 1.60-1.50 (m, 1H).

Step B: To a solution of AK-2 (2.30 g, 16.07 mmol) in dichloromethane (60 mL) were added triethylamine (4.88 g, 48.20 mmol), p-toluenesulfonyl chloride (3.37 g, 17.67 mmol) and 4-dimethylaminopyridine (98.15 mg, 0.80 mmol). The reaction mixture was stirred at 25° C. for 12 hours, then diluted with water (40 mL) and extracted with dichloromethane (50 mL×2). The organic phases were combined and dried over anhydrous sodium sulfate. After filtering, the filtrate was concentrated under reduced pressure to obtain AK-3. $^1$H NMR (DMSO-$d_6$, 400 MHz) δ=7.80 (d, J=8.4 Hz, 2H), 7.51 (d, J=8.0 Hz, 2H), 5.2-5.0 (m, 1H), 4.50 (t, J=8.6 Hz, 1H), 4.10-4.00 (m, 2H), 3.60 (d, J=13.2 Hz, 1H), 3.20-3.10 (m, 1H), 2.44 (s, 3H), 2.40-2.30 (m, 1H), 1.81 (ddd, J=2.0, 3.4, 14.8 Hz, 1H).

Step C: AK-3 (3.50 g, 11.77 mmol) was dissolved in N,N-dimethylformamide (60 mL), then sodium azide (2.12 g, 32.61 mmol) was added. The reaction mixture was stirred at 80° C. for 1 hour, diluted with saturated aqueous of sodium carbonate (100 mL), and extracted with ethyl acetate (50 mL×2). The organic phases were combined and the solution was used directly in the next step.

Step D: The solution of AK-4 in ethyl acetate (100 mL) and methanol (30 mL) was replaced with nitrogen, then palladium on carbon (0.20 g, content: 10%) was added. The reaction mixture was stirred at 25° C. for 12 hours under a hydrogen atmosphere. After filtering, the filtrate was concentrated under reduced pressure. The residue was diluted with ethyl acetate (100 mL) and stirred at 30° C. for 30 minutes. The mixture was filtered again, and the filtrate was concentrated under reduced pressure to obtain AK-5. $^1$H NMR (400 MHz, DMSO-$d_6$) δ=4.47 (t, J=8.2 Hz, 1H), 4.22-4.06 (m, 2H), 3.64-3.53 (m, 2H), 2.73-2.61 (m, 1H), 1.80-1.65 (m, 2H), 1.56 (ddd, J=5.8, 8.8, 12.6 Hz, 1H), 1.03 (t, J=7.2 Hz, 1H).

Step E: To a solution of AK-5 (1.6 g, 11.26 mmol) in methanol (20 mL) was added intermediate A (2.5 g, 12.38 mmol). The reaction mixture was stirred for 3 hours, and sodium methoxide (purity: 30%, 2.23 g, 12.38 mmol) was added. After adding, the reaction mixture was stirred at 30° C. for 12 hours, then diluted with water (100 mL) and washed with ethyl acetate (50 mL×2). The water phase was acidified with hydrochloric acid (1 mol/L) to adjust the pH to about 4, and extracted with ethyl acetate (100 mL×3). The combined organic phases were washed with brine (200 mL), and dried over anhydrous sodium sulfate. The resulting mixture was filtered, and the filtrate was concentrated under reduced pressure to obtain AK-6.

Step F: To a solution of AK-6 (2.4 g, 8.16 mmol) in acetonitrile (60 mL) were added p-toluenesulfonyl chloride (1.71 g, 8.97 mmol) and triethylamine (1.24 g, 12.23 mmol, 1.7 mL). The reaction mixture was stirred at 30° C. for 14 hours, then concentrated under reduced pressure. The residue was stirred in the mixed solvent of methyl tert-butyl ether (40 mL) and water (40 mL) for 30 minutes. After filtering, the filter cake was collected and dried under reduced pressure to obtain AK-7. $^1$H NMR (400 MHz, CDCl$_3$) δ=8.16 (s, 1H), 7.88 (d, J=8.4 Hz, 2H), 7.41 (d, J=8.4 Hz, 2H), 6.17 (s, 1H), 4.96-4.82 (m, 1H), 4.66-4.50 (m, 2H), 4.31-4.18 (m, 2H), 3.91-3.83 (m, 3H), 3.43 (dd, J=5.6, 12.7 Hz, 1H), 2.51 (s, 3H), 2.47-2.35 (m, 1H), 2.10 (td, J=9.6, 13.8 Hz, 1H).

Step G: The reaction mixture of AK-7 (250 mg, 557.48 µmol), acetamide (32.93 mg, 557.48 µmol), potassium phosphate (130.17 mg, 613.23 µmol), 4,5-bis(diphenylphosphino)-9,9-dimethylxanthene (9.68 mg, 16.72 µmol) and allylpalladium(II) chloride dimer (4.38 mg, 8.36 µmol) in 1,4-dioxane (2 mL) was stirred at 110° C. for 24 hours under nitrogen atmosphere. After cooling, the reaction mixture was diluted with water (40 mL) and extracted with ethyl acetate (30 mL×2). The combined organic phases were dried over anhydrous sodium sulfate and filtered. The filtrate was concentrated under reduced pressure and the residue was purified by column chromatography on silica gel (eluent: ethyl acetate) to obtain AK-8. $^1$H NMR (400 MHz, CDCl$_3$) δ=10.81 (br s, 1H), 8.21 (s, 1H), 7.76 (s, 1H), 4.81-4.70 (m, 1H), 4.68-4.53 (m, 2H), 4.26-4.11 (m, 2H), 3.92 (s, 3H), 3.58-3.41 (m, 1H), 2.48 (ddd, J=2.4, 6.6, 13.6 Hz, 1H), 2.25 (s, 3H), 2.12-1.96 (m, 1H).

Step H: AK-8 (110 mg, 635.43 μmol) was dissolved in a solution of ammonia in methanol (7 mol/L, 20 mL), and the reaction mixture was stirred at 20° C. for 3 days. After the reaction mixture was concentrated under reduced pressure, the residue was diluted with sodium hydroxide solution (1 mol/L, 30 mL) and washed with methyl tert-butyl ether (30 mL×3). The water phase was acidified with hydrochloric acid (2 mol/L) to adjust the pH to about 4, and then extracted with dichloromethane (30 mL×2). The organic phases were combined, washed with brine (30 mL) and dried over anhydrous sodium sulfate. After filtering, the filtrate was concentrated under reduced pressure to obtain intermediate AK. LC-MS (ESI) m/z: 303.1 [M+H]$^+$.

Intermediate AL

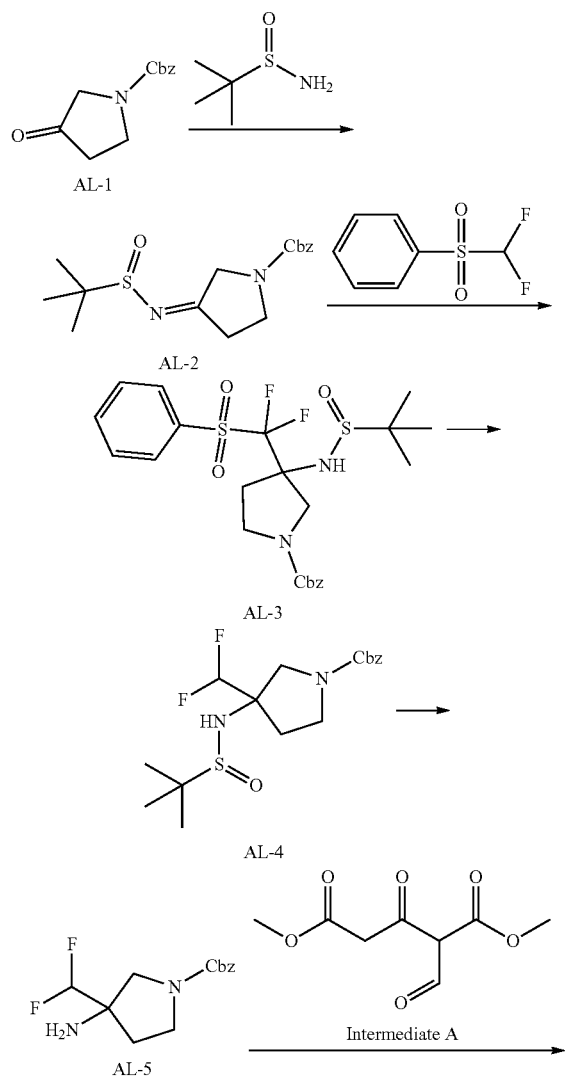

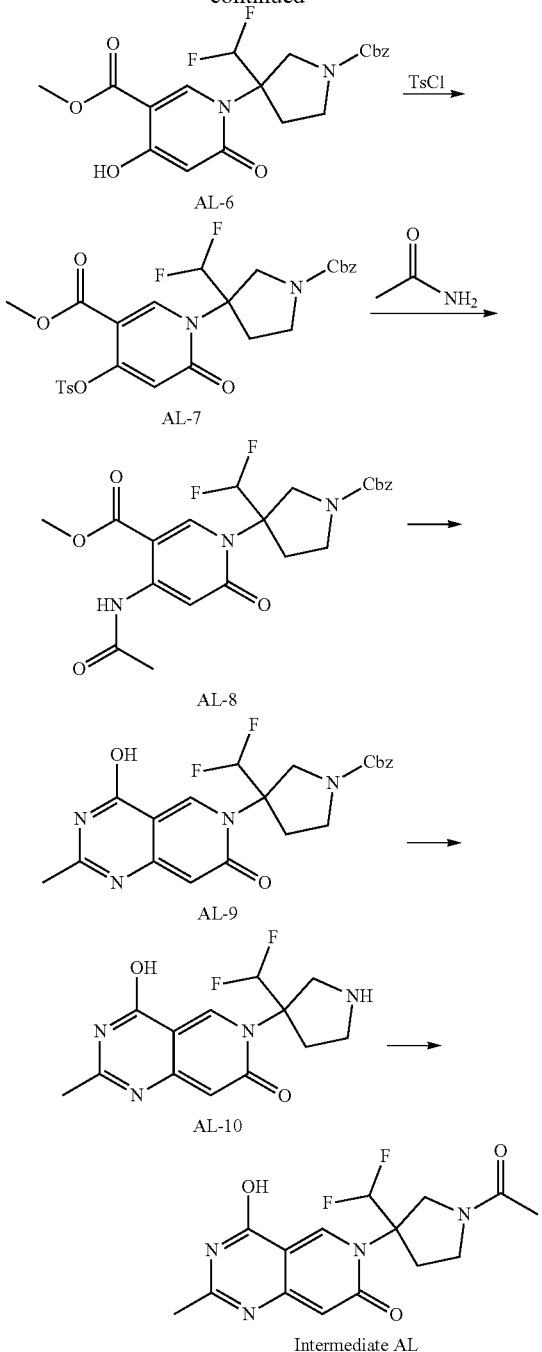

Step A: To a solution of AL-1 (15 g, 68.42 mmol) in dichloromethane (100 mL) was added tetraethyl titanate (46.82 g, 205.26 mmol, 42.56 mL). The reaction mixture was stirred at 30° C. for 12 hours, then quenched by saturated aqueous of sodium bicarbonate (200 mL) slowly and stirred for 30 minutes. After filtering, the filter cake was washed with dichloromethane (100 mL×2). The organic phase was separated and concentrated under reduced pressure. The residue was purified by column chromatography on silica gel (eluent: V/V petroleum ether/ethyl acetate=10/1 to 3/1) to obtain AL-2.

Step B: AL-2 (3.36 g, 10.41 mmol) and difluoromethyl phenyl sulfone (2 g, 10.41 mmol) were added to tetrahydrofuran (30 mL), cooled to −78° C. under the protection of nitrogen, then lithium bis(trimethylsilyl)amide (1 mol/L, 20.81 mL) was added dropwise. After adding, the reaction mixture was stirred at −78° C. for 1 hour, then quenched by water (50 mL) and extracted with ethyl acetate (50 mL×2). The combined organic phases were dried over anhydrous sodium sulfate and filtered. The filtrate was concentrated under reduced pressure and the residue was purified by column chromatography on silica gel (eluent: V/V petroleum ether/ethyl acetate=1/1) to obtain AL-3. LC-MS (ESI) m/z: 515.1 [M+H]$^+$.

Step C: To a solution of AL-3 (500 mg, 971.62 µmol) in N,N-dimethylformamide (10 mL) were added sodium acetate (6.38 g, 77.73 mmol) and acetic acid (10 mL). Then magnesium powder (472.30 mg, 19.43 mmol) was added in portion wise. After adding, the reaction mixture was stirred at 25° C. for 4 hours. After filtering, the filtrate was adjusted to the pH of about 7 with saturated aqueous of sodium bicarbonate solution, and extracted with ethyl acetate (30 mL×2). The combined organic phases were dried over anhydrous sodium sulfate and filtered. The filtrate was concentrated under reduced pressure to obtain a crude of AL-4 which was used directly in the next step.

Step D: The crude of AL-4 (188 mg) was dissolved in tetrahydrofuran (2 mL). A solution of hydrogen chloride in dioxane (4 mol/L, 250 µL) was added. The reaction mixture was stirred at 25° C. for 1 hour, then concentrated under pressure. The residue was washed with methyl tert-butyl ether (2 mL) and petroleum ether (2 mL). The solid was dried under reduced pressure to obtain AL-5. $^1$H NMR (400 MHz, DMSO-d$_6$) δ=9.29 (s, 2H), 7.51-7.27 (m, 5H), 6.68-6.25 (m, 1H), 5.17-5.05 (m, 2H), 3.76-3.47 (m, 4H), 2.38-2.06 (m, 2H).

Step E: To a solution of AL-5 (100 mg, 326 µmol) in methanol (3 mL) were added intermediate A (75.79 mg, 374.92 µmol) and sodium methoxide (purity: 25%, 70.45 mg, 326 mol). The reaction mixture was stirred at 25° C. for 12 hours, then diluted with water (20 mL). The resulting mixture was washed with ethyl acetate (20 mL×2) and the water phase was acidified with hydrochloric acid (1 mol/L) to adjust the pH to about 4, and then extracted with ethyl acetate (20 mL×3). The combined organic phases were washed with brine (20 mL) and dried over anhydrous sodium sulfate. After filtering, the filtrate was concentrated under reduced pressure to obtain AL-6.

Step F: To a solution of AL-6 (250 mg, 591.88 µmol) in acetonitrile (5 mL) were added p-toluenesulfonyl chloride (124.13 mg, 651.07 µmol) and triethylamine (119.40 mg, 1.18 mmol). The reaction mixture was stirred at 30° C. for 14 hours, then diluted with water (20 mL) and extracted with ethyl acetate (15 mL×2). The combined organic phase was dried over anhydrous sodium sulfate and filtered. The filtrate was concentrated under pressure and the residue was purified by pre-TLC (developing solvent: V/V petroleum ether/ethyl acetate=2/1) to obtain AL-7.

Step G: The reaction mixture of AL-7 (300 mg, 520.32 µmol), acetamide (30.74 mg, 520.32 µmol), potassium phosphate (132.54 mg, 624.38 µmol), 4,5-bis(diphenylphosphino)-9,9-dimethylxanthene (15.06 mg, 26.02 µmol) and allylpalladium(II) chloride dimer (13.64 mg, 26.02 µmol) in 1,4-dioxane (3 mL) was stirred at 110° C. for 24 hours under nitrogen atmosphere. After cooling, the reaction mixture was diluted with water (40 mL) and extracted with ethyl acetate (30 mL×2). The organic phases were combined, dried over anhydrous sodium sulfate and filtered. The filtrate was concentrated under reduced pressure and the residue was purified by pre-TLC (developing solvent: ethyl acetate) to obtain AL-8. LC-MS (ESI) m/z: 464.2 [M+H]$^+$.

Step H: AL-8 (160 mg, 345.25 µmol) was dissolved in a solution of ammonia in methanol (7 mol/L, 10 mL), and the reaction mixture was stirred at 20° C. for 18 hours. After the reaction mixture was concentrated under reduced pressure, the residue was diluted with sodium hydroxide solution (1 mol/L, 20 mL) and washed with methyl tert-butyl ether (30 mL×3). The water phase was acidified with hydrochloric acid (2 mol/L) to adjust the pH to about 4, and extracted with dichloromethane (30 mL×2). The organic phases were combined, washed with brine (30 mL), dried over anhydrous sodium sulfate and filtered. The filtrate was concentrated under reduced pressure to obtain AL-9. LC-MS (ESI) m/z: 431.2 [M+H]$^+$.

Step I: AL-9 (120 mg, 278.81 µmol) was dissolved in dichloromethane (5 mL). A solution of hydrobromic acid in acetic acid (250 µL) was added. The reaction mixture was stirred at 25° C. for 5 hours and quenched by methanol (1 mL), then concentrated under reduced pressure. The residue was washed with petroleum ether (5 mL×2) and dried under reduced pressure to obtain AL-10.

Step J: To a solution of AL-10 (60 mg, 202.52 µmol) in tetrahydrofuran (3 mL) was added triethylamine (40.91 mg, 405.04 µmol). The mixture was cooled to 0° C. and the solution of acetyl chloride in tetrahydrofuran was added dropwise (prepared by acetyl chloride (15.90 mg, 202.52 µmol) in tetrahydrofuran (0.5 mL)). After adding, the reaction mixture was stirred at 0° C. for 2 hours, then diluted with saturated aqueous of sodium bicarbonate (5 mL). The resulting mixture was extracted with ethyl acetate (15 mL×2) and the combined organic phase was dried over anhydrous sodium sulfate. After filtering, the filtrate was concentrated under reduced pressure and the residue was purified by pre-TLC (developing solvent: ethyl acetate) to obtain intermediate AL. LC-MS (ESI) m/z: 339.1 [M+H]$^+$.

Intermediate B

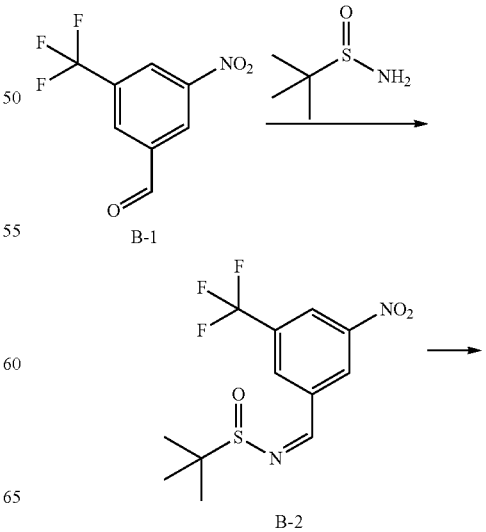

B-1

B-2

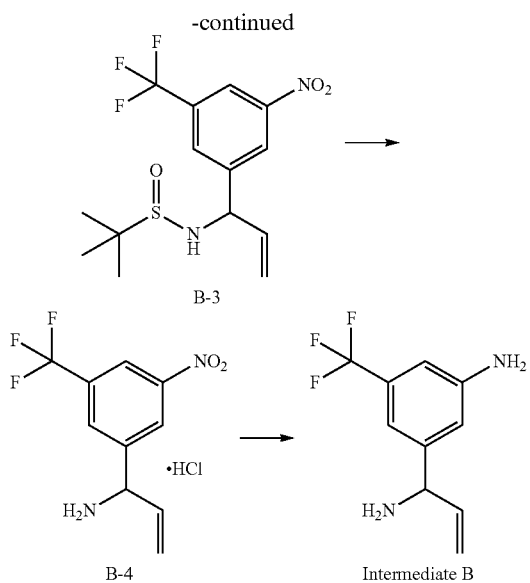

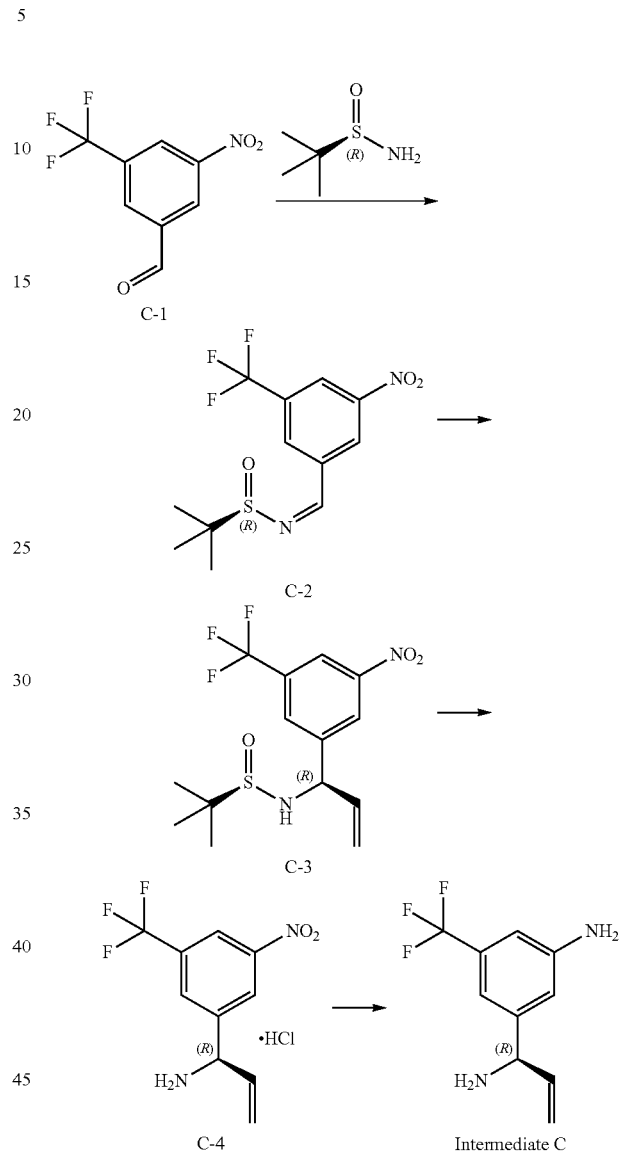

Intermediate C

Step A: To a solution of B-1 (3.00 g, 13.69 mmol) in tetrahydrofuran (120 mL) were added cesium carbonate (4.46 g, 13.69 mmol) and (±)-tert-butylsulfinamide (1.66 g, 13.69 mmol). The reaction mixture was stirred at 20° C. for half an hour, then quenched by water (100 mL) and extracted with ethyl acetate (50 mL×2). After liquid separation, the organic phase was dried over anhydrous sodium sulfate and filtered. The filtrate was concentrated under reduced pressure to obtain a crude of B-2 which was used directly in the next step.

Step B: To a solution of B-2 (4.40 g, 13.65 mmol) in tetrahydrofuran (100 mL) was added vinylmagnesium bromide (1 mol/L, 16.38 mL, 16.38 mmol) dropwise at −78° C. The reaction mixture was stirred at −78° C. for 1 hour, then warmed to 0° C. slowly and quenched by saturated aqueous of ammonium chloride (100 mL). The resulting mixture was extracted with ethyl acetate (50 mL×2). After liquid separation, the organic phase was dried over anhydrous sodium sulfate. After filtering, the filtrate was concentrated under reduced pressure. The residue was purified by column chromatography on silica gel (eluent: petroleum ether/ethyl acetate=5/1 to 3/1) to obtain B-3.

Step C: To a solution of B-3 (3.70 g, 10.56 mmol) in tetrahydrofuran (30 mL) was added the solution of hydrogen chloride in 1,4-dioxane (4 mol/L, 7.92 mL). The reaction mixture was stirred at 20° C. for 3 hours, then diluted with petroleum ether (60 mL). After filtering through a Buchner funnel, the filter cake was collected and dried under vacuum to obtain a crude of B-4 which was used directly in the next step. $^1$H NMR (400 MHz, DMSO-$d_6$) δ=9.16-8.81 (m, 3H), 8.75 (s, 1H), 8.55 (s, 1H), 8.44 (br s, 1H), 6.22-6.06 (m, 1H), 5.53-5.28 (m, 3H).

Step D: To a solution of B-4 (2.50 g, 10.15 mmol) in ethanol (50 mL) were added iron powder (2.84 g, 50.77 mmol), ammonium chloride (2.72 g, 50.77 mmol) and water (10 mL) successively. The reaction mixture was stirred at 60° C. for 3 hours. After cooling to room temperature, the reaction mixture was quenched by saturated aqueous of sodium carbonate solution (100 mL) and extracted with ethyl acetate (50 mL×2). The organic phases were combined, dried over anhydrous sodium sulfate and filtered. The filtrate was concentrated under reduced pressure to obtain intermediate B which was used directly in the next step. LC-MS (ESI) m/z: 217.2 [M+H]$^+$.

Intermediate C

Step A: To a solution of C-1 (10.00 g, 45.46 mmol) in tetrahydrofuran (100 mL) were added cesium carbonate (14.87 g, 45.64 mmol) and (R)-tert-butylsulfinamide (5.53 g, 45.64 mmol). The reaction mixture was stirred at 20° C. for half an hour, then quenched by water (100 mL), and extracted with ethyl acetate (100 mL×2). The combined organic phases were washed with brine (100 mL), dried over anhydrous sodium sulfate and filtered. The filtrate was concentrated under reduced pressure to obtain a crude of C-2 which was used directly in the next step.

Step B: To a solution of C-2 (14.90 g, 46.23 mmol) in tetrahydrofuran (300 mL) was added vinylmagnesium bromide (1 mol/L, 55.48 mL, 55.48 mmol) dropwise at −78° C. After adding, the reaction mixture was stirred at −78° C. for 1 hour, then warmed to 0° C. slowly and quenched by saturated aqueous of ammonium chloride (100 mL). The resulting mixture was extracted with ethyl acetate (100 mL×2). The combined organic phases were washed with brine (100 mL) and dried over anhydrous sodium sulfate. After filtering, the filtrate was concentrated under reduced pressure and the residue was purified by column chromatography on silica gel (eluent: petroleum ether/ethyl acetate=5/1 to 3/1) to obtain C-3. ¹H NMR (400 MHz, CDCl₃) δ=8.37 (s, 2H), 7.89 (s, 1H), 5.90-5.87 (m, 1H), 5.47-5.26 (m, 2H), 5.08 (dd, J=4.2, 7.2 Hz, 1H), 3.55 (d, J=3.9 Hz, 1H), 1.21 (s, 9H).

Step C: To a solution of C-3 (6.20 g, 17.70 mmol) in tetrahydrofuran (100 mL) was added the solution of hydrogen chloride in 1,4-dioxane (4 mol/L, 8.85 mL). The reaction mixture was stirred at 20° C. for 1 hour, then diluted with petroleum ether (20 mL). After filtering through a Buchner funnel, the filter cake was collected and dried under vacuum to obtain crude of C-4 which was used directly in the next step.

Step D: To a solution of C-4 (4.3 g, 15.21 mmol) in ethanol (100 mL) were added iron powder (4.25 g, 76.07 mmol), ammonium chloride (4.07 g, 76.07 mmol) and water (10 mL) successively. The reaction mixture was stirred at 60° C. for 3 hours. After cooling to room temperature, the reaction mixture was quenched by saturated aqueous of sodium carbonate aqueous (100 mL). The resulting mixture was extracted with ethyl acetate (100 mL×3) and the combined organic phases were dried over anhydrous sodium sulfate. After filtering, the filtrate was concentrated under reduced pressure to obtain intermediate C which was used directly in the next step. ¹H NMR (400 MHz, CDCl₃) δ=6.99 (s, 1H), 6.87 (s, 1H), 6.81 (s, 1H), 6.01-5.97 (m, 1H), 5.29 (dd, J=1.3, 17.1 Hz, 1H), 5.17 (dd, J=1.1, 10.2 Hz, 1H), 4.51 (d, J=5.6 Hz, 1H), 4.20-3.38 (m, 2H). LC-MS (ESI) m/z: 217.2 [M+H]⁺.

Intermediate D

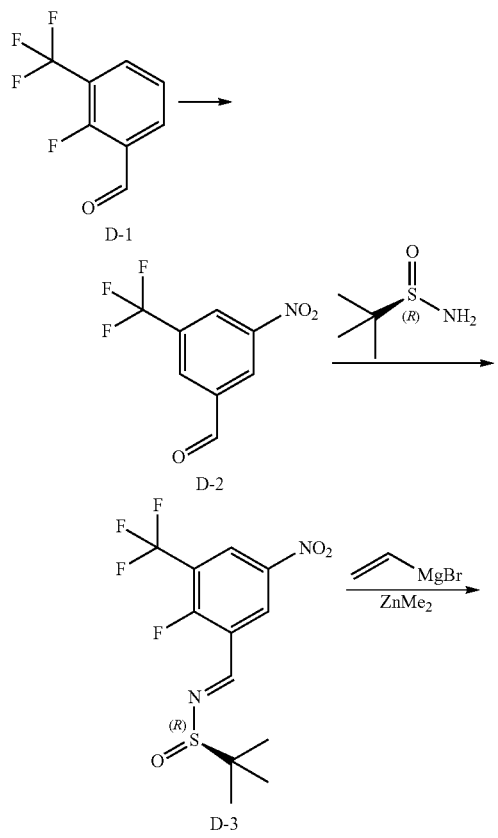

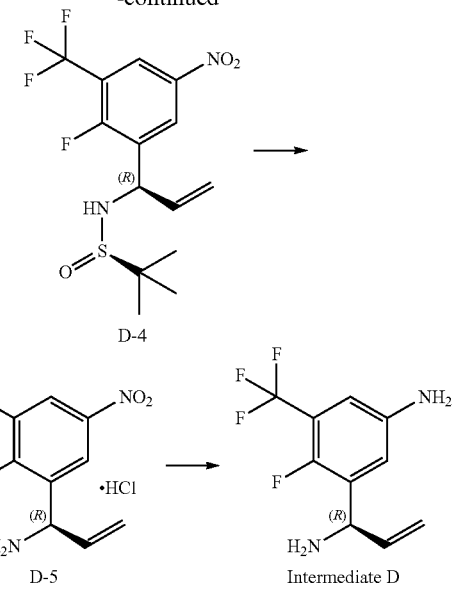

Step A: Compound D-1 (25 g, 130.13 mmol) was added to concentrated sulfuric acid (40 mL), then fuming nitric acid (19.87 g, 315.33 mmol) was added dropwise at 0° C. After the adding, the reaction mixture was warmed to 20° C. and stirred for 2 hours. The mixture was poured onto ice water (200 mL) slowly and extracted with dichloromethane (100 mL×3). The organic phases were combined, washed with aqueous of sodium hydroxide (1 mol/L, 100 mL), and extracted with dichloromethane (50 mL×2). The organic phases were combined, concentrated under reduced pressure to remove the solvent to obtain compound D-2 which was used directly in the next step. ¹H NMR (400 MHz, CDCl₃) δ=10.43 (s, 1H), 8.96 (dd, J=2.8, 5.6 Hz, 1H), 8.78 (dd, J=2.4, 5.6 Hz, 1H).

Step B: To a solution of D-2 (26 g, 109.65 mmol) in tetrahydrofuran (200 mL), were added (R)-tert-butylsulfinamide (13.29 g, 109.65 mmol) and cesium carbonate (35.73 g, 109.65 mmol). The reaction mixture was stirred at 2° C. for 30 minutes, then diluted with water (300 mL) and extracted with ethyl acetate (300 mL×2). The organic phases were combined, washed with brine (300 mL), and dried over anhydrous sodium sulfate. After filtering, the filtrate was concentrated under reduced pressure, and the residue was purified by column chromatography on silica gel (eluent: V/V, petroleum ether/ethyl acetate=10/1 to 5/1) to obtain D-3. ¹H NMR (400 MHz, CDCl₃) δ=9.08 (dd, J=2.8, 5.4 Hz, 1H), 8.95 (s, 1H), 8.68 (dd, J=2.8, 5.6 Hz, 1H), 1.34 (s, 9H).

Step C: Vinylmagnesium bromide solution (1 mol/L, 88.16 mL) was slowly added to dimethylzinc solution (1 mol/L, 101.38 mL) at 20° C. under nitrogen atmosphere. The mixture was stirred for 3 hours after adding, then cooled to −78° C., and a solution of D-3 (15 g, 44.08 mmol) in tetrahydrofuran (100 mL) was added dropwise. After adding, the reaction mixture was stirred at −78° C. for 30 minutes, then quenched by saturated aqueous of ammonium chloride (200 mL). The resulting mixture was extracted with ethyl acetate (300 mL×2). The organic phases were combined, washed with brine (300 mL×2) and dried over anhydrous sodium sulfate. The mixture was filtered, and the filtrate was concentrated under reduced pressure. The residue was purified by column chromatography on silica gel (eluent: V/V ethyl acetate/petroleum ether=5/1-3/1) to obtain D-4. $^1$H NMR (400 MHz, CDCl$_3$) δ=8.53 (ddd, J=2.8, 5.6, 18.0 Hz, 2H), 5.98 (ddd, J=6.8, 10.0, 17.0 Hz, 1H), 5.50-5.30 (m, 3H), 3.70 (d, J=5.6 Hz, 1H), 1.29 (s, 9H). LC-MS (ESI) m/z: 369.1 [M+H]$^+$.

Step D: To a solution of D-4 (2.5 g, 6.79 mmol) in tetrahydrofuran (20 mL) was added a solution of hydrogen chloride in 1,4-dioxane (4 mol/L, 3.4 mL). The reaction mixture was stirred at 20° C. for 1 hour, then diluted with petroleum ether (80 mL) and filtered. The filter cake was collected to obtain D-5 which was used directly in the next step.

Step E: To a solution of D-5 (2 g, 7.57 mmol) in ethanol (50 mL) were added iron powder (2.11 g, 37.85 mmol), ammonium chloride (2.02 g, 37.85 mmol) and water (10 mL). After replacing with nitrogen for 3 times, the reaction mixture was stirred at 60° C. for 3 hours. After cooling, the reaction mixture was filtered. The filtrate was neutralized with saturated aqueous of sodium carbonate (30 mL). The resulting mixture was extracted with ethyl acetate (30 mL×2). The combined organic phases were dried over anhydrous sodium sulfate. After filtering, the filtrate was concentrated under reduced pressure to obtain intermediate D.

Intermediate E

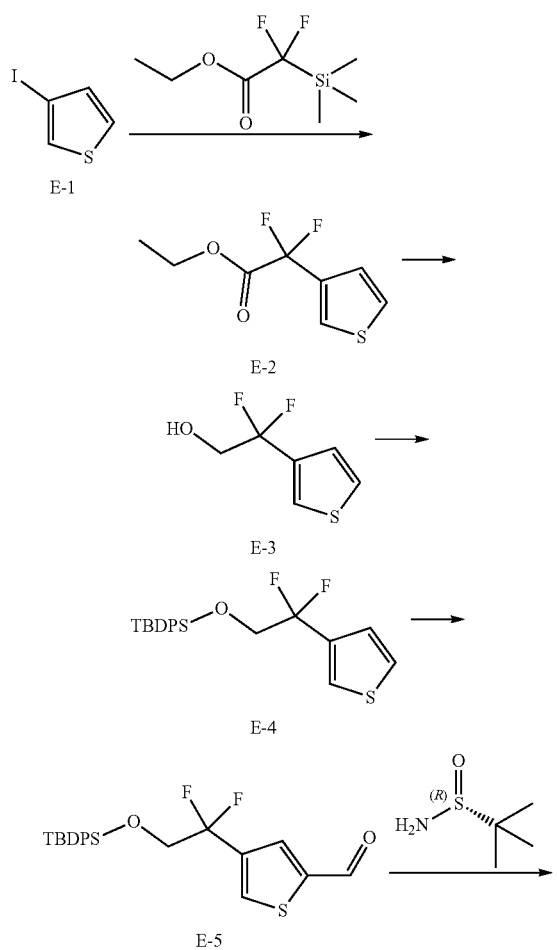

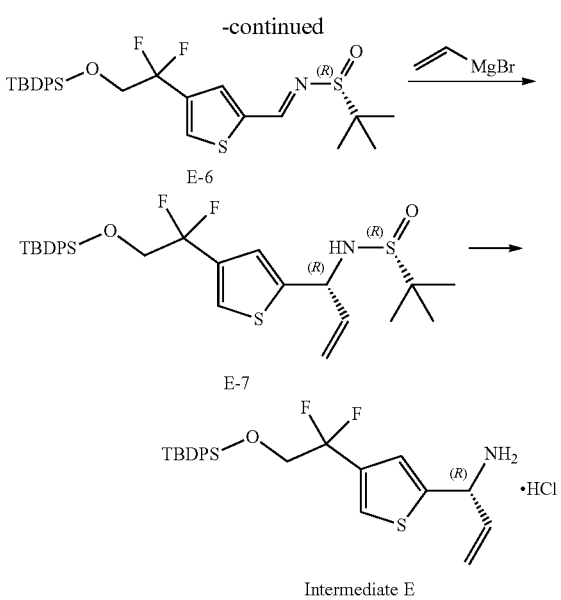

Intermediate E

Step A: To a solution of E-1 (6.42 g, 30.57 mmol) in dimethyl sulfoxide (50 mL) were added potassium fluoride (3.55 g, 61.14 mmol) and cuprous iodide (11.64 g, 61.14 mmol). Then ethyl (trimethylsilyl)difluoroacetate (12 g, 61.14 mmol) was added. The reaction mixture was stirred at 60° C. for 15 hours under nitrogen atmosphere. After cooling, the reaction mixture was diluted with methyl tert-butyl ether (200 mL) and water (300 mL), then stirred for 10 minutes. After filtering, the filter cake was washed with methyl tert-butyl ether (30 mL×3). The filtrates were combined and separated to obtain organic phase. The organic phase was washed with water (300 mL) and brine (300 mL), and dried over anhydrous sodium sulfate. After filtering, the filtrate was concentrated under reduced pressure. The residue was purified by column chromatography on silica gel (eluent: petroleum ether) to obtain E-2. $^1$H NMR (400 MHz, CDCl$_3$) δ=7.75-7.65 (m, 1H), 7.44-7.38 (m, 1H), 7.28 (s, 1H), 4.36 (q, J=7.2 Hz, 2H), 1.36 (t, J=7.2 Hz, 3H).

Step B: E-2 (3.8 g, 18.43 mmol) was added to a mixed solvent of tetrahydrofuran (30 mL) and ethanol (5 mL). The solution was cooled to 0° C. and sodium borohydride (1.40 g, 36.86 mmol) was added. After adding, the reaction mixture was stirred at 15-20° C. for 2 hours, then quenched by saturated aqueous of ammonium chloride (50 mL) and diluted with water (50 mL). The resulting mixture was extracted with methyl tert-butyl ether (50 mL×2). The combined organic phases were washed with brine (50 mL×2) and dried over anhydrous sodium sulfate. After filtering, the filtrate was concentrated under reduced pressure. The residue was purified by column chromatography on silica gel (eluent: V/V petroleum ether/ethyl acetate=10/1) to obtain E-3.

Step C: To a solution of E-3 (2.37 g, 14.44 mmol) in anhydrous dichloromethane (30 mL) were added imidazole (1.08 g, 15.88 mmol) and 4-dimethylaminopyridine (176.36 mg, 1.44 mmol) successively, then tert-Butyldiphenylchlorosilane (4.17 g, 15.16 mmol) was added dropwise. After adding, the reaction mixture was stirred at 10-15° C. for 16 hours and diluted with water (100 mL). The organic phase was separated, washed with brine (100 mL) and dried over anhydrous sodium sulfate. After filtering, the filtrate was concentrated under reduced pressure. The residue was purified by column chromatography on silica gel (eluent: V/V, petroleum ether/ethyl acetate=25/1) to obtain E-4. ¹H NMR (400 MHz, CDCl₃) δ=7.61-7.55 (m, 5H), 7.45-7.36 (m, 7H), 7.18 (dd, J=1.2, 5.0 Hz, 1H), 3.99 (t, J=12.0 Hz, 2H), 1.02 (s, 9H).

Step D: To a solution of E-4 (1.5 g, 3.73 mmol) in anhydrous tetrahydrofuran (20 mL) was added lithium diisopropylamide solution (1 mol/L, 6.71 mL) dropwise at −65° C. under nitrogen atmosphere. The reaction mixture was stirred at −65° C. for 1 hour, then N,N-dimethylformamide (1.63 g, 22.36 mmol) was added and stirred at −65° C. for further 30 minutes. The reaction mixture was diluted with water (40 mL) and extracted with methyl tert-butyl ether (30 mL×2). The combined organic phases were washed with brine (50 mL) and dried over anhydrous sodium sulfate. After filtering, the filtrate was concentrated under reduced pressure to obtain a crude of E-5 which was used directly in the next step.

Step E: To a solution of E-5 (1.6 g, 3.72 mmol) in tetrahydrofuran (20 mL) were added (R)-tert-butylsulfinamide (495.41 mg, 4.09 mmol) and cesium carbonate (1.33 g, 4.09 mmol) successively. The reaction mixture was stirred at 10-15° C. for 16 hours, then diluted with water (40 mL) and extracted with methyl tert-butyl ether (30 mL×2). The combined organic phases were washed with brine (40 mL) and dried over anhydrous sodium sulfate. After filtering, the filtrate was concentrated under reduced pressure. The residue was purified by pre-TLC (developing solvent: V/V, petroleum ether/ethyl acetate=20/1) to obtain E-6. ¹H NMR (400 MHz, CDCl₃) δ=8.62 (d, J=0.6 Hz, 1H), 7.75 (s, 1H), 7.56 (td, J=1.4, 8.0 Hz, 4H), 7.52 (d, J=1.4 Hz, 1H), 7.48-7.42 (m, 2H), 7.40-7.36 (m, 4H), 3.99 (t, J=11.8 Hz, 2H), 1.27 (s, 9H), 1.02 (s, 9H). LC-MS (ESI) m/z: 534.2 [M+H]⁺.

Step F: To a solution of E-6 (2.6 g, 4.87 mmol) in anhydrous tetrahydrofuran (50 mL) was added vinylmagnesium bromide solution (1 mol/L, 9.74 mL) dropwise at −65° C. to −60° C. under nitrogen atmosphere. After adding, the reaction mixture was stirred at −65° C. for 10 minutes, then warmed to 0° C. to stir for further 50 minutes. The reaction mixture was quenched by saturated aqueous of ammonium chloride (50 mL) slowly and diluted with water (60 mL). The resulting mixture was extracted with methyl tert-butyl ether (60 mL×2). The combined organic phases were dried over anhydrous sodium sulfate. After filtering, the filtrate was concentrated under reduced pressure. The residue was purified by pre-TLC (developing solvent: V/V, petroleum ether/ethyl acetate=5/1) to obtain E-7.

Step G: To a solution of E-7 (930 mg, 1.66 mmol) in tetrahydrofuran (5 mL), was added a solution of hydrogen chloride in 1,4-dioxane (4 mol/L, 1.24 mL). The reaction mixture was stirred at 10-15° C. for 2 hours, then diluted with petroleum ether (40 mL) and stirred at 10-15° C. for further 30 minutes. After filtering, the filter cake was dried under reduced pressure to obtain intermediate E. ¹H NMR (400 MHz, CD₃OD) δ=7.80 (s, 1H), 7.58 (d, J=6.6 Hz, 4H), 7.52-7.31 (m, 8H), 6.17 (ddd, J=6.8, 10.4, 17.2 Hz, 1H), 5.58-5.49 (m, 2H), 5.29 (d, J=6.8 Hz, 1H), 4.03 (t, J=12.2 Hz, 2H), 1.01 (s, 9H).

Intermediate F

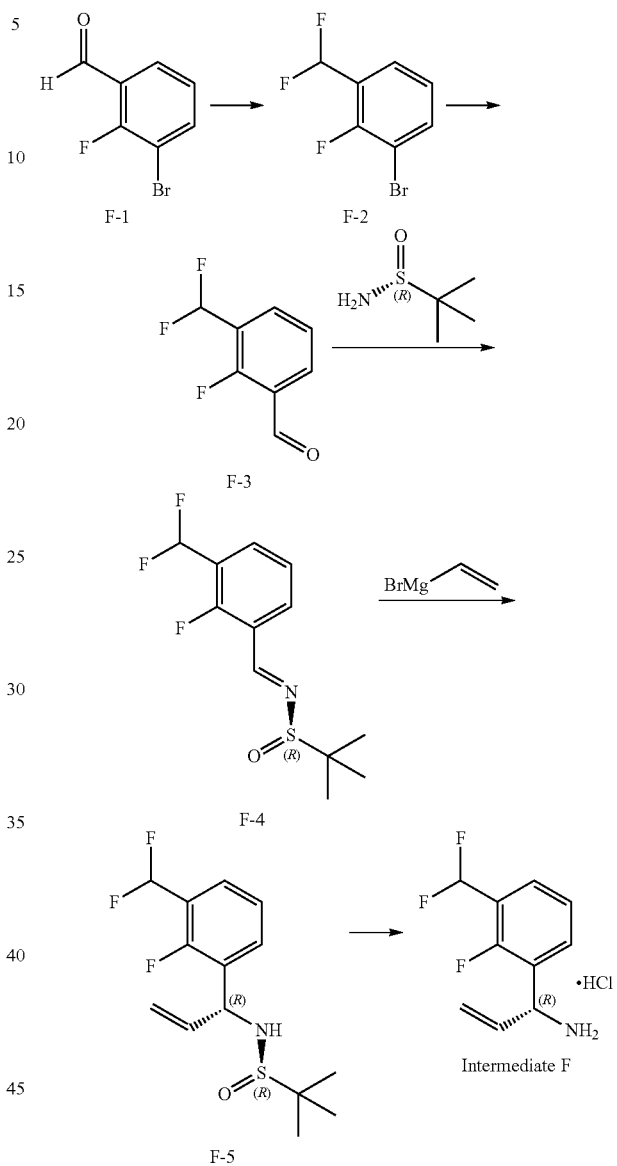

Step A: To a solution of F-1 (10.00 g, 49.26 mmol) in dichloromethane (100 mL) was added diethylaminosulfur trifluoride (15.88 g, 98.52 mmol) at 0° C. under nitrogen atmosphere. The reaction mixture was stirred at 0° C. for 1 hour, then quenched by saturated aqueous of sodium bicarbonate to adjust the pH to 8. The resulting mixture was extracted with dichloromethane (50 mL×3). The combined organic phases were dried over anhydrous sodium sulfate and filtered. The filtrate was concentrated under reduced pressure to obtain a crude of F-2 which was used directly in the next step.

Step B: To a solution of F-2 (5.00 g, 22.22 mmol) in tetrahydrofuran (50 mL) was added n-butyllithium (2.5 mol/L, 13.33 mL, 33.33 mmol) at −78° C. under nitrogen atmosphere. After adding, the reaction mixture was stirred at −78° C. for 1 hour, then N,N-dimethylformamide (3.25 g, 44.44 mmol) was added and stirred at −78° C. for further 1 hour. The reaction mixture was poured into hydrochloric acid (1 mol/L, 100 mL) and extracted with ethyl acetate (30 mL×3). The combined organic phases were dried over anhydrous sodium sulfate and filtered. The filtrate was concentrated under reduced pressure to obtain a crude of F-3 which was used directly in the next step.

Step C: To a solution of F-3 (3.20 g, 18.38 mmol) in tetrahydrofuran (60 mL) were added cesium carbonate (5.99 g, 18.38 mmol) and (R)-tert-butylsulfinamide (2.23 g, 18.38 mmol). The reaction mixture was stirred at 0° C. for 1 hour, then diluted with water (200 mL) and extracted with ethyl acetate (100 mL×2). The combined organic phases were dried over anhydrous sodium sulfate and filtered. The filtrate was concentrated under reduced pressure. The residue was purified by preparative HPLC (chromatographic column: Phenomenex luna C18, 250 mm×50 mm×10 m; mobile phase: phase A: 0.225% formic acid aqueous solution; phase B: acetonitrile, 40-70%; 18 min) to obtain F-4. $^1$H NMR (400 MHz, DMSO-$d_6$) δ=8.72 (s, 1H), 8.19 (t, J=7.0 Hz, 1H), 7.89 (t, J=7.0 Hz, 1H), 7.52 (t, J=7.8 Hz, 1H), 7.48-7.14 (m, 1H), 1.21 (s, 9H).

Step D: Vinylmagnesium bromide solution (1 mol/L, 3.61 mmol) was added dropwise to a solution of dimethyl zinc in toluene (1 mol/L, 4.15 mmol) at 20° C. under nitrogen atmosphere. After adding, the mixture was stirred at 20° C. for 4 hours, then cooled to −78° C., and the solution of F-4 (0.50 g, 1.80 mmol) in tetrahydrofuran (10 mL) was added dropwise. After adding, the reaction mixture was stirred at −78° C. for half an hour, then quenched by saturated aqueous of ammonium chloride (200 mL) and extracted with ethyl acetate (300 mL×2). The combined organic phases were washed with brine (300 mL) and dried over anhydrous sodium sulfate. After filtering, the filtrate was concentrated under reduced pressure. The residue was purified by column chromatography on silica gel (eluent: V/V, petroleum ether/ethyl acetate=5/1 to 3/1) to obtain F-5. $^1$H NMR (400 MHz, DMSO-$d_6$) δ=7.70 (t, J=7.0 Hz, 1H), 7.56 (t, J=7.0 Hz, 1H), 7.42-7.07 (m, 2H), 6.04-5.95 (m, 1H), 5.35-5.08 (m, 3H), 1.13 (s, 9H).

Step E: To a solution of F-5 (0.40 g, 1.31 mmol) in tetrahydrofuran (5 mL) was added a solution of hydrogen chloride in 1,4-dioxane (4 mol/L, 0.98 mL). The reaction mixture was stirred at 15-20° C. for 2 hours, then diluted with petroleum ether (40 mL), and stirred for further 30 minutes. After filtering, the filter cake was collected and dried under reduced pressure to obtain intermediate F.

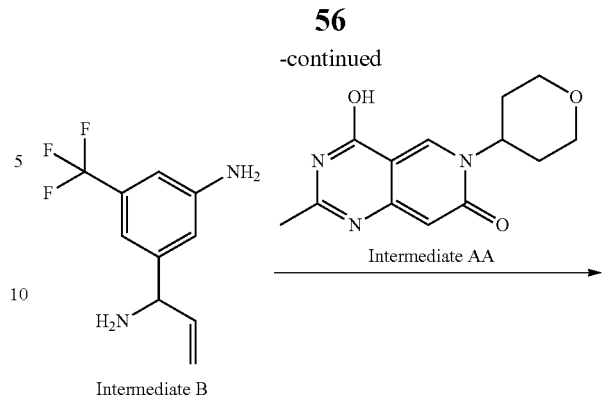

Intermediate B

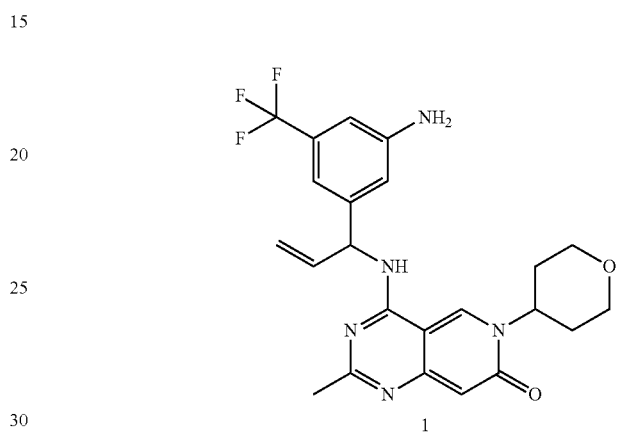

To a solution of intermediate AA (20 mg, 76.55 μmol) in acetonitrile (2 mL) was added phosphonitrilic chloride trimer (29.27 mg, 84.20 μmol) and potassium phosphate (40.62 mg, 191.37 μmol). The reaction mixture was stirred at 20-25° C. for 1 hour, then intermediate B (16.55 mg, 76.55 μmol) was added. The reaction mixture was stirred for further 1 hour, then concentrated under reduced pressure. The residue was purified by preparative HPLC (column: Unisil 3-100 C18 Ultra 150×50 mm×3 μm, mobile phase: phase A: 0.225% trifluoroacetic acid aqueous solution; phase B: acetonitrile, 20%-40%, 10 min) to obtain compound 1. $^1$H NMR (400 MHz, CD$_3$OD) δ=9.09 (s, 1H), 6.93 (d, J=6.5 Hz, 2H), 6.85 (s, 1H), 6.42 (s, 1H), 6.24-6.12 (m, 2H), 5.44-5.22 (m, 3H), 4.12 (d, J=11.8 Hz, 2H), 3.63 (t, J=11.8 Hz, 2H), 2.39 (s, 3H), 2.14-2.04 (m, 2H), 1.93 (d, J=8.6 Hz, 2H). LC-MS (ESI) m/z: 460.4 [M+H]$^+$.

Compound 1

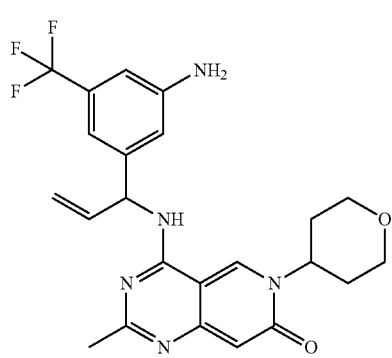

1

Compound 2

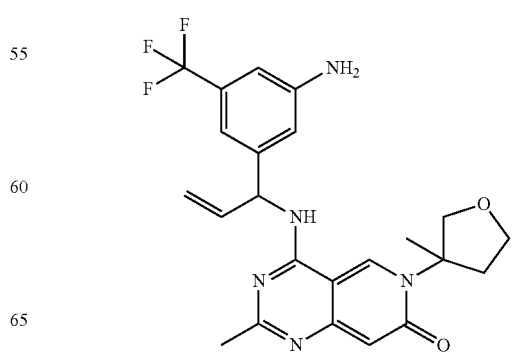

2

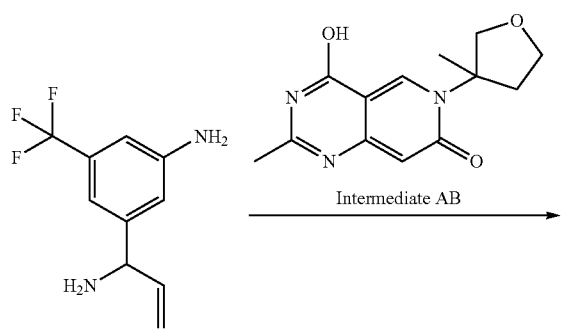

Intermediate B     Intermediate AB

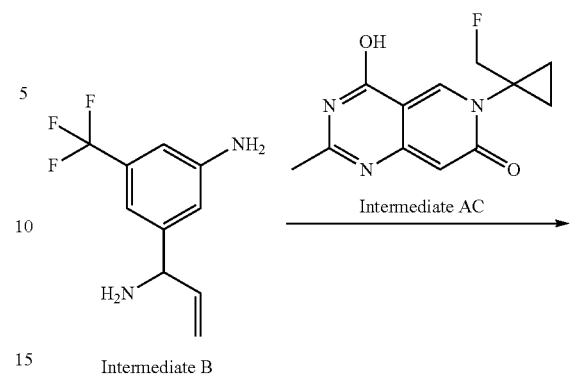

Intermediate B     Intermediate AC

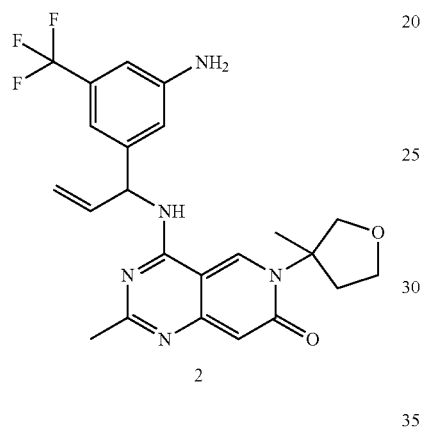

2

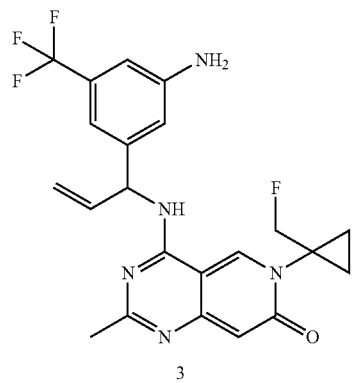

3

The preparation of compound 2 was referred to the preparation process of Embodiment 1, replacing intermediate AA with intermediate AB.

Compound 2 was purified by preparative HPLC (separation conditions: column: Unisil 3-100 C18 Ultra 150×50 mm×3 μm, mobile phase: phase A: 0.225% formic acid aqueous solution; phase B: acetonitrile, 18%-38%, 10 min). $^1$H NMR (400 MHz, DMSO-d$_6$) δ=9.00 (s, 1H), 8.87 (s, 1H), 8.28 (s, 1H), 6.84-6.73 (m, 3H), 6.22-6.07 (m, 3H), 5.63 (br s, 2H), 5.36-5.26 (m, 2H), 4.36 (dd, J=4.9, 9.0 Hz, 1H), 3.96-3.82 (m, 3H), 2.26 (s, 3H), 1.59 (s, 3H). LC-MS (ESI) m/z: 460.3 [M+H]$^+$.

The preparation of compound 3 was referred to the preparation process of Embodiment 1, replacing intermediate AA with intermediate AC.

Compound 3 was purified by preparative HPLC (separation conditions: column: Phenomenex luna C18 150×25 mm×10 μm; mobile phase: phase A: 0.225% formic acid aqueous solution; phase B: acetonitrile, 12%-42%, 10 min). $^1$H NMR (400 MHz, DMSO-d$_6$) δ=9.21 (s, 2H), 6.90-6.64 (m, 3H), 6.29-6.02 (m, 3H), 5.90-5.52 (m, 2H), 5.42-5.22 (m, 2H), 4.92-4.37 (m, 2H), 2.28 (s, 3H), 1.31 (br s, 4H). LC-MS (ESI) m/z: 448.1 [M+H]$^+$.

Compound 3

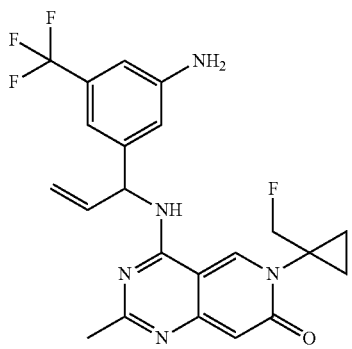

3

Compound 4

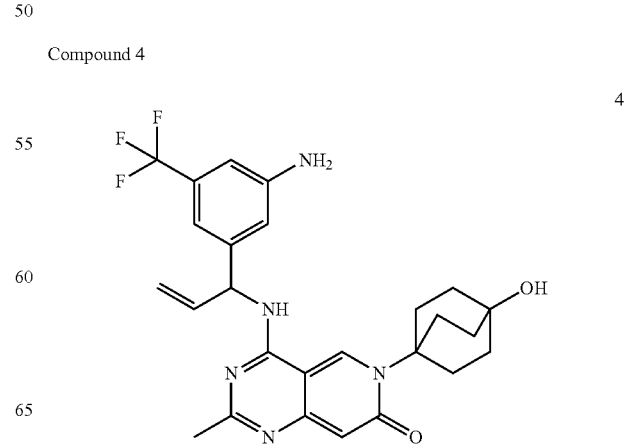

4

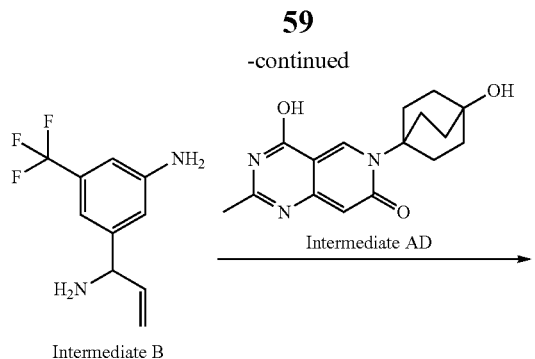

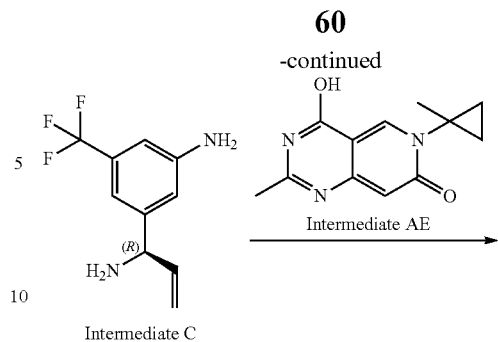

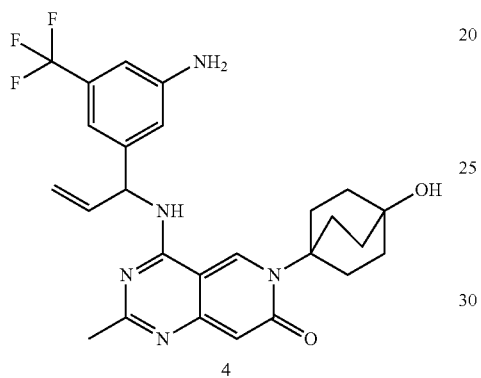

The preparation of compound 4 was referred to the preparation process of Embodiment 1, replacing intermediate AA with intermediate AD.

Compound 4 was purified by preparative HPLC (separation conditions: column: Phenomenex luna C18 150×25 mm×10 μm; mobile phase: phase A: 0.225% formic acid aqueous solution; phase B: acetonitrile, 12%-42%, 10 min). $^1$H NMR (400 MHz, DMSO-$d_6$) δ=8.95-9.07 (m, 1H), 8.73 (s, 1H), 6.83-6.73 (m, 3H), 6.20-6.10 (m, 2H), 6.03 (s, 1H), 5.63 (br s, 2H), 5.35-5.24 (m, 2H), 3.16 (s, 1H), 2.42-2.35 (m, 6H), 2.24 (s, 3H), 1.75-1.68 (m, 6H). LC-MS (ESI) m/z: 500.1 [M+H]$^+$.

Compound 5

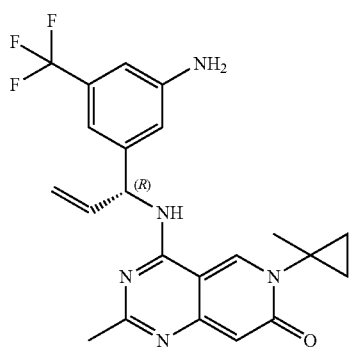

The preparation of compound 5 was referred to the preparation process of Embodiment 1, replacing intermediate AA with intermediate AE, and replacing intermediate B with intermediate C.

Compound 5 was purified by preparative HPLC (separation conditions: column: Unisil 3-100 C18 Ultra 150×50 mm×3 μm, mobile phase: phase A: 0.225% formic acid aqueous solution; phase B: acetonitrile, 18%-38%, 10 min). $^1$H NMR (400 MHz, CD$_3$OD) δ=9.32 (s, 1H), 6.99-6.92 (m, 2H), 6.88 (s, 1H), 6.39-6.14 (m, 3H), 5.42-5.27 (m, 2H), 2.45 (s, 3H), 1.60 (s, 3H), 1.24 (t, J=3.1 Hz, 2H), 1.17-1.05 (m, 2H). LC-MS (ESI) m/z: 430.2 [M+H]$^+$.

Compound 6

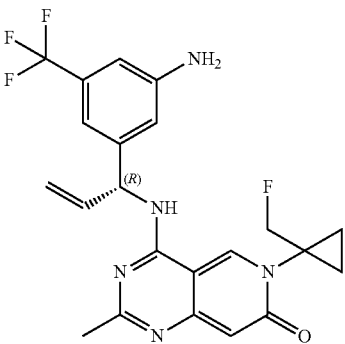

-continued

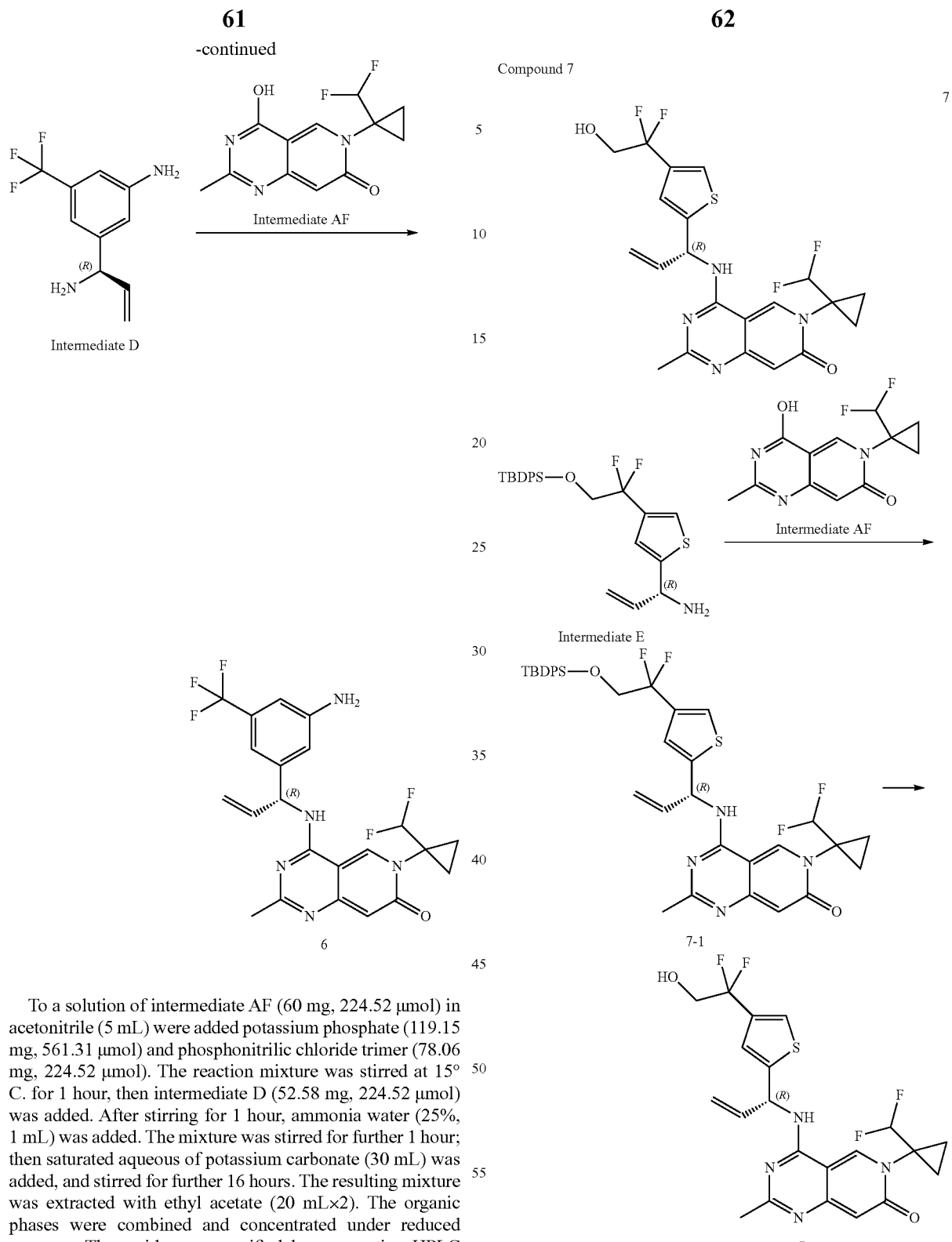

To a solution of intermediate AF (60 mg, 224.52 μmol) in acetonitrile (5 mL) were added potassium phosphate (119.15 mg, 561.31 μmol) and phosphonitrilic chloride trimer (78.06 mg, 224.52 μmol). The reaction mixture was stirred at 15° C. for 1 hour, then intermediate D (52.58 mg, 224.52 μmol) was added. After stirring for 1 hour, ammonia water (25%, 1 mL) was added. The mixture was stirred for further 1 hour; then saturated aqueous of potassium carbonate (30 mL) was added, and stirred for further 16 hours. The resulting mixture was extracted with ethyl acetate (20 mL×2). The organic phases were combined and concentrated under reduced pressure. The residue was purified by preparative HPLC (chromatographic column: Unisil 3-100 C18 Ultra 150×50 mm×3 μm, mobile phase: phase A: 0.225% formic acid aqueous solution; phase B: acetonitrile, 13%-43%, 10 min) to obtain compound 6. $^1$H NMR (400 MHz, DMSO-$d_6$) δ=9.35-9.06 (m, 2H), 6.83 (dd, J=2.6, 5.6 Hz, 1H), 6.78 (dd, J=2.8, 5.4 Hz, 1H), 6.51-6.10 (m, 4H), 5.64-5.37 (m, 2H), 5.36-5.18 (m, 2H), 2.25 (s, 3H), 1.56-1.27 (m, 4H). LC-MS (ESI) m/z: 484.2 [M+H]$^+$.

Step A: Intermediate AF (200 mg, 748.42 μmol) was added to acetonitrile (10 mL), then potassium phosphate (397.16 mg, 1.87 mmol) and phosphonitrilic chloride trimer (260.19 mg, 748.42 μmol) were added. The reaction mixture was stirred at 15° C. for 1 hour, then intermediate E (369.80 mg, 448.42 μmol) was added. After stirring for 1 hour, ammonia water (25%, 1 mL) was added and stirred for further 1 hour, then saturated aqueous of potassium carbonate (30 mL) was added and stirred for further 16 hours. The reaction mixture was extracted with ethyl acetate (30 mL×2). The organic phases were combined and concentrated under reduced pressure. The residue was purified by preparative HPLC (chromatographic column: Welch Ultimate XB-SiOH, 250×70×10 μm; mobile phase: phase A: n-hexane; phase B: 0.1% ammonia ethanol solution, 1%-35%; 20 min) to obtain 7-1.

Step B: To a solution of 7-1 (360 mg, 509.28 μmol) in methanol (10 mL) was added ammonium fluoride (188.63 mg, 5.09 mmol). The reaction mixture was stirred at 70° C. for 2 hours, then concentrated under reduced pressure. The residue was purified by preparative HPLC (chromatographic column: Waters Xbridge 150×25 mm×5 μm, mobile phase: phase A: ammonia water; phase B: acetonitrile, 22%-52%, 9 min) to obtain compound 7. $^1$H NMR (400 MHz, CD$_3$OD) δ=9.12 (s, 1H), 7.67-7.52 (m, 1H), 7.18 (s, 1H), 6.51 (dd, J=1.0, 6.4 Hz, 1H), 6.38 (s, 1H), 6.33-6.05 (m, 2H), 5.48-5.34 (m, 2H), 3.90 (t, J=13.2 Hz, 2H), 2.42 (s, 3H), 1.66-1.27 (m, 4H). LC-MS (ESI) m/z: 469.1 [M+H]$^+$.

To a solution of intermediate AF (700 mg, 2.62 mmol) in acetonitrile (20 mL) were added phosphonitrilic chloride trimer (867.31 mg, 2.50 mmol) and potassium phosphate (1.32 g, 6.24 mmol). The reaction mixture was stirred at 155° C. for 1 hour, then intermediate F (593 mg, 2.50 mmol) was added. The reaction mixture was stirred for 1 hour, then concentrated under reduced pressure to remove the solvent. The residue was purified by preparative HPLC (chromatographic column: Waters Xbridge BEH C18 250×50 mm×10 μm, mobile phase: phase A: ammonia water; phase B: acetonitrile, 35%-65%, 20 min) to obtain compound 8. $^1$H NMR (400 MHz, CD$_3$OD) δ=9.21 (s, 1H), 7.70-7.50 (m, 2H), 7.39-7.25 (m, 1H), 7.20-6.84 (m, 1H), 6.56-5.95 (m, 4H), 5.42-5.20 (m, 2H), 2.33 (s, 3H), 1.69-1.31 (m, 4H). LC-MS (ESI) m/z: 451.2 [M+H]$^+$.

Compound 9

Compound 8

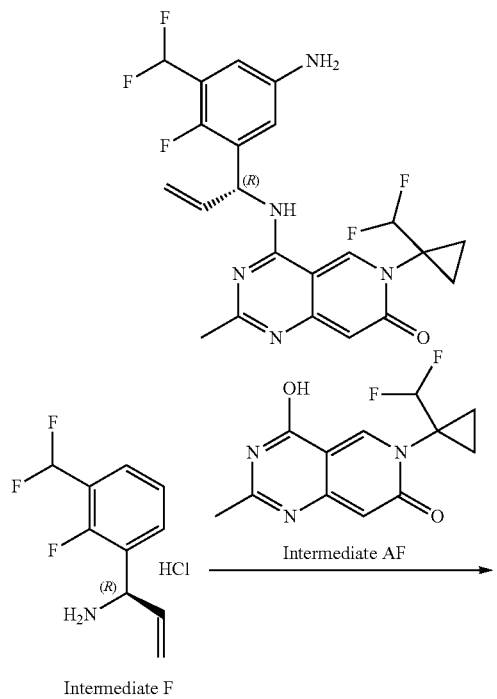

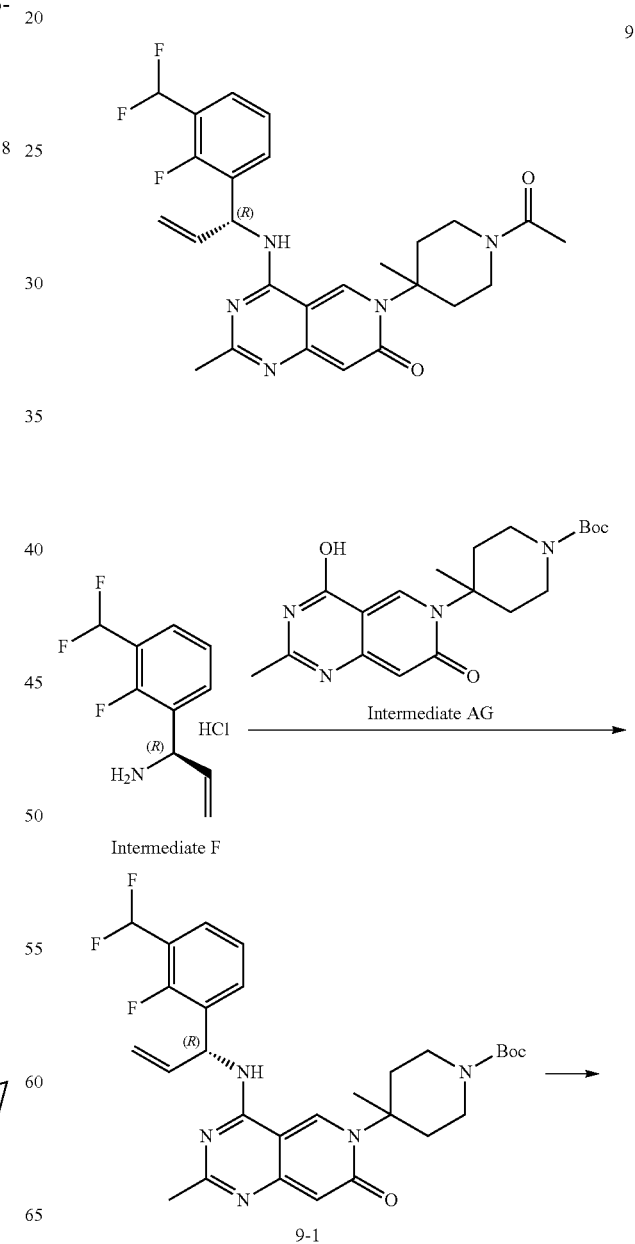

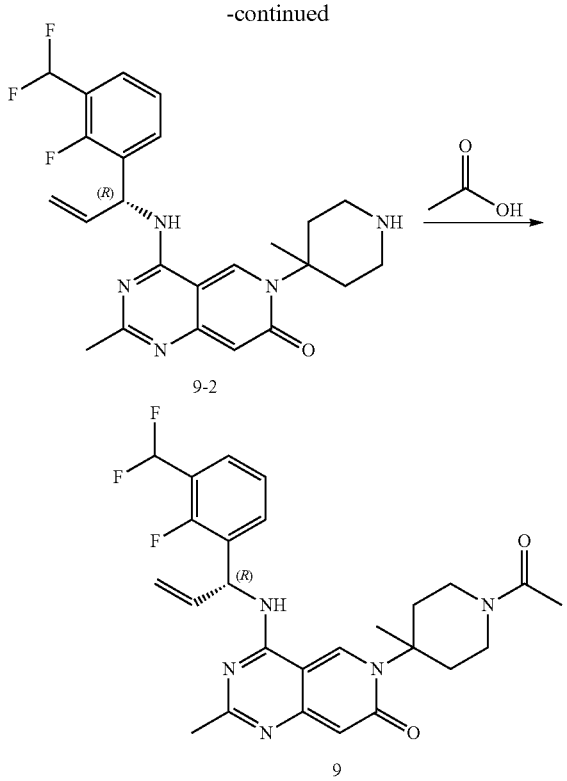

Step A: To a solution of intermediate AG (270 mg, 1.14 mmol) in acetonitrile (10 mL) were added phosphonitrilic chloride trimer (394.99 mg, 1.14 mmol) and potassium phosphate (602.92 mg, 2.84 mmol). The reaction mixture was stirred at 20° C. for 1 hour, then intermediate F (446.67 mg, 1.19 mmol) was added. The reaction mixture was stirred at 20° C. for 2 hours. After filtering, the filtrate was concentrated under reduced pressure. The residue was purified by preparative HPLC (chromatographic column: Welch Ultimate XB-SiOH, 250 mm×70 mm×3 μm; mobile phase: phase A: n-hexane; phase B: 0.1% ammonia ethanol solution, 1%-35%; 20 min) to obtain 9-1. $^1$H NMR (400 MHz, CDCl3) δ=9.02-8.91 (m, 1H), 7.76-7.51 (m, 2H), 7.33 (t, J=7.8 Hz, 1H), 7.20-6.84 (m, 1H), 6.55-6.43 (m, 1H), 6.36-6.30 (m, 1H), 5.47-5.23 (m, 2H), 4.61 (br s, 1H), 3.90-3.79 (m, 2H), 3.63 (d, J=7.2 Hz, 2H), 2.58-2.42 (m, 2H), 2.38 (s, 3H), 1.84 (s, 2H), 1.55-1.38 (m, 9H), 1.20 (s, 3H).

Step B: 9-1 (156 mg, 279.77 μmol) was dissolved in 1,4-dioxane (3 mL), then a solution of hydrogen chloride in dioxane (4 mol/L, 1 mL) was added. The reaction mixture was stirred at 40° C. for 2 hours and then concentrated under reduced pressure to obtain 9-2. LC-MS (ESI) m/z: 458.0 [M+H]$^+$.

Step C: Acetic acid (7.29 mg, 121.47 μmol), N,N-diisopropylethylamine (52.33 mg, 404.90 μmol) and 2-(7-azabenzotriazole)-N,N,N,N-tetramethyluronium hexafluorophosphate (HATU) (46.19 mg, 121.47 μmol) were added to N,N-dimethylformamide (4 mL). The reaction mixture was stirred at 20° C. for 15 minutes, then 9-2 (40 mg, 80.98 μmol) was added. The reaction mixture was stirred at 20° C. for 1 hour, then concentrated under reduced pressure. The residue was purified by preparative HPLC (chromatographic column: Phenomenex Synergi C18, 150 mm×25 mm×10 m; mobile phase: phase A: 0.225% formic acid aqueous solution; phase B: 10%-10% acetonitrile; 10 min) to obtain compound 9. $^1$H NMR (400 MHz, CDCl$_3$) δ=9.22-9.06 (m, 1H), 8.84 (s, 1H), 7.72-7.64 (m, 1H), 7.60-7.52 (m, 1H), 7.39-7.09 (m, 2H), 6.44-6.32 (m, 1H), 6.23 (ddd, J=6.1, 10.4, 16.9 Hz, 1H), 6.07 (s, 1H), 5.36-5.13 (m, 2H), 4.06-3.90 (m, 1H), 3.61 (dd, J=5.2, 13.6 Hz, 1H), 3.19 (td, J=6.6, 13.6 Hz, 2H), 2.64-2.53 (m, 1H), 2.34-2.23 (m, 3H), 2.19 (d, J=1.6 Hz, 3H), 2.00 (s, 3H), 1.79-1.68 (m, 3H). LC-MS (ESI) m/z: 500.2 [M+H]$^+$.

Compound 10

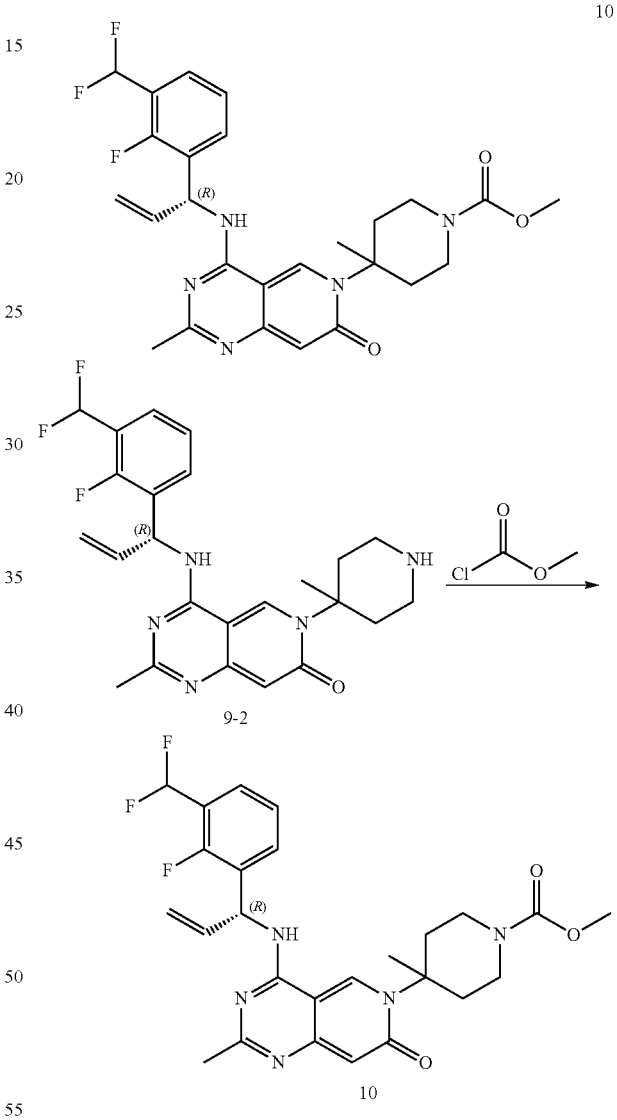

To a solution of 9-2 (75 mg, 151.84 μmol) in dichloromethane (1 mL) were added 2,6-dimethylpyridine (56.94 mg, 531.43 μmol) and methyl chloroformate (12.91 mg, 136.65 μmol) at 0° C. After adding, the reaction mixture was stirred at 20° C. for 1 hour. After cooling again to 0° C., the reaction mixture was quenched by water (20 mL) and extracted with ethyl acetate (20 mL×2). The combined organic phases were washed with water (20 mL) and brine (20 mL), dried over anhydrous sodium sulfate and filtered. The filtrate was concentrated under reduced pressure and the residue was purified by preparative HPLC (chromatographic column: Unisil 3-100 C18 Ultra, 150 mm×50 mm×3 μm; mobile phase: phase A: 0.225% formic acid aqueous solution; phase B: 13%-43% acetonitrile; 15 min) to obtain compound 10. $^1$H NMR (400 MHz, DMSO-d$_6$) δ=9.23-8.96 (m, 1H), 8.87-8.77 (m, 1H), 7.74-7.51 (m, 2H), 7.40-7.08 (m, 2H), 6.46-6.35 (m, 1H), 6.30-6.16 (m, 1H), 6.11-6.03 (m, 1H), 5.38-5.12 (m, 2H), 3.77-3.70 (m, 2H), 3.59 (s, 3H), 3.28 (br s, 2H), 2.46-2.37 (m, 2H), 2.31-2.22 (m, 2H), 2.19 (s, 3H), 1.73 (s, 3H). LC-MS (ESI) m/z: 516.2 [M+H]$^+$.

Compound 11

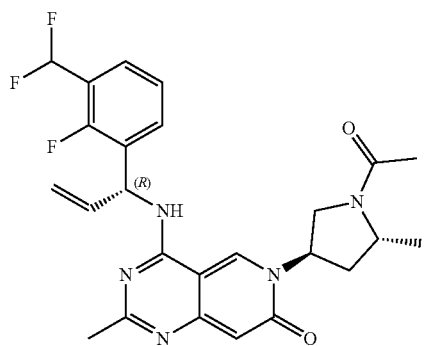

11

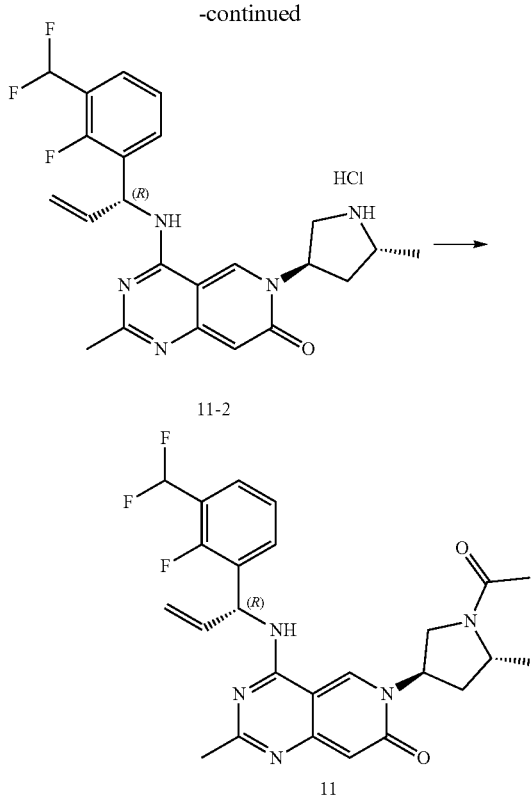

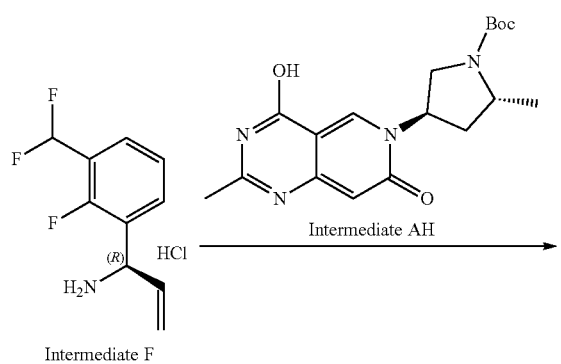

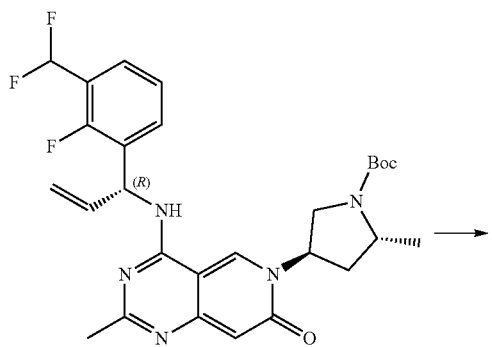

11-1

Step A: To a solution of intermediate AH (200 mg, 554.93 μmol) in acetonitrile (3 mL) were added potassium phosphate (294.48 mg, 1.39 mmol) and phosphonitrilic chloride trimer (192.93 mg, 554.93 μmol). The reaction mixture was stirred at 20-30° C. for 1 hour, then intermediate F (145.07 mg. 610.42 μmol) was added. The reaction mixture was stirred for 12 hours, then ammonia water (mass fraction: 25%, 0.5 mL) was added and stirred for further 1 hour. The mixture was quenched by saturated aqueous of potassium carbonate (mass fraction: 20%, 20 mL) and stirred for 1 hour, then extracted with dichloromethane (50 mL). The organic phase was washed with brine (10 mL), and dried over anhydrous sodium sulfate. After filtering, the filtrate was concentrated under reduced pressure. The residue was purified by pre-TLC (developing solvent: V/V, dichloromethane/methanol=10/1) to obtain 11-1. LC-MS (ESI) m/z: 544.3 [M+H]$^+$.

Step B: To a solution of 11-1 (110 mg, 202.36 μmol) in 1,4-dioxane (3 mL) was added a solution of hydrogen chloride in dioxane (4 mol/L, 1 mL). The reaction mixture was stirred at 30° C. for 2 hours, then concentrated under reduced pressure to obtain 11-2. LC-MS (ESI) m/z: 444.2 [M+H]$^+$.

Step C: Acetic acid (18.77 mg, 312.55 μmol), 2-(7-azabenzotriazole)-N,N,N,N-tetramethyluronium hexafluorophosphate (118.84 mg, 312.55 μmol) and N,N-diisopropylethylamine (107.72 mg, 833.46 μmol) were added to N,N-dimethylformamide (1 mL), and the reaction mixture was stirred at 20-30° C. for 15 minutes. 11-2 (100 mg, 208.37 μmol) was then added and the reaction mixture was stirred continuously at 20-30° C. for half an hour. After concentration under reduced pressure, the residue was purified by preparative HPLC (chromatographic column: Phenomenex Synergi C18, 150 mm×25 mm×10 m; mobile phase: phase A: 0.225% formic acid aqueous solution; phase B: 13%-46% acetonitrile; 11 min) to obtain 11. $^1$H NMR (400 MHz, MeOD) δ=9.24 (m, 1H), 7.68 (t, J=7.2 Hz, 1H), 7.61 (t, J=7.0 Hz, 1H), 7.43-7.31 (m, 1H), 7.21-6.86 (m, 1H), 6.54 (m, 1H), 6.41-6.23 (m, 2H), 5.86-5.67 (m, 1H), 5.44 (d, J=10.4 Hz, 1H), 5.33 (d, J=17.4 Hz, 1H), 4.56-4.41 (m, 1H), 4.28-3.99 (m, 1H), 3.77-3.59 (m, 1H), 2.73-2.62 (m, 1H), 2.47 (d, J=2.8 Hz, 3H), 2.34-2.20 (m, 1H), 2.19-2.03 (m, 3H), 1.43-1.33 (m, 3H). LC-MS (ESI) m/z: 486.3 [M+H]$^+$.

Compound 12

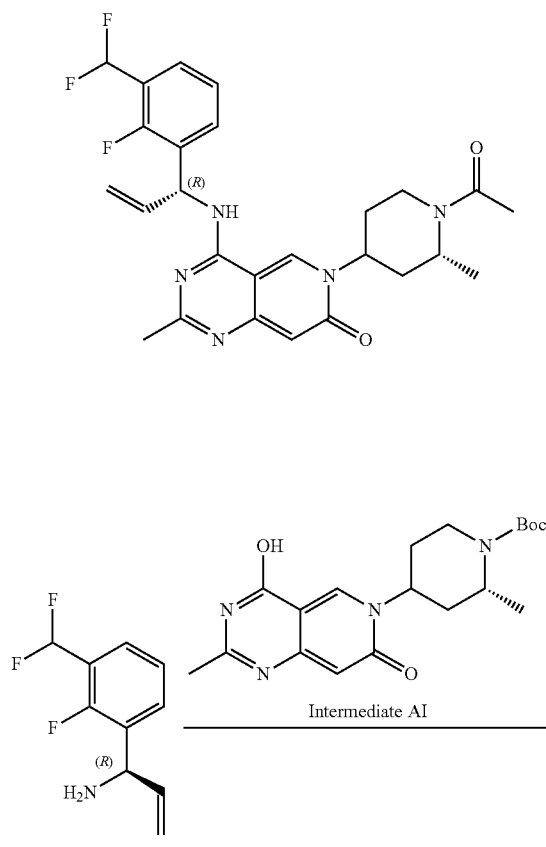

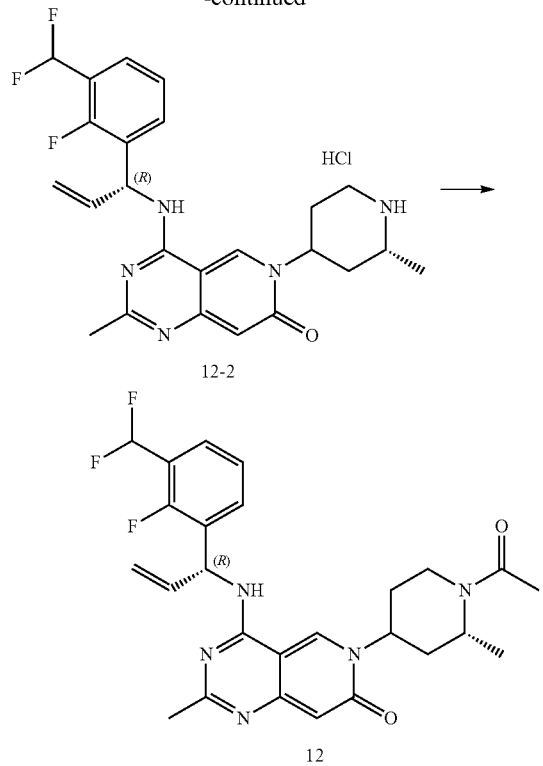

Step A: To a solution of intermediate AI (200 mg, 534.14 μmol) in acetonitrile (7 mL) were added potassium phosphate (283.46 mg, 1.34 mmol) and phosphonitrilic chloride trimer (185.70 mg, 554.93 μmol). The reaction mixture was stirred at 20-30° C. for 1 hour, then intermediate F (139.63 mg, 587.55 μmol) was then added. The reaction mixture was stirred for 12 hours, then ammonia water (mass fraction: 25%, 0.5 mL) was then added and stirred for further 1 hour. The mixture was quenched by saturated aqueous of potassium carbonate (mass fraction: 20%, 20 mL) and stirred for 1 hour, and extracted with dichloromethane (50 mL). The organic phase was washed with brine (10 mL), and dried over anhydrous sodium sulfate. After filtering, the filtrate was concentrated under reduced pressure. The residue was purified by pre-TLC (developing solvent: V/V, dichloromethane/methanol=10/1) to obtain 12-1. $^1$H NMR (400 MHz, CDCl3) δ=8.61-8.42 (m, 1H), 7.44 (td, J=6.6, 12.9 Hz, 2H), 7.16-7.05 (m, 1H), 6.98-6.64 (m, 1H), 6.49-6.38 (m, 1H), 6.37-6.23 (m, 1H), 6.16-5.99 (m, 1H), 5.29-5.07 (m, 2H), 5.01-4.82 (m, 1H), 3.84-3.69 (m, 1H), 3.64-3.53 (m, 1H), 3.28 (ddd, J=6.0, 8.6, 14.4 Hz, 1H), 2.37-2.29 (m, 3H), 2.24-2.08 (m, 1H), 1.90-1.82 (m, 1H), 1.80-1.71 (m, 1H), 1.66-1.57 (m, 1H), 1.42-1.34 (m, 9H), 1.18-1.10 (m, 3H). LC-MS (ESI) m/z: 558.3 [M+H]$^+$.

Step B: To a solution of 12-1 (200 mg, 358.68 μmol) in 1,4-dioxane (3 mL), was added a solution of hydrogen chloride in dioxane (4 mol/L, 1 mL). The reaction mixture was stirred at 30° C. for 2 hours, then concentrated under reduced pressure to obtain 12-2. LC-MS (ESI) m/z: 458.2 [M+H]$^+$.

Step C: Acetic acid (32.28 mg, 537.50 μmol), 2-(7-azabenzotriazole)-N,N,N,N-tetramethyluronium hexafluorophosphate (204.37 mg, 537.50 μmol) and N,N-diisopropylethylamine (185.24 mg, 1.43 mmol) were added to N,N-dimethylformamide (1 mL), and the reaction mixture

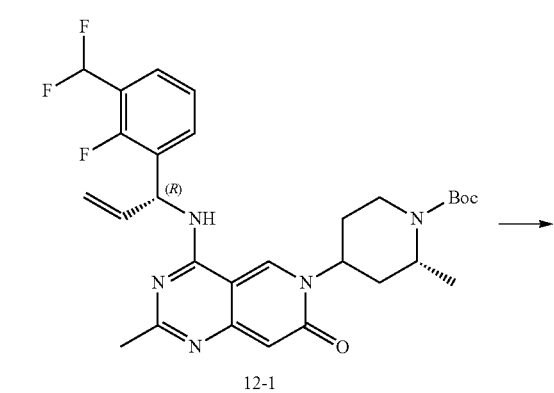

was stirred at 20-30° C. for 15 minutes. 12-2 (177 mg, 358.33 μmol) was then added and the reaction mixture was stirred for half an hour. After concentration under reduced pressure, the residue was purified by preparative HPLC (chromatographic column: Phenomenex Synergi C18, 150 mm×25 mm×10 m; mobile phase: phase A: 0.225% formic acid aqueous solution; phase B: 15%-54% acetonitrile; 13 min) to obtain compound 12. $^1$H NMR (400 MHz, MeOD) δ=9.33-9.20 (m, 1H), 7.76-7.68 (m, 1H), 7.67-7.57 (m, 1H), 7.42-7.31 (m, 1H), 7.18-6.87 (m, 1H), 6.59-6.50 (m, 1H), 6.39-6.24 (m, 2H), 5.51-5.41 (m, 1H), 5.38-5.27 (m, 1H), 5.06-4.91 (m, 3H), 4.44-4.28 (m, 1H), 2.54-2.44 (s, 3H), 2.35-2.22 (m, 1H), 2.22-2.14 (m, 4H), 2.09-1.92 (m, 1H), 1.85-1.72 (m, 1H), 1.50-1.29 (m, 3H). LC-MS (ESI) m/z: 500.3 [M+H]$^+$.

Compound 13

13

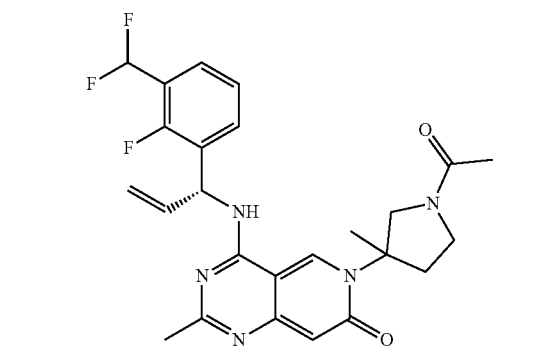

Intermediate AJ

Intermediate F

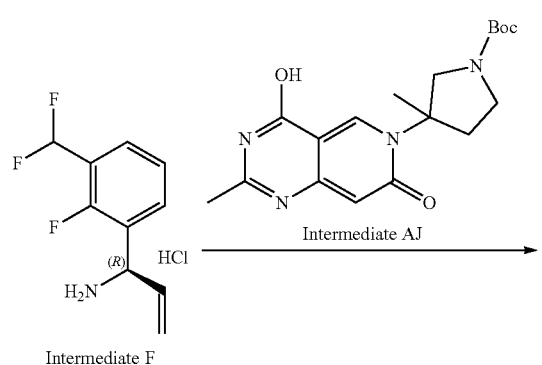

13-1

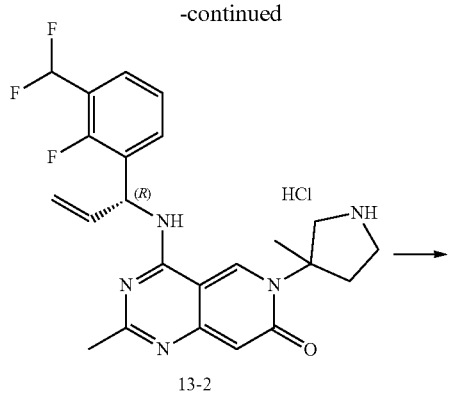

13-2

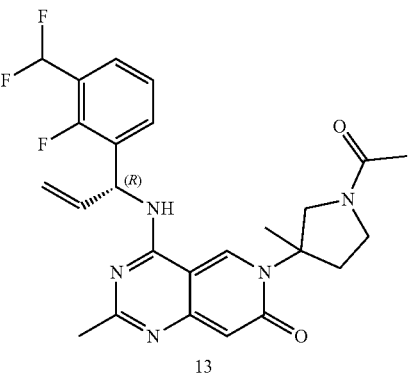

13

Step A: To a solution of intermediate AJ (146 mg, 405.10 μmol) in acetonitrile (4 mL) were added phosphonitrilic chloride trimer (140.84 mg, 405.10 μmol) and potassium phosphate (257.97 mg, 1.22 mmol). The reaction mixture was stirred at 25° C. for 1 hour, then intermediate F (81.50 mg, 405.10 μmol) was added. The reaction mixture was stirred at 25° C. for 1 hour. After filtering, the filtrate was concentrated under reduced pressure. The residue was purified by preparative HPLC (chromatographic column: Welch Ultimate XB-SiOH, 250 mm×50 mm×10 μm; mobile phase: phase A: n-hexane; phase B: 0.1% ammonia ethanol solution, 15%-55%; 15 min) to obtain 13-1. LC-MS (ESI) m/z: 544.3 [M+H]$^+$.

Step B: To a solution of 13-1 (50 mg, 91.98 μmol) in 1,4-dioxane (4 mL) was added a solution of hydrogen chloride in dioxane (4 mol/L, 1 mL). The reaction mixture was stirred at 40° C. for 1 hour, then concentrated under reduced pressure to obtain 13-2. LC-MS (ESI) m/z: 444.2 [M+H]$^+$.

Step C: Acetic acid (8.26 mg, 137.52 μmol), N,N-diisopropylethylamine (47.4 mg, 366.72 μmol) and 2-(7-azabenzotriazole)-N,N,N,N-tetramethyluronium hexafluorophosphate (52.29 mg, 137.52 μmol) were added to N,N-dimethylformamide (2 mL). The reaction mixture was stirred at 25° C. for 15 minutes, then 13-2 (44 mg, 91.68 μmol) was added, and the reaction mixture was stirred at 25° C. for 1 hour after adding. After concentration under reduced pressure, the residue was purified by preparative HPLC (chromatographic column: Phenomenex Synergi C18, 150 mm×50 mm×3 m; mobile phase: phase A: 0.225% formic acid aqueous solution; phase B: 8%-38% acetonitrile; 15 min) to obtain compound 13. $^1$H NMR (400 MHz, DMSO-d$_6$) δ=9.19-9.02 (m, 1H), 8.87 (d, J=15.6 Hz, 1H), 7.73-7.54 (m, 2H), 7.40-7.10 (m, 2H), 6.46-6.34 (m, 1H), 6.31-6.16 (m, 1H), 6.10 (d, J=3.4 Hz, 1H), 5.34 (dd, J=10.8 Hz, 1H), 5.20 (dd, J=17.0 Hz, 1H), 4.50-4.40 (m, 1H), 3.73-3.50 (m, 4H), 2.80-2.70 (m, 1H), 2.27-2.18 (m, 3H), 2.02-1.93 (m, 3H), 1.63-1.52 (m, 3H). LC-MS (ESI) m/z: 486.2 [M+H]⁺.

Compound 14

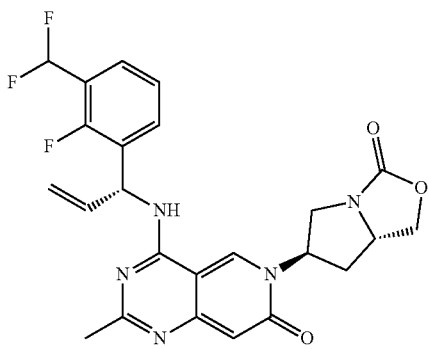

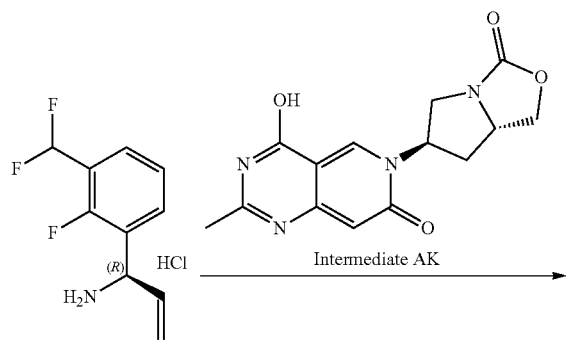

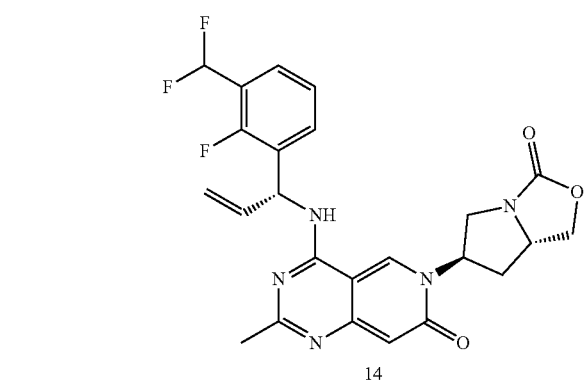

Step A: To a solution of intermediate AK (50 mg, 165.41 μmol) in acetonitrile (5 mL) were phosphonitrilic chloride trimer (60.38 mg, 173.68 μmol) and potassium phosphate (140.44 mg, 661.63 μmol). The reaction mixture was stirred at 30° C. for 3 hours, then intermediate F (39.31 mg, 165.41 μmol) was added and stirred at 30° C. for 12 hours. After filtering, the filtrate was concentrated under reduced pressure. The residue was purified by pre-TLC (developing solvent: ethyl acetate) to obtain compound 14. LC-MS (ESI) m/z: 486.2 [M+H]⁺.

Compound 15

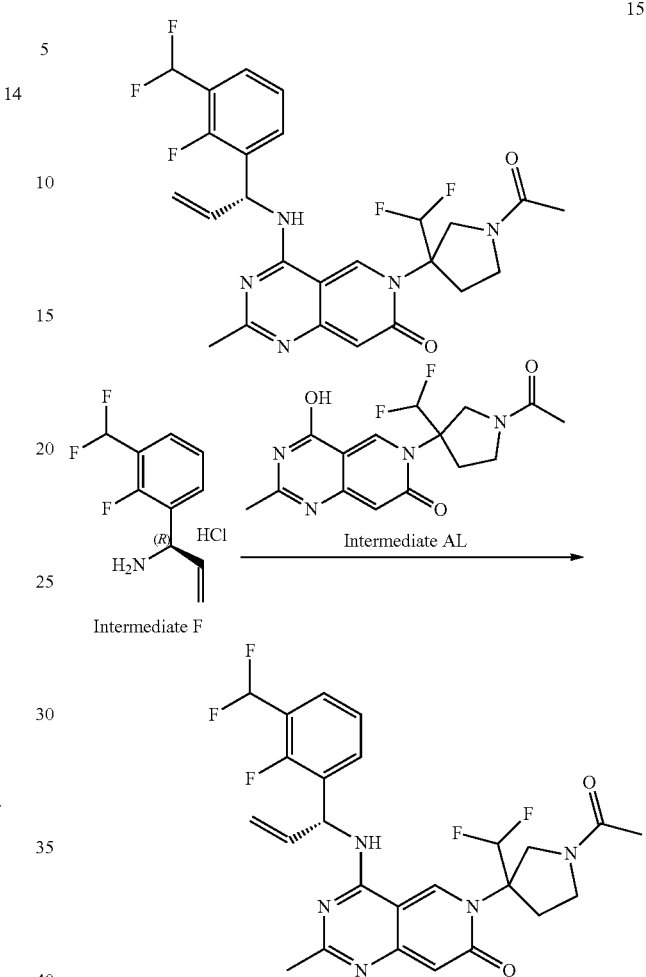

Step A: To a solution of intermediate AL (50 mg, 147.79 μmol) in acetonitrile (5 mL) were added phosphonitrilic chloride trimer (51.38 mg, 147.79 μmol) and potassium phosphate (94.11 mg, 443.37 μmol). The reaction mixture was stirred at 30° C. for 3 hours, then intermediate F (35.10 mg, 147.79 μmol) was added and stirred at 30° C. for 12 hours. After filtering, the filtrate was concentrated under reduced pressure. The residue was purified by pre-TLC (developing solvent: ethyl acetate) to obtain compound 15. LC-MS (ESI) m/z: 522.2 [M+H]⁺.

Bioassay

Experimental Embodiment 1. KRAS (G12C) and SOS1 Binding Assay

1. Experimental Materials:
KRAS (G12C) protein was expressed and purified by AtaGenix Laboratories (Wuhan) Co., Ltd.; SOS1 exchange domain (564-1049) protein (Human recombinant) was purchased from Cytoskeleton; Mab Anti 6HIS-XL665 and Mab Anti GST-Eu cryptate were purchased from Cisbio. Multi-functional microplate reader Nivo5 was purchased from PerkinElmer.

2. Preparation of 1× Buffer:

The buffer for this experiment was the current preparation.

Preparation method: 4-Hydroxyethylpiperazineethanesulfonic acid (Hepes): 5 mM; sodium chloride (NaCl): 150 mM; ethylenediaminetetraacetic acid (EDTA): 10 mM; CO-630 (Igepal): 0.0025%; potassium fluoride (KF): 100 mM; dithiothreitol (DTT): 1 mM; bovine serum albumin (BSA): 0.05%.

3. Experimental Methods:
   1) The compounds to be tested were diluted 5-fold with DMSO to the eighth concentration using a row gun, that is, from 1 mM to 0.064 µM.
   2) Each gradient of the compounds to be tested were diluted with 1× buffer into a working solution of 2% DMSO, 5 µL/well was added to the corresponding well, corresponding to a concentration gradient of 20 µM to 0.00128 nM, and a double-duplication experiment was set up. The working solution was centrifuged at 1000 rpm for 1 minute.
   3) A mixed working solution of KRAS (G12C) (200 nM) and Mab Anti GST-Eu cryptate (1 ng/µL) was prepared with 1× buffer, then the mixed working solution was incubated at 25° C. for 5 minutes, and 2.5 µL/well was added to the corresponding well.
   4) A mixed working solution of SOS1 (80 nM) and Mab Anti 6HIS-XL665 (8 g/µL) was prepared with 1× buffer, 2.5 µL/well was added to the corresponding well; 2.5 µL of Mab Anti 6HIS-XL665 (8 g/µL) diluent was added to the blank well (Blank), at this time the final concentration gradient of the compounds was 10 µM diluted to 0.64 nM, KRAS (G12C) (500 nM), MAb Anti GST-Eu cryptate (0.25 ng/µL), SOS1 (20 nM), Mab Anti 6HIS-XL665 (2 g/µL), and the reaction system was placed at 25° C. for 60 minutes. A multi-label analyzer was used for reading HTRF after the reaction was completed.

4. Data Analysis:

Using the equation (Sample−Min)/(Max−Min)×100% to convert the raw data into inhibition rate, and the value of $IC_{50}$ might be obtained by curve fitting with four parameters (obtained by "Log(inhibitor) vs. response-Variable slope" mode in GraphPad Prism). Table 1 provides the inhibitory activity of the compounds of the present disclosure on KRAS(G12C) and SOS1 binding.

TABLE 1

Inhibitory activity of the compounds of the present disclosure on KRAS(G12C) and SOS1 binding

| Sample | $IC_{50}$ (nM) |
| --- | --- |
| Compound 1 | 32 |
| Compound 2 | 26 |
| Compound 3 | 25 |
| Compound 4 | 21 |
| Compound 7 | 13 |
| Compound 8 | 13 |

Conclusion: The compounds of the present disclosure have ideal KRAS(G12C)-SOS1 binding inhibitory activity.

Experimental Embodiment 2. HTRF Detection of the Expression Level of pERK in DLD-1 Cells The degree of ERK protein phosphorylation in KRAS G13D mutant DLD-1 cells was detected by homogeneous time-resolved fluorescence (HTRF), and the $IC_{50}$ and $IC_{90}$ values of the compounds were used as indicators to evaluate the inhibitory activity of the compounds on the degree of ERK phosphorylation in the RAS signaling pathway.

1. Experimental Steps and Methods:
   1) DLD-1 (50,000 cells/well) cells were planted into a 96-well plate with 90 µL of RPMI-1640 medium (10% fetal bovine serum) per well, and cultured overnight at 37° C. in a 5% $CO_2$ incubator.
   2) 10 µL of the 10× compound working solution was taken and added to the cell culture plate as shown in Table 2. 10 µL of DMSO-cell culture medium mixture was added to vehicle control and positive control. The final concentration of DMSO was 0.25%. The 96-well cell plate was returned to the incubator and cultured for 1.5 hours.

TABLE 2

400× storage plates of the compounds of the present disclosure (µM)

| | Stock Solution | C1 | C2 | C3 | C4 | C5 |
| --- | --- | --- | --- | --- | --- | --- |
| Vehicle control | DMSO | DMSO | DMSO | DMSO | DMSO | DMSO |
| Concentration (µM) | 10000 | 4000 | 1333.3333 | 444.4444 | 148.1481 | 49.3827 |
| Volume (µL) | | 20 | 20 | 20 | 20 | 20 |
| Dilution ratio | | 1:2.5 | 1:3 | 1:3 | 1:3 | 1:3 |
| Volume 1 (µL) | 12 | 18 | 20 | 20 | 20 | 20 |
| | → | ↓ ↗ | ↓ ↗ | ↓ ↗ | ↓ ↗ | ↓ |
| Volume 2 (µL) | | 10 | 10 | 10 | 10 | 10 |

| | C5 | C6 | C7 | C8 | C9 | C10 |
| --- | --- | --- | --- | --- | --- | --- |
| Vehicle control | DMSO | DMSO | DMSO | DMSO | DMSO | DMSO |
| Concentration (µM) | 49.3827 | 16.4609 | 5.4870 | 1.8289 | 0.6096 | 0.2032 |
| Volume (µL) | 20 | 20 | 20 | 20 | 20 | 30 |
| Dilution ratio | 1:3 | 1:3 | 1:3 | 1:3 | 1:3 | 1:3 |
| Volume 1 (µL) | 20 | 20 | 20 | 20 | 20 | 20 |
| | ↓ ↗ | ↓ ↗ | ↓ ↗ | ↓ ↗ | ↓ ↗ | ↗ |
| Volume 2 (µL) | 10 | 10 | 10 | 10 | 10 | |

3) The cell supernatant was removed, 50 μL of 1× lysate was immediately added, and incubated at room temperature for 30 minutes with shaking.
4) 16 μL of cell lysate was transferred from the 96-well plate to the HTRF 384-well assay plate by pipetting and mixing with a pipette.
5) 4 μL of the premixed antibody solution was added, the plate was sealed, and incubated at 4° C. The fluorescence emission intensity at 665 nm and 620 nm was detected with an HTRF plate reader.

2. Data Analysis:
1) The fluorescence wavelength of the Envision instrument was set at 665 nm and 620 nm for fluorescence quantification;
2) acceptor and donor emission signals per well were calculated: Ratio=Signal 665 nM/Signal 620 nM;
3) after removing the background value, the raw data was compared with the DMSO treatment group, and the relative pERK level was calculated;
4) $IC_{50}$ was calculated based on Log[inhibitor] vs Response-variance slope using GraphPad 8.0 software. Table 3 provides the inhibitory activity of the compounds of the present disclosure on pERK.

TABLE 3

Inhibitory activity of the compounds of the present disclosure on pERK in DLD-1 cells

| Sample | $IC_{50}$ (nM) |
|---|---|
| Compound 6 | 23 |
| Compound 8 | 37 |
| Compound 9 | 36 |
| Compound 10 | 87 |
| Compound 13 | 26 |
| Compound 15 | 25 |

Conclusion: The compounds of the present disclosure have significant inhibition activity on the phosphorylation level of ERK kinase in DLD-1 cells.

Experimental Embodiment 3. In Vitro Anti-Proliferation Assay of A427 Cells (KRAS G12D)

1. Experimental Materials:
EMEM culture medium, fetal bovine serum, penicillin/streptomycin antibiotics were purchased from Wisent, and low melting point agarose was purchased from Sigma. Almar blue reagent was purchased from Invitrogen. A427 cell line was purchased from Nanjing Cobioer Biotechnology Co., Ltd. Envision multi-label analyzer (PerkinElmer).

2. Experimental Methods:
1) A427 cells were planted in a 96-well U-shaped plate, and the low melting point agarose was first prepared into a 2% mother solution. When used, the agarose mother solution was first heated in a microwave oven to completely melt, and then placed in a 42° C. water bath to keep the agarose in a liquid state. The gel was added to a serum-containing medium to prepare a gel concentration of 0.6% as the base gel, and spread into a 96-well U-shaped plate at 50 μL per well. After the base gel was solidified, 2% gel was added to a cell-containing medium to prepare a gel concentration of 0.4% of cell-containing top gel with a cell density of $4 \times 10^4$ cells/mL, which was added to a 96-well U-shaped plate spread with base gel at 75 μL per well with a cell density of 3000 cells per well. After the top gel was solidified, the cell plate was incubated overnight in a $CO_2$ incubator.

2) On the day of adding the compounds, 85 μL of liquid medium was added to the 96-well U-shaped plate in which the cells were spread. The compounds to be tested were diluted 3-fold with a row gun to the ninth concentration, that is, from 6 mM to 0.9 μM, and a double-duplication experiment was set up. 97 μL of culture medium was added to a middle plate, and then 2.5 μL of gradient diluted compound per well was transferred to the middle plate according to the corresponding position. After being thoroughly mixed, 40 μL per well was transferred to the cell plate. The concentration range of the compound transferred to the cell plate was 30 μM to 4.5 nM. The cell plate was cultured in a $CO_2$ incubator for 7 days, and on day 8, the compounds to be tested were diluted 3-fold with a row gun to the ninth concentration, that is, from 6 mM to 0.9 μM, and a double-duplication experiment was set up. 198 μL of culture medium was added to a middle plate, then 2 μL of gradient diluted compound per well was transferred to the first middle plate according to the corresponding position, then 100 μL of culture medium was added to the second middle plate, and 100 μL of the mixed compound in the first middle plate was taken and added. After being thoroughly mixed, 40 μL per well was transferred to the cell plate. The concentration range of the compound transferred to the cell plate was 30 μM to 4.5 nM. The cell plate was cultured in a $CO_2$ incubator for another 7 days. The compounds were co-incubated with the cells for 14 days, 20 μL of Almar blue detection reagent per well was added to the cell plate, then the plate with the dye was shaken on a horizontal shaker for 15 minutes, and the plate was incubated at room temperature for 5 hours to stabilize the luminescent signal. A multi-label analyzer was used for reading.

3. Data Analysis:
Using the equation (Sample−Min)/(Max−Min)×100% to convert the raw data into inhibition rate, and the value of $IC_{50}$ might be obtained by curve fitting with four parameters (obtained by "log(inhibitor) vs. response-Variable slope" mode in GraphPad Prism). Table 4 provides the inhibitory activity of the compounds of the present disclosure on the proliferation of A427 cells. Among them, "A" means the $IC_{50}$ value is less than or equal to 100 nM; "B" means the $IC_{50}$ value is greater than 100 nM and less than or equal to 500 nM; "C" means the $IC_{50}$ value is greater than 500 nM.

TABLE 4

Inhibitory activity of the compounds of the present
disclosure on the proliferation of A427 cells

| Sample | $IC_{50}$ (nM) |
|---|---|
| Compound 8 | A |
| Compound 13 | A |
| Compound 15 | A |

Conclusion: The compounds of the present disclosure exhibit significant inhibitory activity on the proliferation of A427 cells.

Experimental Embodiment 4. Pharmacokinetic Study in Mice

The purpose of this experiment is to evaluate the pharmacokinetic behavior of the compounds after a single intravenous injection or intragastric administration in mice. For intravenous injection, the compound was prepared as a clear solution of 0.2 mg/mL, vehicle: 5% DMSO/95% (10% hydroxypropyl-β-cyclodextrin) aqueous solution; for intragastric administration, the compound was prepared as a suspension of 0.3 mg/mL, vehicle: 5% DMSO/95% (10% hydroxypropyl-β-cyclodextrin) aqueous solution.

The concentrations of compounds in plasma were determined by high performance liquid chromatography-tandem mass spectrometry (LC-MS/MS). Retention time of compounds and internal standard (diclofenac), chromatogram acquisition and integration of chromatogram were processed using the software Analyst (Applied Biosystems), and statistics of the data were processed using the software Watson LIMS (Thermo Fisher Scientific) or Analyst (Applied Biosystems). The concentration of analytes in the sample was expressed in ng/mL, with 3 valid digits retained. All values expressed as percentages (for example, % deviation and % coefficient of variation, etc.) were retained to one decimal point. Each calibration curve contained at least 6 concentration levels. The calibration specimen should be prepared using a stock solution from a different source than the quality control sample. The deviation between the calculated concentration of the calibration specimen and the indicated value exceeds ±15.0% (the lower limit of quantification exceeds ±20.0%) and the specimen should be rejected in the regression analysis. The rejected calibration specimens should be less than 25% and each calibration curve should contain at least 6 calibration specimens that meet the acceptance criteria. If the lower and upper limits of quantification calibration specimens need to be rejected, the upper and lower limits of quantification for the analytical batch will be raised and lowered accordingly.

Plasma concentrations were processed using the non-compartmental model of WinNonlin™ Version 6.3 (Pharsight, Mountain View, CA) pharmacokinetic software, and pharmacokinetic parameters were calculated using the linear-log trapezoidal method. The pharmacokinetic parameters to be calculated include but are not limited to (data permitting) $T_{1/2}$, $Vd_{ss}$, CL, $AUC_{0-24\ h}$ of IV group; $C_{max}$, $T_{max}$, $AUC_{0-24\ h}$, oral bioavailability (F %) of PO group.

The relevant pharmacokinetic parameters of the embodiment of the present disclosure in mice intravenously injected at a dose of 1 mg/Kg and intragastrically administered at a dose of 3 mg/Kg are shown in Table 5 below.

TABLE 5

Pharmacokinetic parameters of the compounds of the present disclosure
after intravenous injection and intragastric administration in mice

| Test compound | Intravenous injection | | | | Intragastric administration | | | |
|---|---|---|---|---|---|---|---|---|
| | $T_{1/2}$ (h) | $Vd_{ss}$ (L/Kg) | CL (mL/min/Kg) | $AUC_{0-24\ h}$ (nM · h) | $C_{max}$ (nM) | $T_{max}$ (h) | $AUC_{0-24\ h}$ (nM · h) | F % |
| Compound 8 | 0.67 | 1.84 | 30.5 | 1771 | 1385 | 1.00 | 4110 | 109% |

Conclusion: The compounds of the present disclosure exhibit good pharmacokinetic properties in PK study in mice.

Experimental Embodiment 5. Evaluation of the Antitumor Effects of the Test Compounds in Human Pancreatic Cancer MIA PaCa-2 Cell Line Subcutaneous Xenograft BALB/c Nude Mouse Animal Model Human pancreatic cancer MIA PaCa-2 cells are KRAS G12C mutation-dependent cell lines. KRAS protein G12C mutations lead to the sustained activation of KRAS and thus activation of downstream signaling pathways such as ERK and AKT to promote the growth and proliferation of tumor cells. KRAS protein is kept in an inactivated GDP-bound state, thereby inhibiting tumor growth.

BALB/c nude mice were subcutaneously inoculated with MIA PaCa-2 cells to establish a human pancreatic cancer subcutaneous transplantation tumor model. The test was divided into each test compound group and vehicle control group, with 6 animals in each group intragastrically administered, the vehicle control group was administered once a day, and each test compound group was administered twice a day at an interval of 12 hours with a total of 18 days of administration. Efficacy was evaluated based on relative tumor inhibition rate (TGI), and the safety was evaluated based on animal weight change and mortality.

The experimental animals were BALB/c nude mice, female, and the mice were 6-7 weeks old at the time of tumor cell inoculation, purchased from Shanghai Bikai Laboratory Animal Co., Ltd. The experimental animals were all kept in individual ventilation boxes with constant temperature and humidity, the feeding room had a temperature of 21-24° C. and a humidity of 40-60%, the ventilation was 10-20 times per hour and the alternating time of day and night was 12 hours/12 hours; cobalt 60 radiosterilized mice were continuously supplied with complete pellet feed with unlimited free ingestion, drinking tap water (used after autoclaving) uninterrupted supplied from drinking bottles with free ingestion. The mouse box was a polysulfone mouse box, which was used after autoclaving with the specification of 325 mm×210 mm×180 mm; the bedding was autoclaved corn cob, there were 5 animals in each box, and the cage cards were marked with IACUC approval number, experiment number, experiment start time, subject leader, experimental staff, animal source, group and animal number, and the like; the experimental animals were ear-tagged.

MIA PaCa-2 cells were cultured in DEME culture medium containing 10% fetal bovine serum and 2.5% HS. MIA PaCa-2 cells at the exponential growth stage were collected, resuspended in phosphate buffer saline (PBS) to a suitable concentration and mixed with the matrix (Matrigel) at a ratio of 1:1 for subcutaneous tumor inoculation in mice. Mice were subcutaneously inoculated with $5 \times 10^6$ MIA PaCa-2 cells on the right side.

When the tumor volume grew to about 70-80 mm³ (day 13 after cell inoculation), the administration was started. When a single mouse lost more than 20% of its body weight, it was euthanized in accordance with animal welfare guidelines.

After tumor inoculation, routine monitoring included the effects of tumor growth and treatment on the normal behavior of animals, specifically the mobility, food and water intake, weight gain or loss (weight was measured twice a week), eyes, coat and other abnormalities of the experimental animals. The clinical symptoms observed during the experiment were recorded in the raw data. Tumor volume calculation formula: tumor volume $(mm^3) = \frac{1}{2} \times (a \times b^2)$ (where a represents the long diameter and b represents the short diameter). In the experiment, data were collected using StudyDirector™ software, including the measurement of the long and short diameter of the tumor and the weighing of animals' body weight. The raw data was measured by the balance and vernier calipers and imported directly into the software, and any changes in the data would be recorded in the software.

Figure 2:
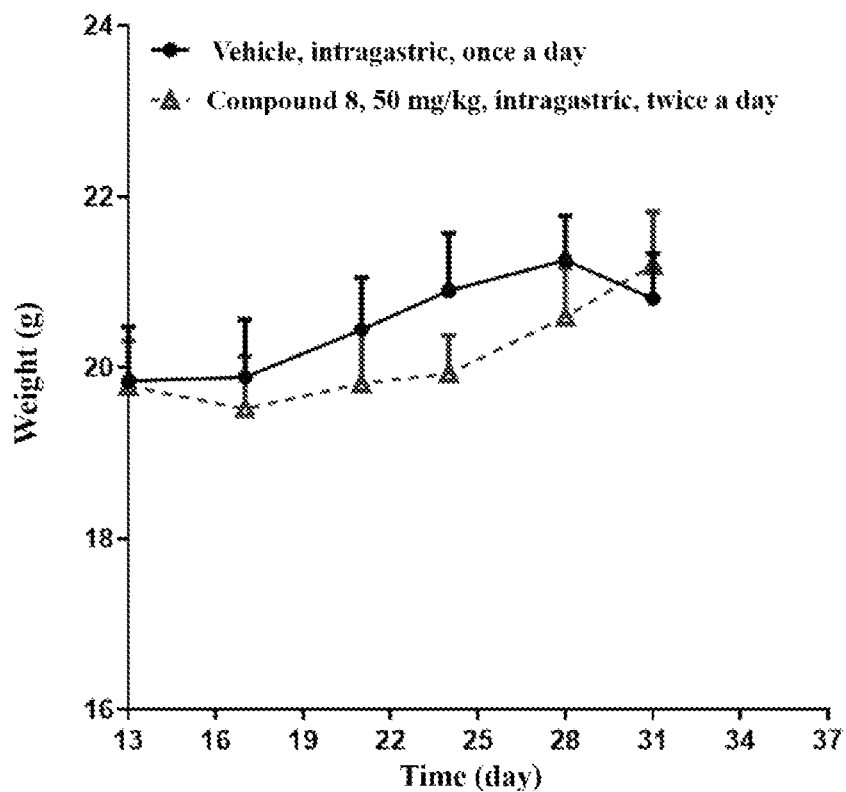
FIG. 2 is a graph showing the weight change of experimental animals.

The tumor growth curve is shown in FIG. 1, and the weight change of experimental animals is shown in FIG. 2. From the experimental results, it can be seen that the compounds of the present disclosure have a significant inhibitory effect on tumor proliferation in human pancreatic cancer MIA PaCa-2 cell line subcutaneous xenograft BALB/c nude mouse animal model, and no weight loss of the experimental animals is observed, indicating that the compounds of the present disclosure have a good safety profile after administration.

What is claimed is:

1. A compound represented by formula (II) or a pharmaceutically acceptable salt thereof,

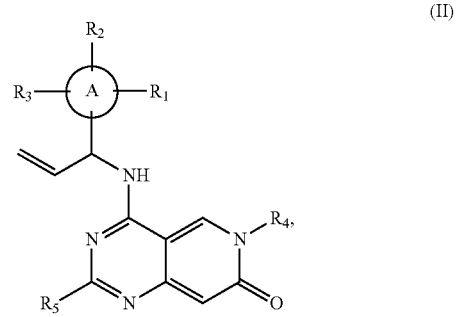

wherein,
ring A is selected from phenyl and thienyl;
$R_1$ is selected from H and $NH_2$;
$R_2$ is selected from $C_{1-3}$ alkyl, and the $C_{1-3}$ alkyl is optionally substituted by 1, 2, 3, 4 or 5 $R_a$;
$R_3$ is selected from H and F;
$R_4$ is selected from

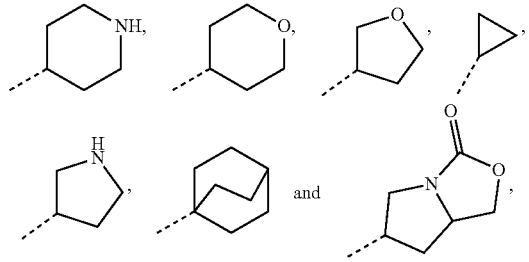

and the

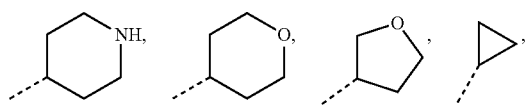

-continued

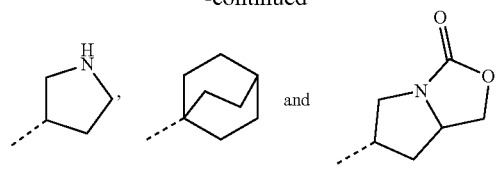

are each independently optionally substituted by 1, 2, 3 or 4 $R_b$;

$R_5$ is selected from H, Cl and $CH_3$;

$R_a$ is each independently selected from D, F, Cl, Br, I, OH, CN, $NH_2$, $CH_3$, —$CH_2NH_2$, —$NHCH_3$, —$N(CH_3)_2$, —$OCH_3$, —COOH, —$COOCH_3$ and cyclopropyl;

$R_b$ is each independently selected from H, F, Cl, Br, I, OH, CN, $NH_2$, $C_{1-3}$ alkyl, —$CH_2NH_2$, —$NHCH_3$, —$N(CH_3)_2$, $C_{1-3}$ alkoxy, —COOH, —COO—$C_{1-3}$ alkyl, —C(=O)—$C_{1-3}$ alkyl, —S(=O)$_2$-$C_{1-3}$ alkyl and cyclopropyl, and the $C_{1-3}$ alkyl, $C_{1-3}$ alkoxy and cyclopropyl are each independently optionally substituted by 1, 2, or 3 R;

R is each independently selected from F, Cl, Br, I, OH, CN, $NH_2$, —$OCH_3$ and —COOH.

2. The compound as claimed in claim 1 or the pharmaceutically acceptable salt thereof, wherein, $R_1$ is selected from $NH_2$.

3. The compound as claimed in claim 1 or the pharmaceutically acceptable salt thereof, wherein, $R_2$ is selected from $CF_3$, $CHF_2$,

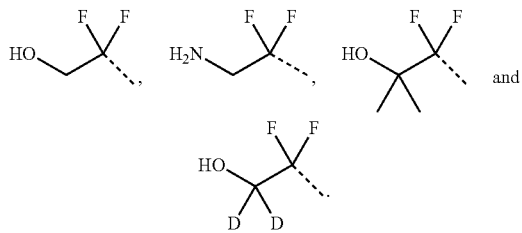

4. The compound as claimed in claim 1 or the pharmaceutically acceptable salt thereof, wherein, Rb is each independently selected from H, F, Cl, Br, I, OH, CN, $NH_2$, $CH_3$, —$CH_2F$, —$CHF_2$, —$CH_2CN$, —$CH_2OH$, —$CH_2OCH_3$, —$CH_2CH_3$, —$CH_2NH_2$, —$NHCH_3$, —$N(CH_3)_2$, —$OCH_3$, —COOH, —$COOCH_3$,

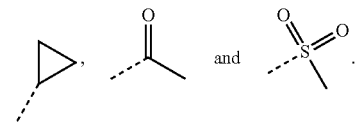

5. The compound as claimed in claim 1 or the pharmaceutically acceptable salt thereof, wherein, $R_4$ is selected from

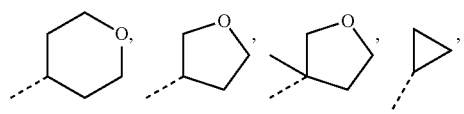

-continued

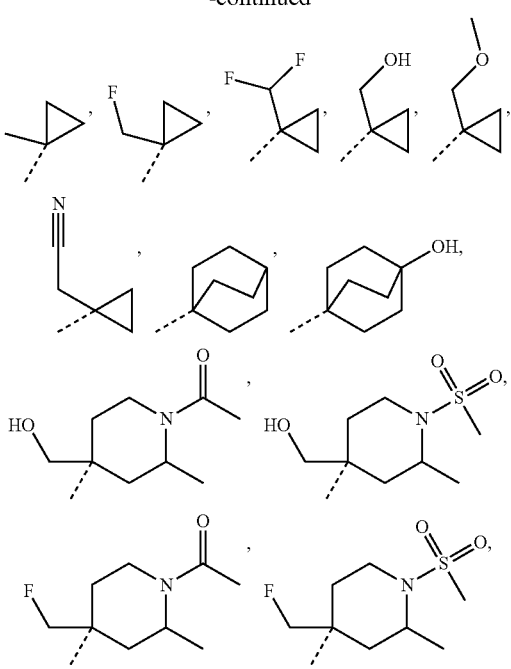

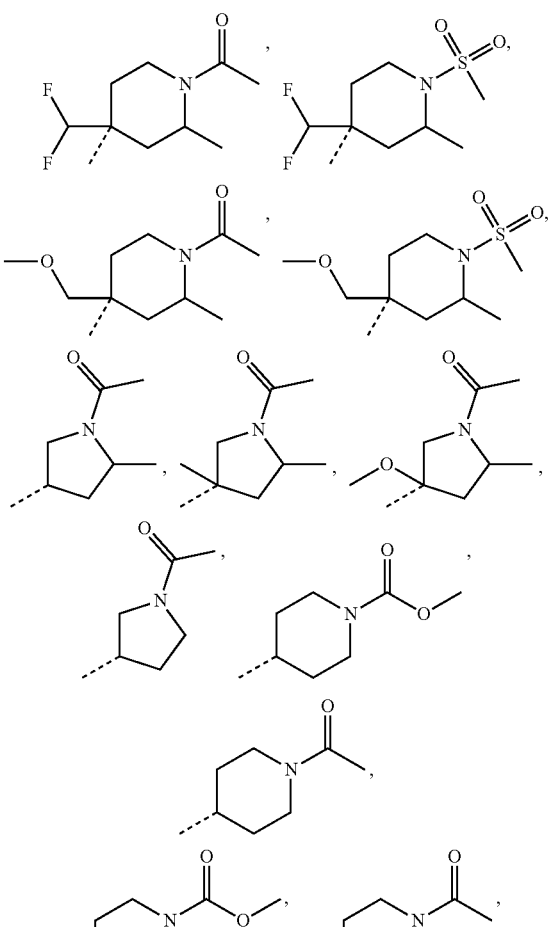

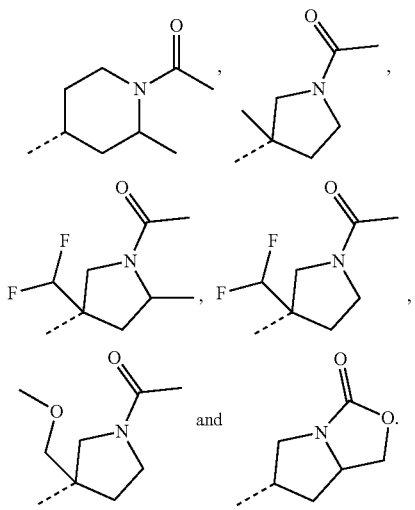
6. The compound as claimed in claim 1 or the pharmaceutically acceptable salt thereof, wherein, the compound is selected from
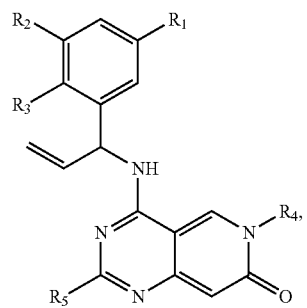
(II-1)
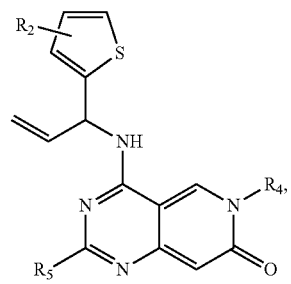
(II-2)
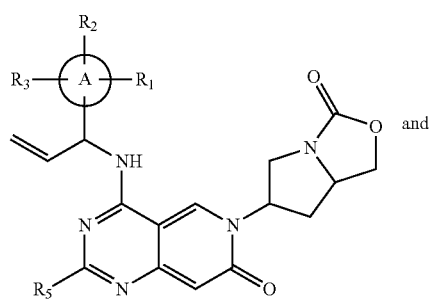
(II-3)
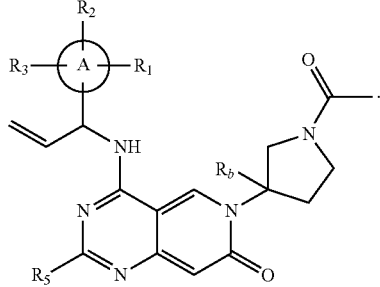
(II-4)
7. The compound as claimed in claim 6 or the pharmaceutically acceptable salt thereof, wherein, the compound is selected from
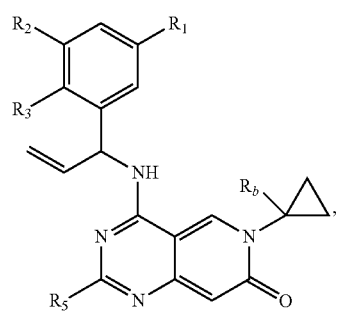
(II-1-a)
(II-2-a)
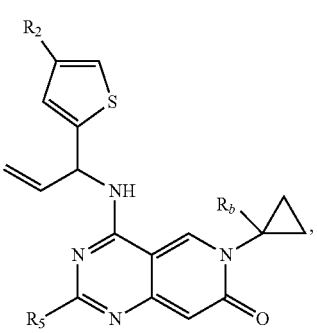
(II-3-a) and

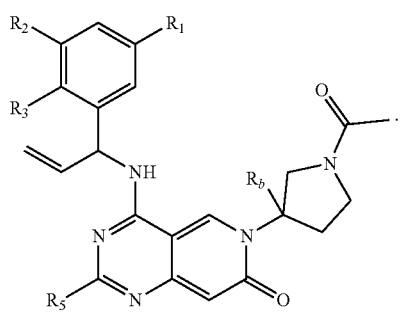
(II-4-a)
8. A compound or a pharmaceutically acceptable salt thereof, wherein, the compound is selected from
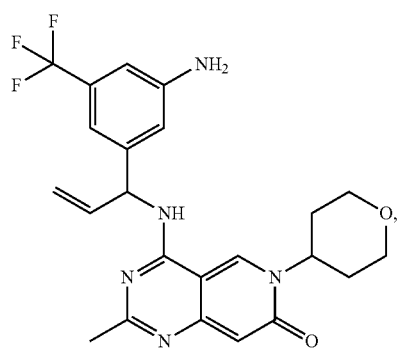
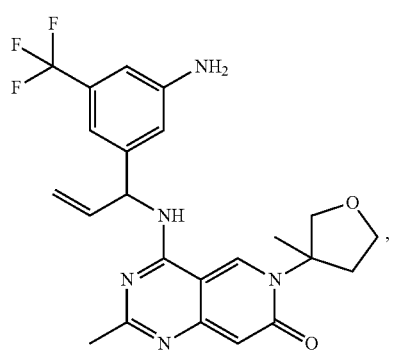
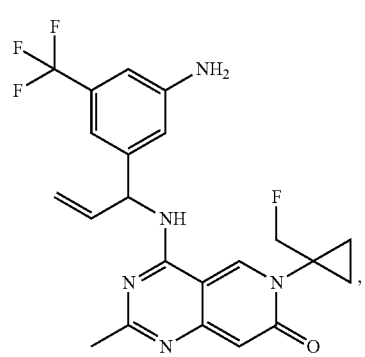
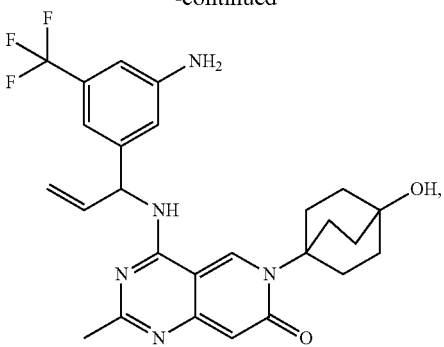

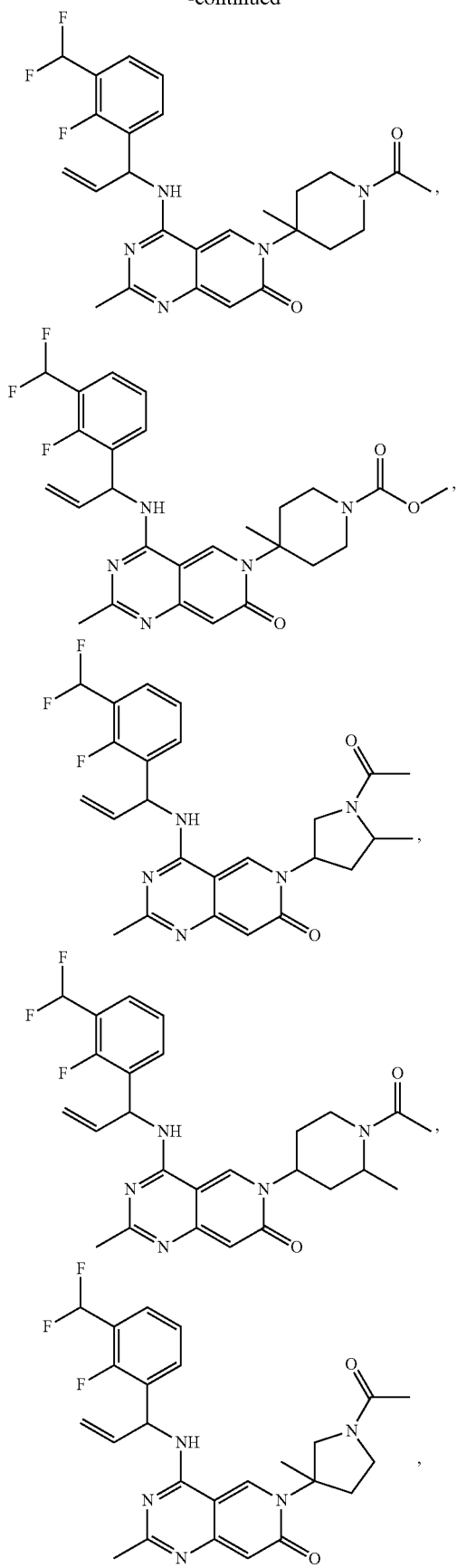
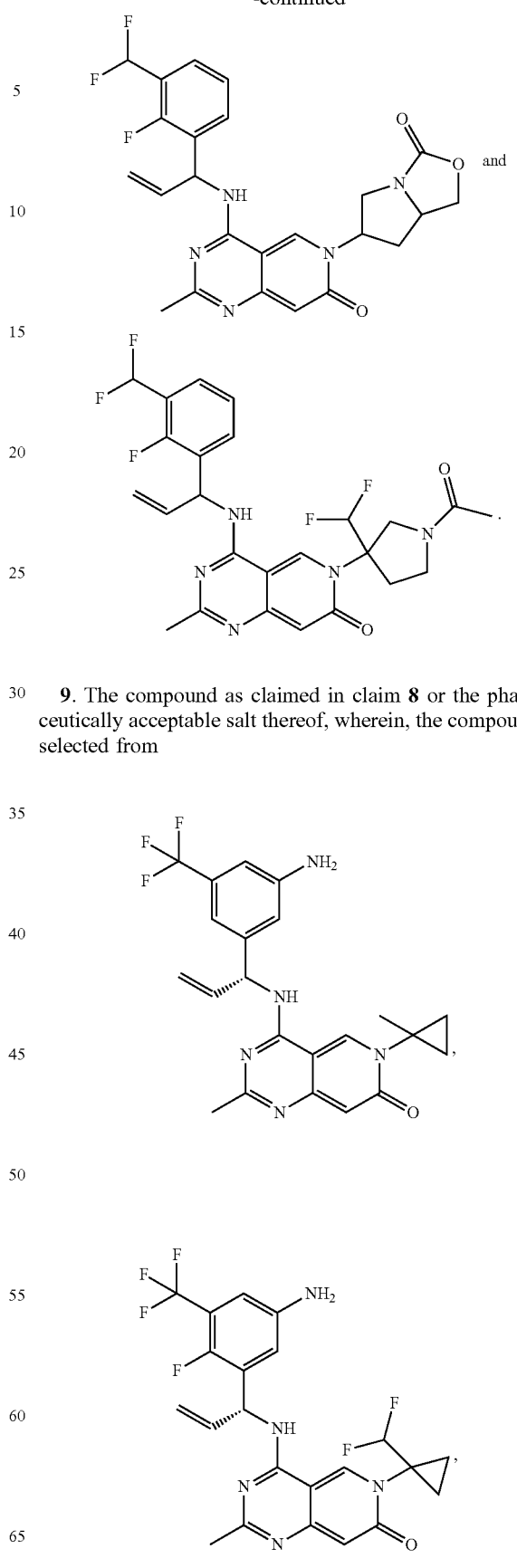
9. The compound as claimed in claim 8 or the pharmaceutically acceptable salt thereof, wherein, the compound is selected from -continued
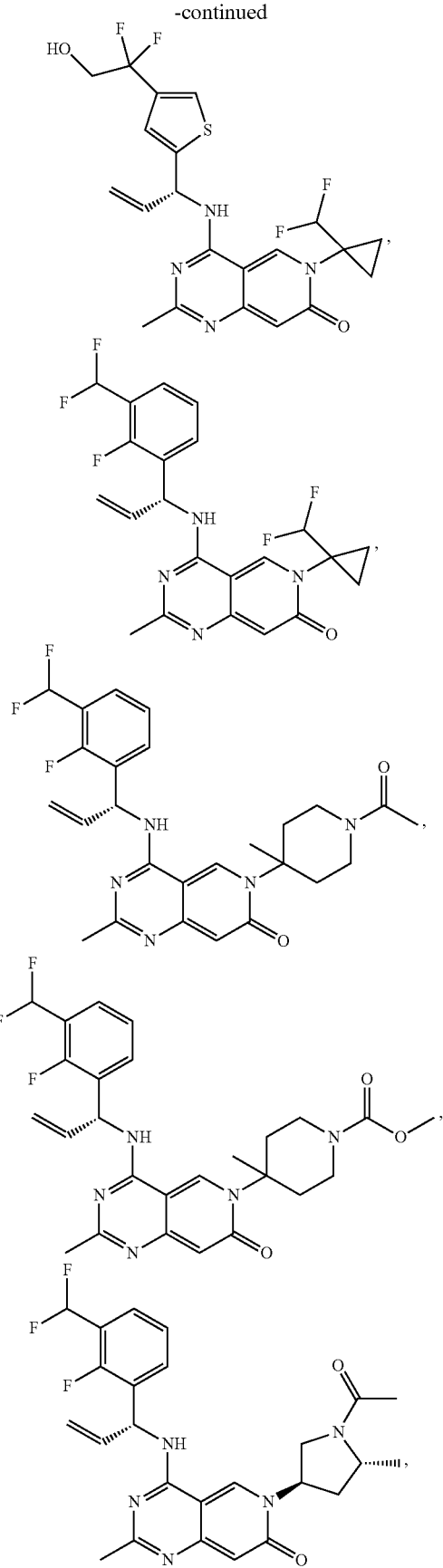
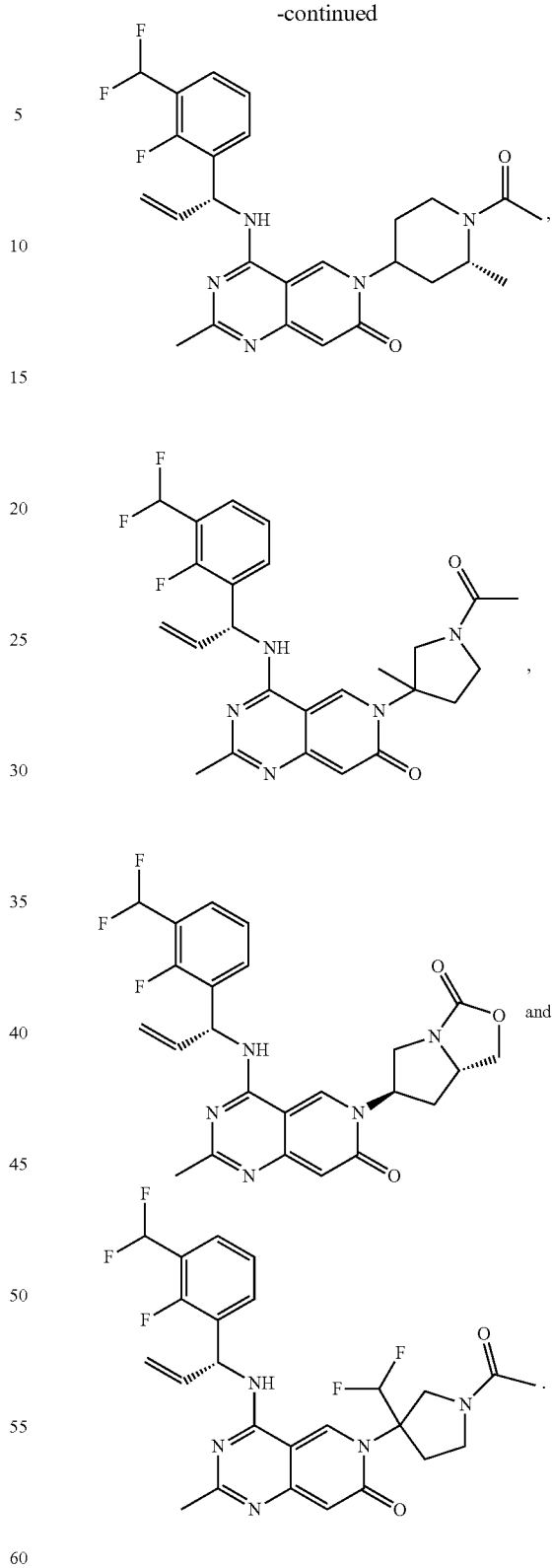
10. A method for the treatment of lung cancer, pancreatic cancer or rectal cancer in a subject in need thereof, comprising: administering the compound as claimed in claim 1 or the pharmaceutically acceptable salt thereof to the subject.
* * * * *